Feb. 22, 1927.　　　　　　　　　　　　　　　　　　1,618,303
R. J. MITCHELL ET AL
MAILING DISTRIBUTING MACHINE
Original Filed March 9, 1918　　21 Sheets-Sheet 1

Feb. 22, 1927.
R. J. MITCHELL ET AL
1,618,303
MAILING DISTRIBUTING MACHINE
Original Filed March 9, 1918    21 Sheets-Sheet 7

Witnesses
O. H. Cork

Inventors
R. J. Mitchell,
Z. B. Babbitt, Z. W. Alderman,
By
Attorneys

Feb. 22, 1927.　　　　1,618,303
R. J. MITCHELL ET AL
MAILING DISTRIBUTING MACHINE
Original Filed March 9, 1918　　21 Sheets-Sheet 8
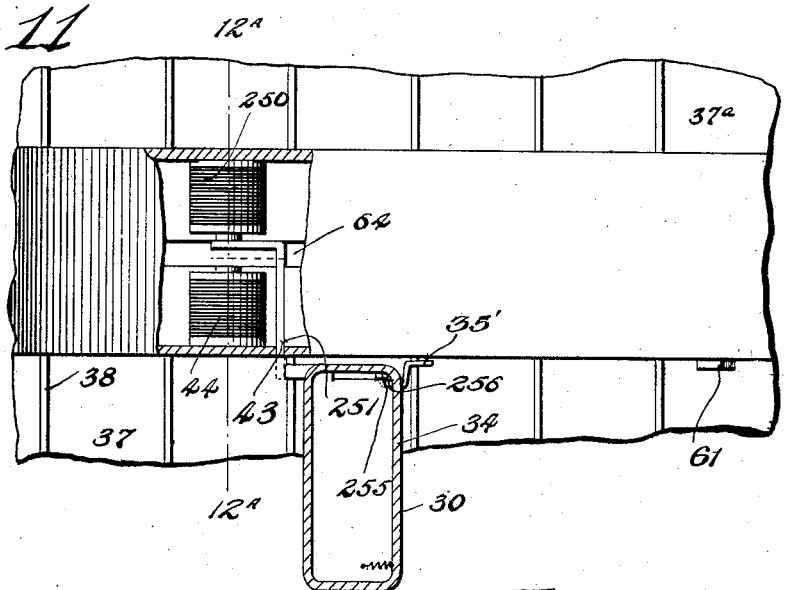
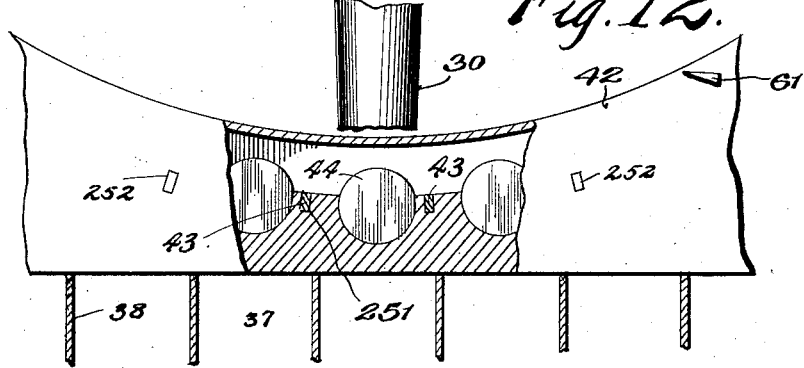
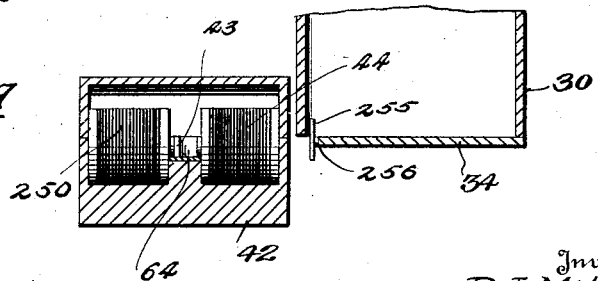
Inventors
R. J. Mitchell,
Z. B. Babbitt,
Z. W. Alderman,

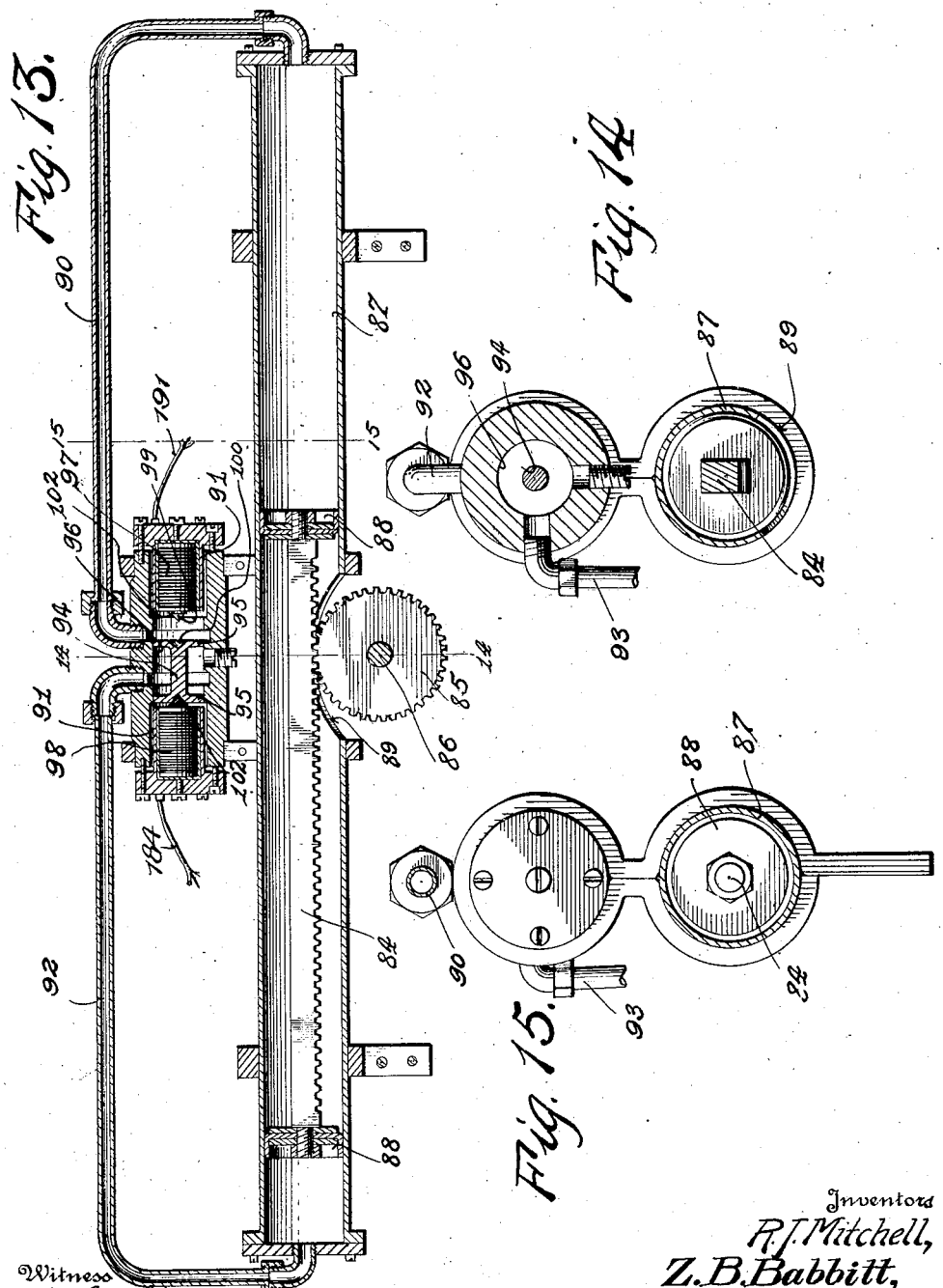

Feb. 22, 1927.
R. J. MITCHELL ET AL
1,618,303
MAILING DISTRIBUTING MACHINE
Original Filed March 9, 1918
21 Sheets-Sheet 10

Inventors
R. J. Mitchell,
Z. B. Babbitt,
Z. W. Alderman,
By
Attorneys

Feb. 22, 1927.
R. J. MITCHELL ET AL
1,618,303
MAILING DISTRIBUTING MACHINE
Original Filed March 9, 1918    21 Sheets-Sheet 11
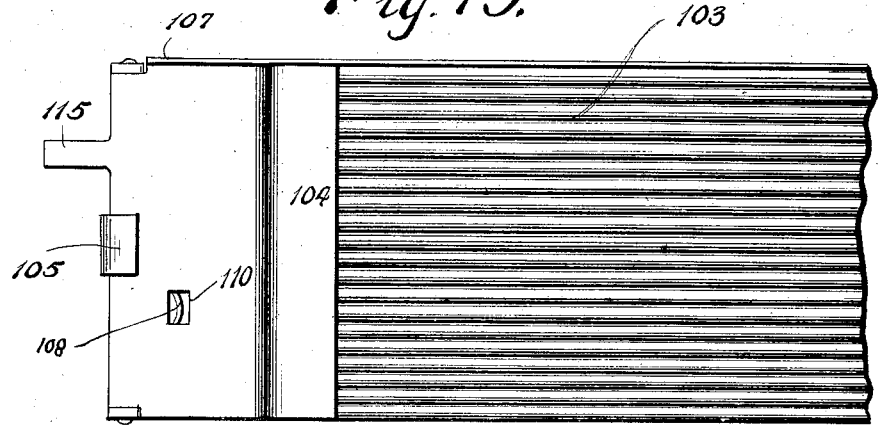
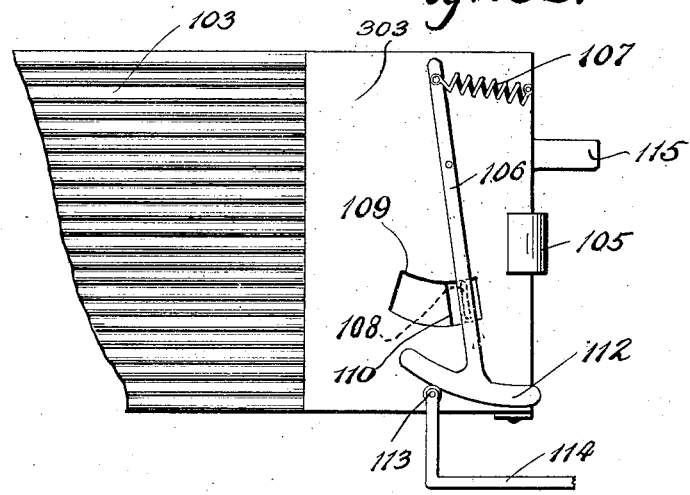

Feb. 22, 1927.
R. J. MITCHELL ET AL
1,618,303
MAILING DISTRIBUTING MACHINE
Original Filed March 9, 1918    21 Sheets-Sheet 12

Inventors
R. J. Mitchell,
Z. B. Babbitt,
Z. W. Alderman,

Attorneys

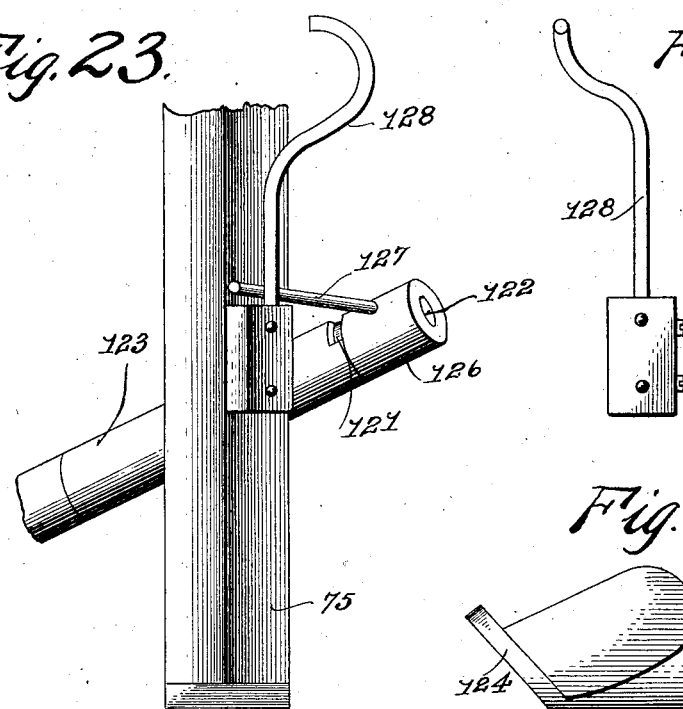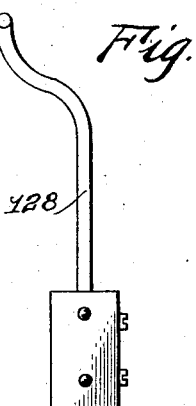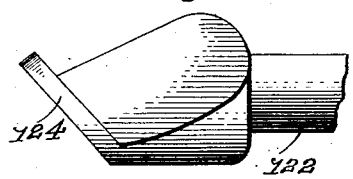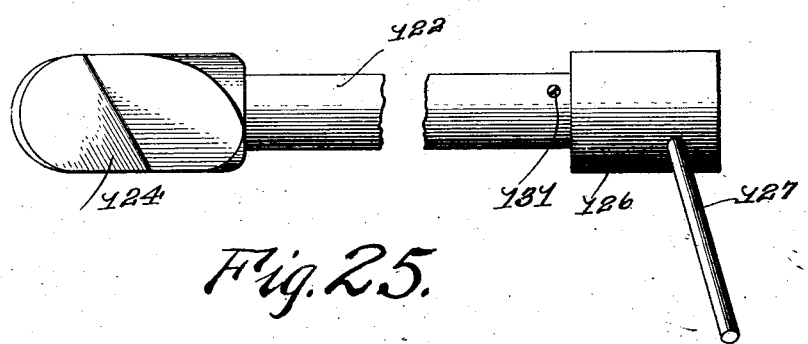

Feb. 22, 1927.

R. J. MITCHELL ET AL 1,618,303

MAILING DISTRIBUTING MACHINE

Original Filed March 9, 1918    21 Sheets-Sheet 14

Inventors
R. J. Mitchell,
Z. B. Babbitt,
Z. W. Alderman,

Feb. 22, 1927.

R. J. MITCHELL ET AL 1,618,303

MAILING DISTRIBUTING MACHINE

Original Filed March 9, 1918    21 Sheets-Sheet 15

Inventors
R. J. Mitchell,
Z. B. Babbitt, Z. W. Alderman,
By
Attorneys

Witnesses

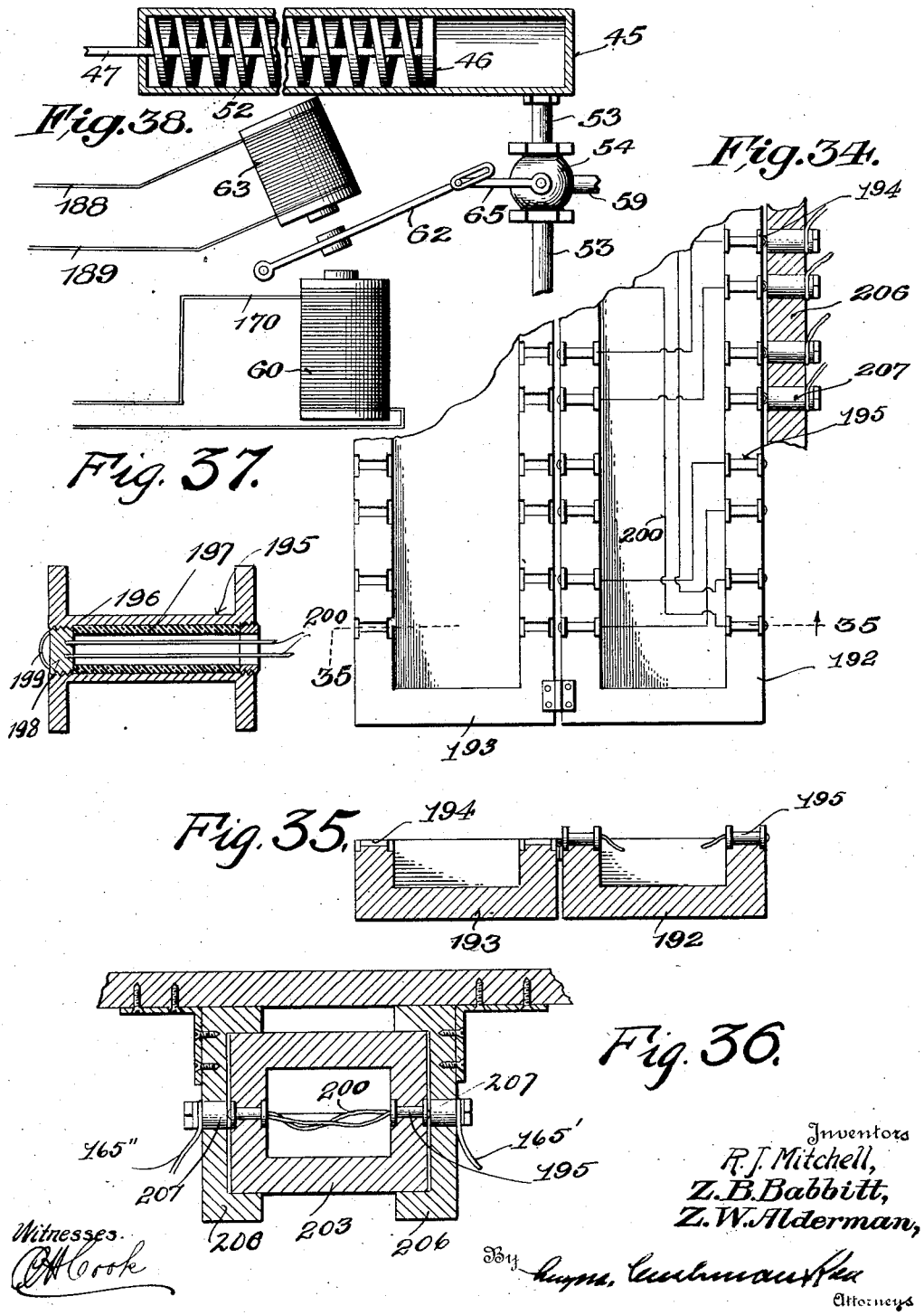

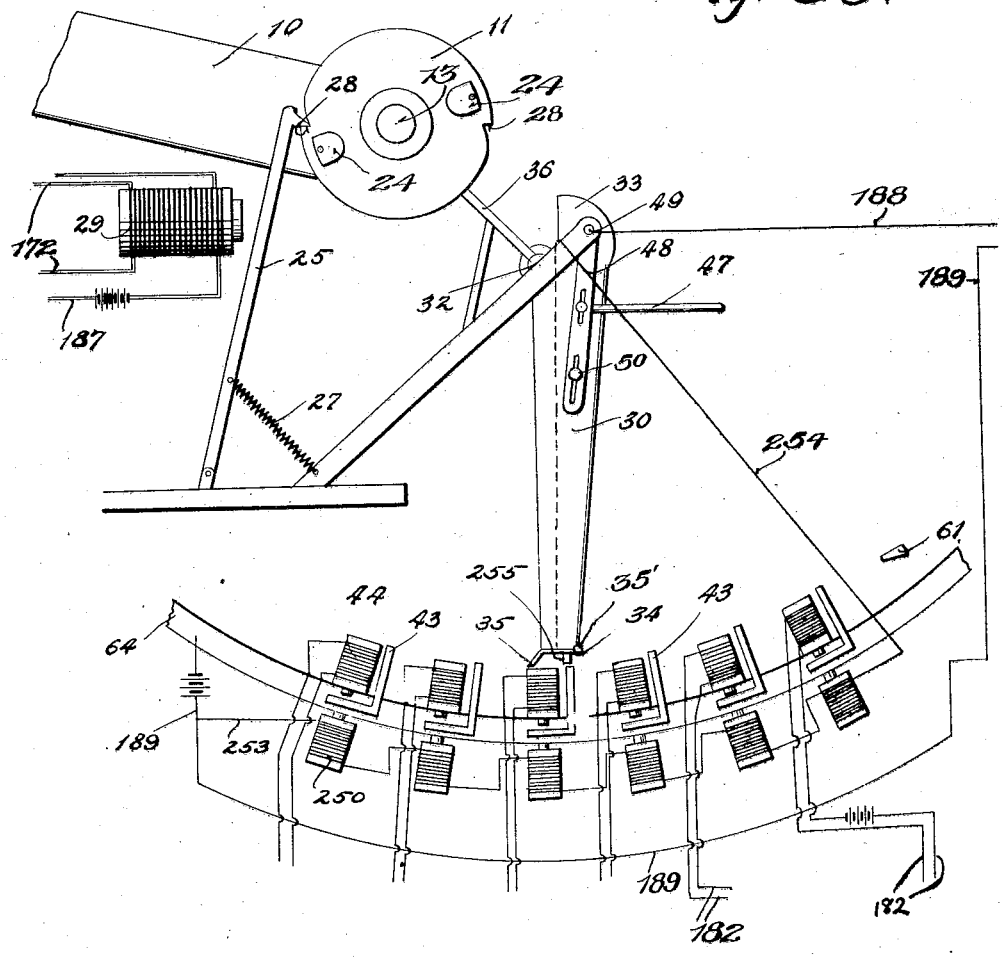

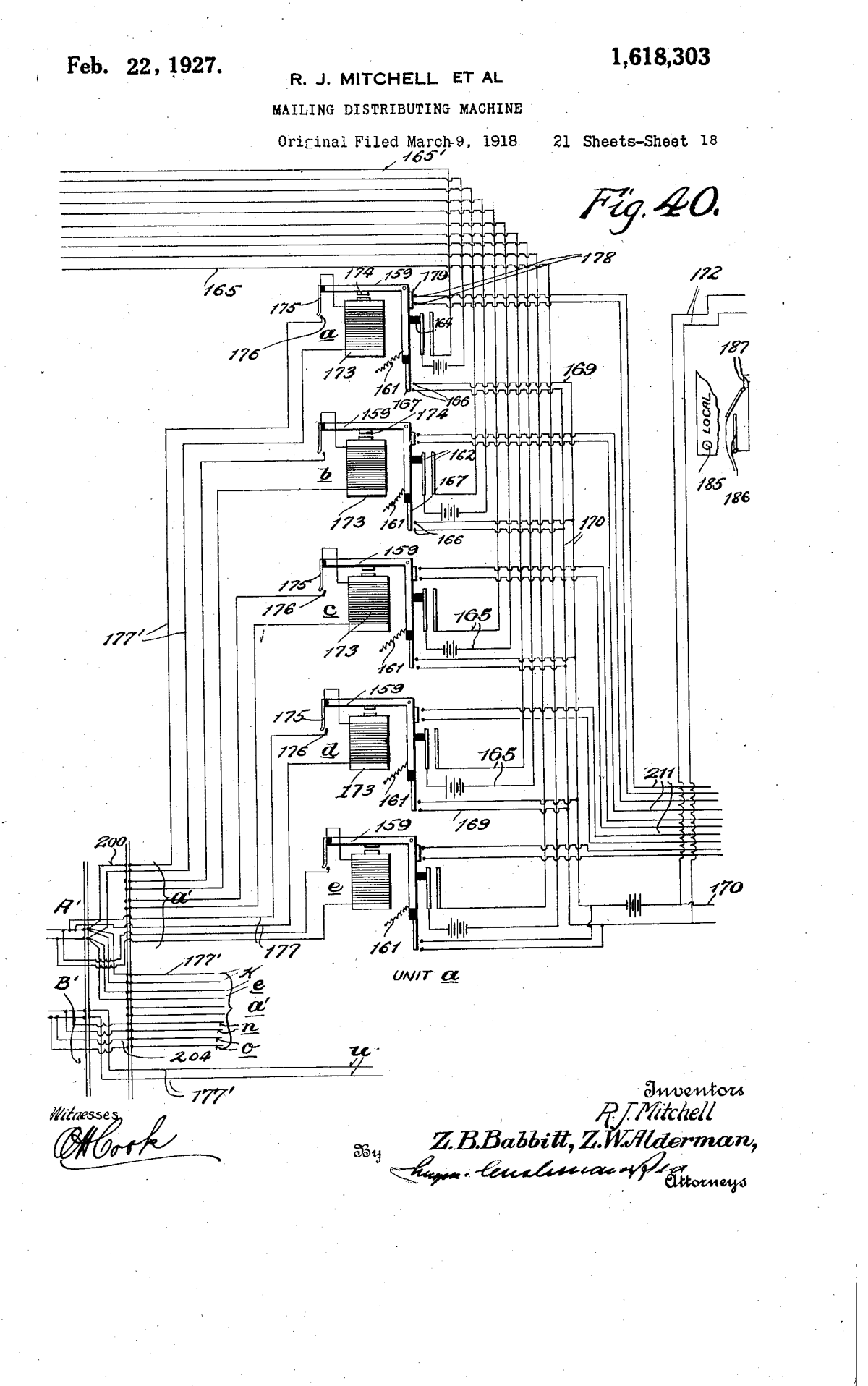

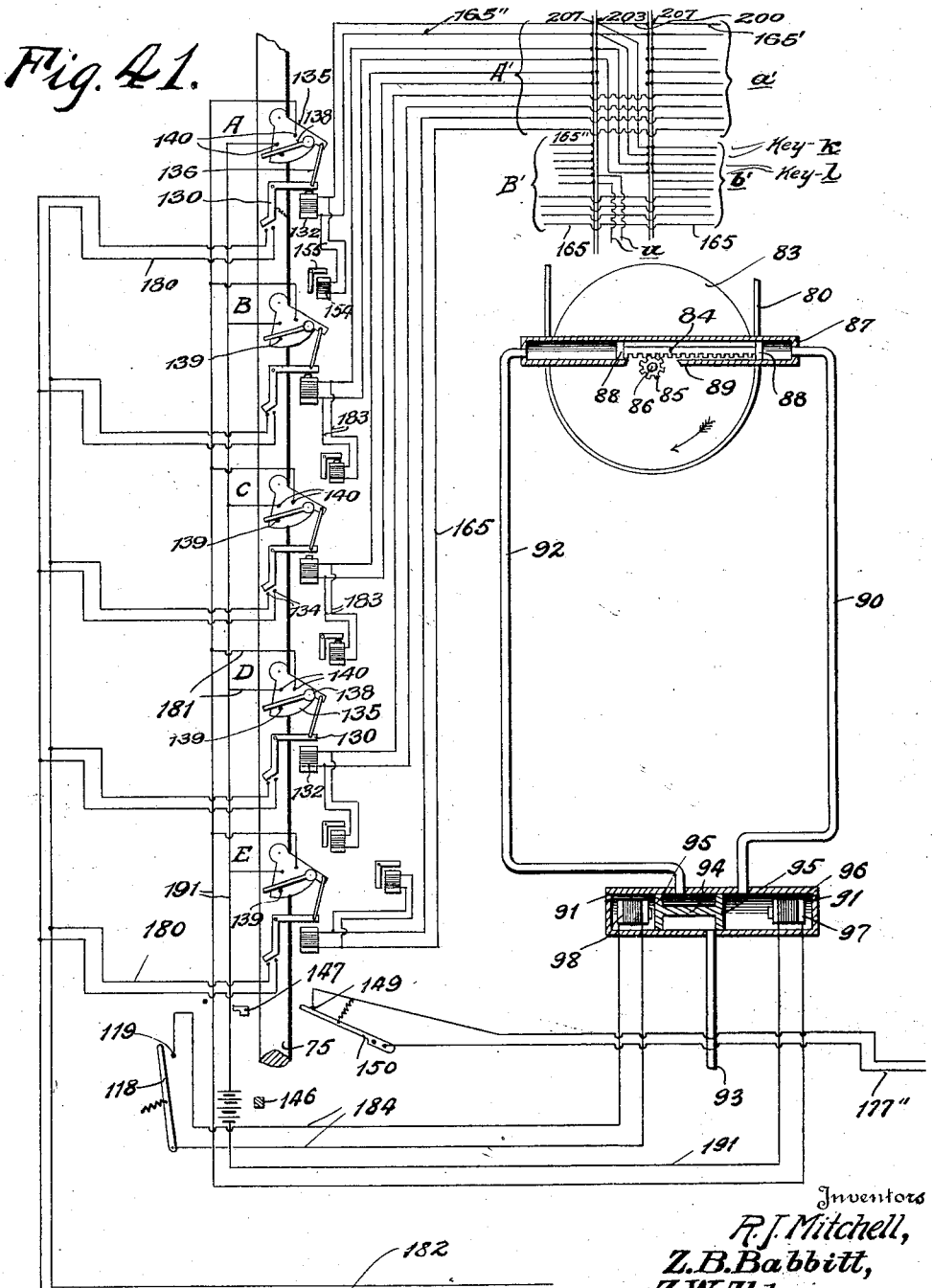

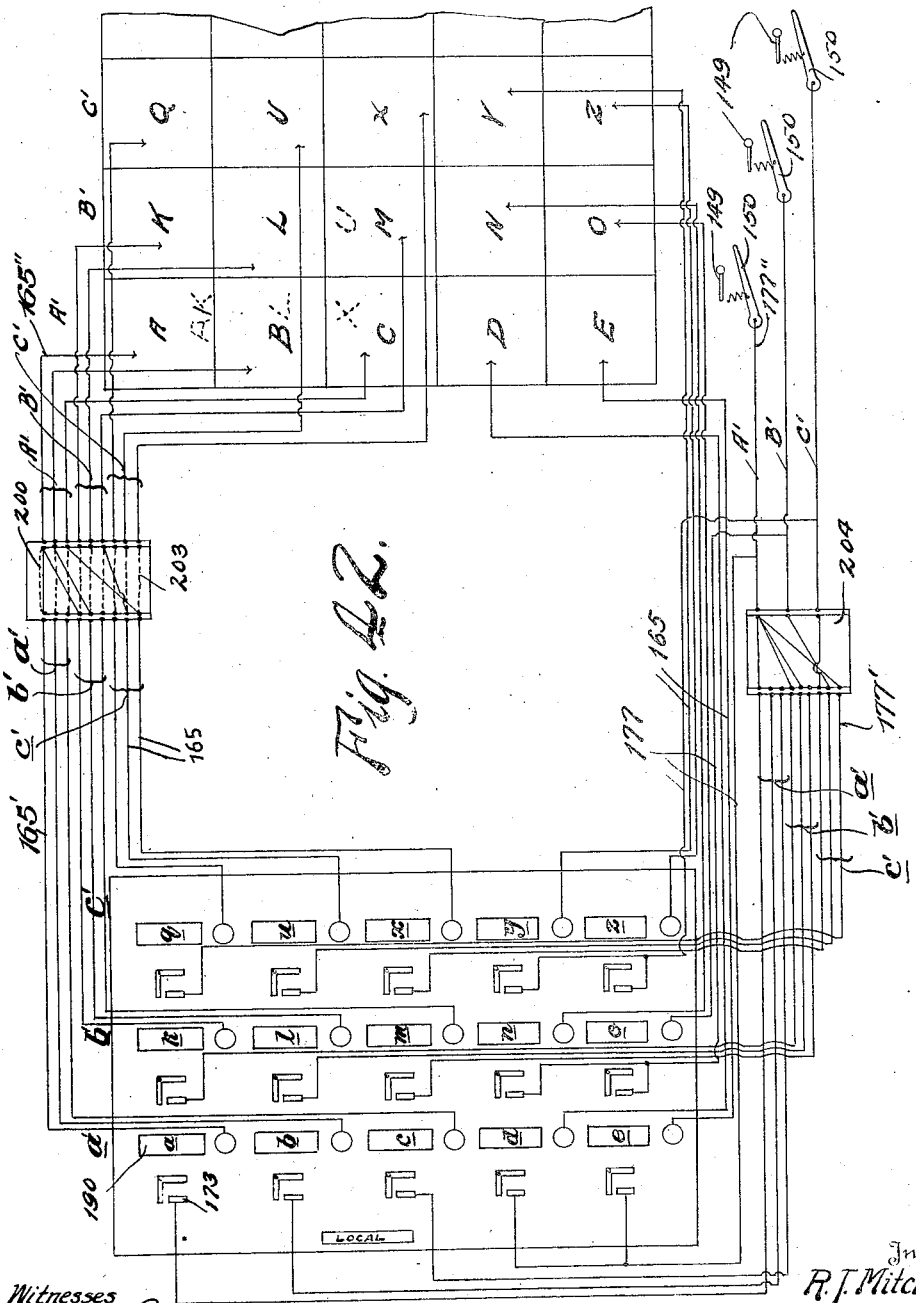

Feb. 22, 1927.

R. J. MITCHELL ET AL 1,618,303

MAILING DISTRIBUTING MACHINE

Original Filed March 9, 1918     21 Sheets-Sheet 21

Fig. 43.

Witnesses
OH Cook

Inventors
R. J. Mitchell,
Z. B. Babbitt,
Z. W. Alderman,
By
Attorneys

Patented Feb. 22, 1927.

1,618,303

UNITED STATES PATENT OFFICE.

ROBERT J. MITCHELL, OF BALTIMORE, MARYLAND, AND ZENO B. BABBITT AND ZENAS W. ALDERMAN, OF WASHINGTON, DISTRICT OF COLUMBIA, ASSIGNORS, BY MESNE ASSIGNMENTS, TO MITCHELL MACHINE COMPANY, OF WASHINGTON, DISTRICT OF COLUMBIA, A CORPORATION OF DELAWARE.

MAILING DISTRIBUTING MACHINE.

Application filed March 9, 1918, Serial No. 221,528. Renewed July 23, 1926.

This invention relates to mail distributing or assorting machines, wherein letters or other pieces of mail or similar matter are taken from a common source and selectively distributed in accordance with their addressed destinations to a plurality of points or receptacles.

In the present specification, I will refer to the matter distributed as "letters" for the purpose of brevity, but it is to be understood that this term is used in its broad sense, and includes circulars, various kinds of cards and sheets, and similar articles. It is understood, that while I refer to the present machine as a mail distributing machine, it may be used to distribute articles other than mail matter.

Under the present system, the routing and distribution of mail is carried out by operators or distributors who stand before a letter case having a number of boxes, receptacles or pigeon-holes and with the letters held in one hand with the addresses facing upwardly, the operator takes the letters singly and after reading their addresses places them in their respective pigeon-holes corresponding to their destinations.

The letters first undergo what is known in the postal service as the "primary separation", that is, the letters for the foreign countries, the several States of the United States and large cities of the world are placed in their respective pigeon-holes without reference to the routes by which they reach their destination. The packages of letters for the foreign countries and for those States not connected with the original office by more than one railway post office route are despatched without further handling. In this separation all letters having the same post office destinations are at all times placed into the same receptacle or pigeon-hole, so that the only requirements on the part of the distributor in this separation is that he be able to read the different post office addresses. The "city packages" are taken out and disposed of finally by the original post office.

The remaining letters are those which have been divided into "State packages." Each of these packages of letters now undergoes a "final separation", which is required for the reason that, in these instances, two or more railway lines run from the original office through the State the mail of which is routed, and it is necessary that each line be given that portion only which it or its connections can serve with greatest despatch. In finally separating the mail, packages are made up for the larger offices termed "direct". Where a number of offices are supplied through another office at a junction point, the letters going to these offices so supplied are assorted together and delivered to the post office of the "direct" city which distributes them to the surrounding offices by star or rural routes or over electric trains or the like.

The remainder of the mail for each State is assorted to be delivered to various railway post office routes passing through the particular State the mail of which is being routed and which bear the names of the initial and terminal cities of the runs irrespective of the railroad or railroads over which they travel.

A clearer way of describing the method of routing mail is given in the following example. The mail from Washington, D. C., is distributed to the State of Virginia by employing three of the main railroad lines: these lines being the Seaboard Air Line, the Atlantic Coast Line and Southern Railroad. The two former operate trains to and from Washington over the same tracks, and, therefore, the stations and offices thereon, are the same, for illustration, to Richmond. The Southern operates over a small portion of the same track and then branches off to the west. The first is called the Washington and Hamlet railway post office, the second, the Washington and Charleston, and the last, the Washington and Charlotte. A train departs over the Washington and Hamlet from Washington at nine-thirty p. m. for Richmond and the south, and all mail for delivery to post offices between Washington and Richmond is given to that train. The mail for the city of Richmond and for the offices supplied through Richmond have during the "final separation", been collected into two separate bundles. The letters for the small towns which have not sufficient population to warrant separate bundles, are collected into one or more mixed packages, and given to the railway post office clerk to distribute. This clerk immediately cuts these bundles and assorts the letters into pigeon-holes for delivery to the local towns or offices along his route or for connecting lines. No other train departs from Washington over that line until three a. m. At eleven p. m. a train departs over the Washington and Charlotte, and this train going south connects at Danville, Virginia, with a train going east to Richmond. Hence, after the nine-thirty Washington and Hamlet train departs and until the departure of the Washington and Charlotte train, mail to Richmond and the surrounding district is given to the Danville and Richmond train which reaches Richmond prior to the arrival of the three a. m. train from Washington over the Washington and Charleston railway post-office. Now supposing the Danville and Richmond train connects at Richmond with a train bound north for Washington leaving Richmond at three a. m. or the same time as the next south bound train leaves Washington, both traveling over the Washington and Charleston and Washington and Hamlet tracks; the train from both Washington (south bound) and from Richmond (north bound) are scheduled to meet at Fredericksburg en route. Then after nine-thirty p. m., the mail despatched from Washington is divided north and south of Fredericksburg, the latter portion being made up in a separate package and despatched to the Washington and Charlotte railway post office having a train leaving Washington at eleven p. m., and after that time all of the mail for Richmond and the post offices between Richmond and Washington is collected into a single package and despatched to the three a. m. train from Washington. It will be noted that the mail to be distributed by the railway clerk between Washington and Richmond is during certain periods of time, collected by the original office into a single package and at other times it is divided into two packages, each of which goes over different routes.

From the above description of the present system of routing mail, it will be seen that great skill and knowledge on the part of the operators or distributors is required; he must have an absolutely perfect knowledge of the exact location of every post office in every State he is routing and all supplying lines; he must keep in mind the schedule of each train leaving the post office station at which he is located and also all connecting lines. After the departure of each train he must remember that the mail for a certain destination or destinations which he has placed in one pigeon-hole up until the departure of the train, must now be placed into another pigeon-hole. As these changes are many, the distributor must be put through a long and difficult course of ardent study and only after years of experience can the distributor work with the necessary speed and accuracy to reach that degree of efficiency required of him.

It is to be noted, that a distributor is subjected to considerable mental as well as physical strain during the distribution and routing of the mail; he can not distribute the the mail into the pigeon-holes as quickly as he reads the addresses for the reason he must go through the operation of placing each letter face upwardly in its respective pigeon-hole, and the number of separations which he can make are limited, for if the number of pigeon-holes are increased to too great an extent, then considerable time is lost in the operator making the necessary movements to reach the more distant letter boxes or pigeon-holes. It is, therefore, necessary for each distributor to be limited to a given number of pigeon-holes or letter boxes, and this necessitates a second handling or re-distribution of the mail, and not infrequently a third and fourth re-distribution are necessary.

The present invention has for one of its objects, the provision of a machine for more expediently separating, assorting or routing the mixed letters into the proper sub-divisions; the machine being more efficient than hand separation or the machines heretofore devised, in that, a single operator may distribute the "letters" at a greater rate of speed with less physical fatigue and mental strain. Furthermore, a machine constructed in accordance with the present invention will take care of a greater number of divisions of the mail, and the necessity of re-handling the mail will be substantially eliminated.

A machine constructed in accordance with this invention is relatively simple in construction, is relatively compact and is relatively light in weight, all of which features are of value from a practical standpoint, in that, the machine may be constructed at a reasonable cost, the space in post office buildings is usually limited and the working floors of these buildings are not constructed to support great weight. Furthermore, by making the machine relatively compact, the assorted pieces of mail may be removed from the boxes or pigeon-holes into which they have been distributed with the greatest possible degree of dispatch.

A still further important advantage of the present invention is that it may be employed for routing mail without requiring on the part of the operator extensive experience and knowledge of the geographic location of every post office in the State in which he is routing, of the supplying railroad lines and the connections thereto, as well as the schedules thereof. As a matter of fact, a distributor may readily operate a machine of the present invention after a relatively short training with a far wider range of distribution than can now be maintained by hand distribution.

In the present invention, the machine is provided with a plurality of manipulative devices which are under the control of the operator for selectively placing the various parts of the machine into operation for the purpose of delivering the mixed letters from a common pile or source to a plurality of pigeon-holes. Each of the manipulative devices corresponds to or represents one or more of the particular cities or localities to which the mail is addressed, and in no instance, is any other than the particular key corresponding to the destination of the letter then being distributed to its pigeon-hole operated. The arrangement is such that the pigeon-holes or receptacles or some of the same, to which letters for a particular addressed destination are to be delivered may be changed at will, without affecting in any manner, the arrangement of the key-board. It is not necessary for the operator to memorize the routes over which the mail is to be delivered, as at present, for when a change in the routing of the letters is to occur, it is only necessary for the operator to change certain connections outside of the keyboard, (which may be quickly accomplished), so that the letter, whereas before the change was delivered to one box or pigeon-hole, upon actuation of its corresponding manipulative device, will now be delivered to another box upon actuation of the same manipulative device.

In order that the detail description which is to follow, may be understood, a general description of the machine and a general statement as to the functions performed by the several mechanisms will here be given.

The machine is provided with a support which holds a pile of mixed letters with their addresses all facing in the same direction and from this support the letters are taken singly and successively by a suitable take-off mechanism (comprising in part, in the present disclosure of our invention, a rotatable drum), which presents the letters to the view of the operator that he may readily discern the addresses thereon. Upon observing the address the operator actuates the proper manipulative device, (in the present instance, the key which bears or corresponds to the destination of the exposed letter), to set into operation an initial selective conveyor comprising a chute, differentially or selectively movable and under the control of selective stops. The chute delivers to any one of a plurality of channels, the particular channel to which it delivers, in any instance, being determined by the selective stops heretofore referred to, and each of these channels, excepting one channel which receives "local" mail from the chute, conveys the letters which it receives to that one of a series of final delivery conveyors with which it is associated. The pigeon-holes or receptacles which receive the letters are preferably arranged one on top of the other and in horizontal rows, it being desirable that the boxes be located side by side and with their open sides facing in the same general direction to follow the arrangement now generally employed in the post office service. Each of the vertical rows of boxes may be considered as separate units, and each of these units is associated with one of the final delivery conveyors referred to above. In the present disclosure, each of the final delivery conveyors comprises a differentially or selectively and vertically movable carrier which is under control of suitable selective stop devices which are actuated from the key-board, so that the carrier will stop at the proper box, deliver the letter or letters carried thereby to this box, and then return to its lowermost position to receive the next letter which is to be delivered to any one of the boxes of that unit. To deliver a letter from the common source to its respective box, it is necessary to actuate but a single manipulative device, and the actuation of this device or key will automatically set into motion the several mechanisms in their proper sequence.

Preferably there are, at least, as many manipulative devices or keys as there are boxes, so that each box will have a corresponding key, although, of course, where all of the boxes or pigeon-holes are not in use, the number of keys may be reduced. It is not intended, however, that the initial selective delivery mechanism be always actuated to the same extent or that the same final selective delivery conveyor be actuated by the same key for, as above stated, it is often desirable to meet the requirements that the letter reach its addressed destination with the greatest dispatch, that the letter be delivered at one time to one box, and at another time to another box.

For the purpose of changing the routing of the letters in the machine, as for delivering two or more letters having different addressed destinations, which in some instances would be delivered to separate boxes, to the same box we provide suitable switch mechanism for interchangeably connecting the several keys with the several delivery mechanisms.

With these objects in view, the invention consists of several novel features of construction and combinations of parts, the essential elements of which are set forth in the appended claims, one form of which, is illustrated in the accompanying drawings which form a part of this specification.

In said drawings:

Figure 11 is an enlarged detail view taken horizontally through the lower end of the delivery chute and shows the selective stop casing partly in plan and partly in section.

Figure 12 is a side view looking towards the casing containing the selective stop mechanisms for the delivery chute, the near side of the casng being partly broken away and the sides or walls of the channels there beneath being shown in cross section.

Figure 12$^a$ is a sectional view taken on line 12$^a$—12$^a$ of Figure 11.

Figure 13 is a longitudinal sectional view through one of the pneumatic devices which operates the final delivery mechanisms.

Figure 14 is a sectional view taken on the line 14—14 of Figure 13.

Figure 15 is a sectional view taken on the line 15—15 of Figure 13.

Figure 16:
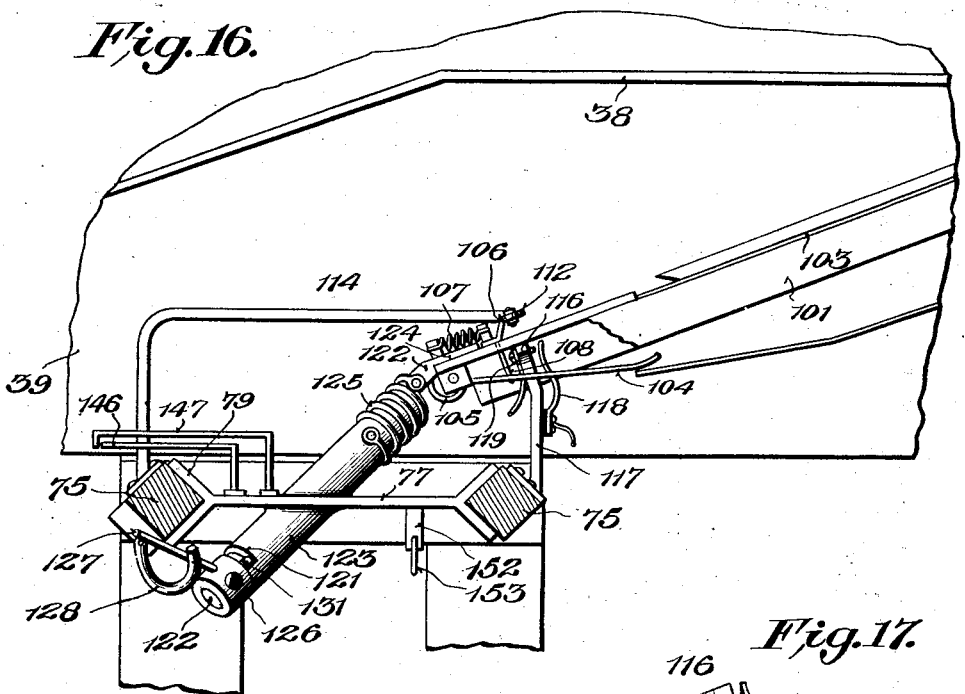

Figure 16 is a detail view taken horizontally through one of the final delivery mechanisms and shows the carrier with which each of these mechanisms is provided, in edge elevation, a part of the carrier being broken away to more clearly show its structure.

Figure 17:
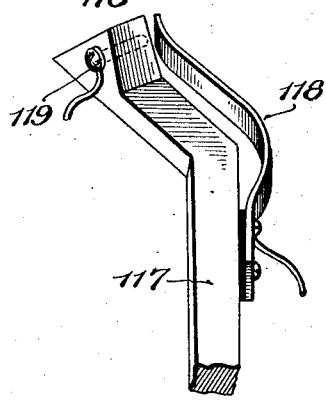

Figure 17 shows a letter actuated switch mechanism, and

Figure 18:
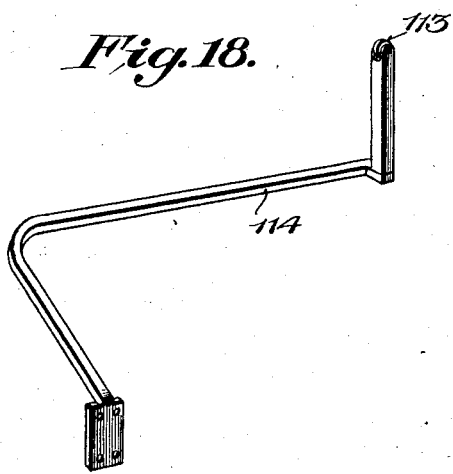

Figure 18 is a perspective view of an arm which co-acts with the carriers in the manner hereinafter described.

Figure 19 is a front or top elevational view of the carrier with which each of the final delivery mechanisms is provided.

Figure 20 is a rear or bottom elevational view of one end of the same.

Figure 21:
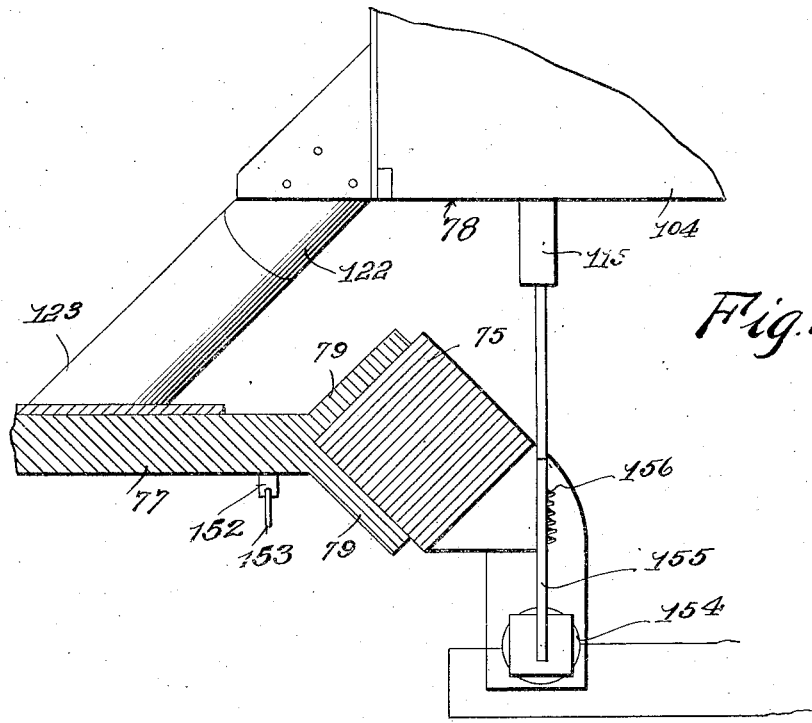

Figure 21 is a sectional enlarged view through a portion of one of the final delivery mechanisms and shows the means for tripping the carrier to discharge a letter therefrom.

Figure 22:
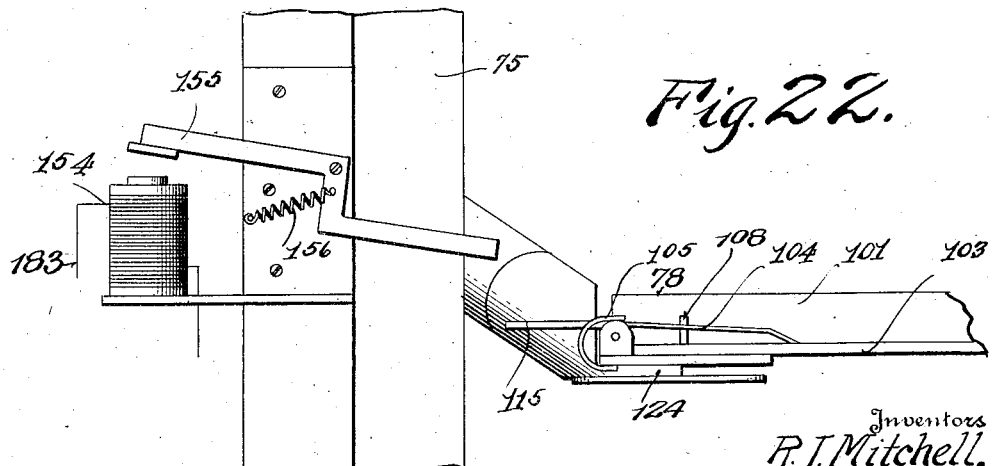

Figure 22 is a side elevational view of the mechanism shown in Figure 21.

Figure 23 is a detail view showing in elevation the means for rotating the carrier.

Figure 24 is a side elevational view of the cam for rotating the carrier.

Figure 25 is an elevational view of the spindle upon which the carrier is mounted.

Figure 26 is an enlarged view of the left hand end of the spindle shown in Figure 25 and taken at a different angle therefrom.

Figure 27:
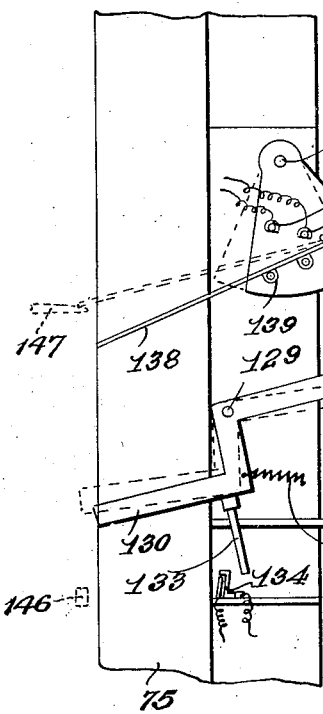

Figure 27 is an elevational view of one of the several selective switch mechanisms and stops with which each of the final delivery mechanisms is provided for differentially limiting the movement or extent of travel of the carriers of the final delivery conveyors.

Figure 28:
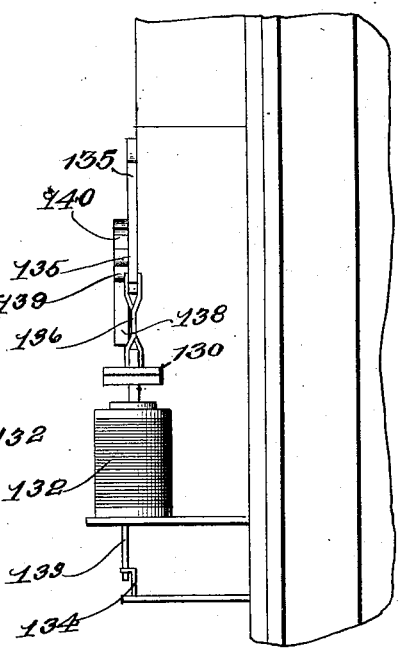

Figure 28 is an elevational view taken at right angles to that of Figure 27.

Figure 29:
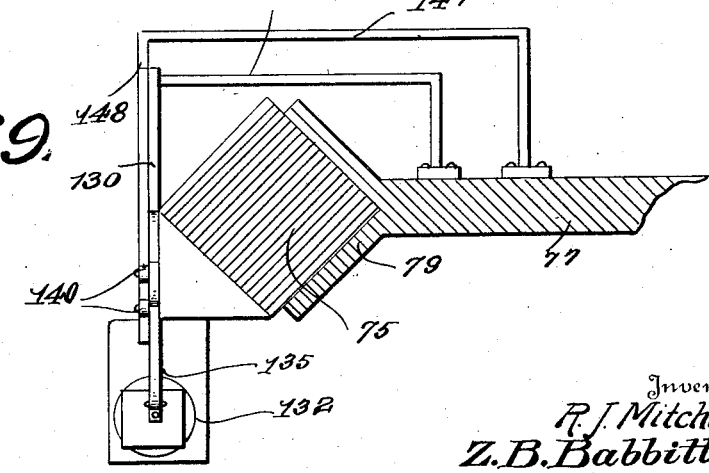

Figure 29 is a sectional view through a portion of one of the final delivery mechanisms and shows the parts illustrated in the two previous figures in top plan view.

Figure 30:
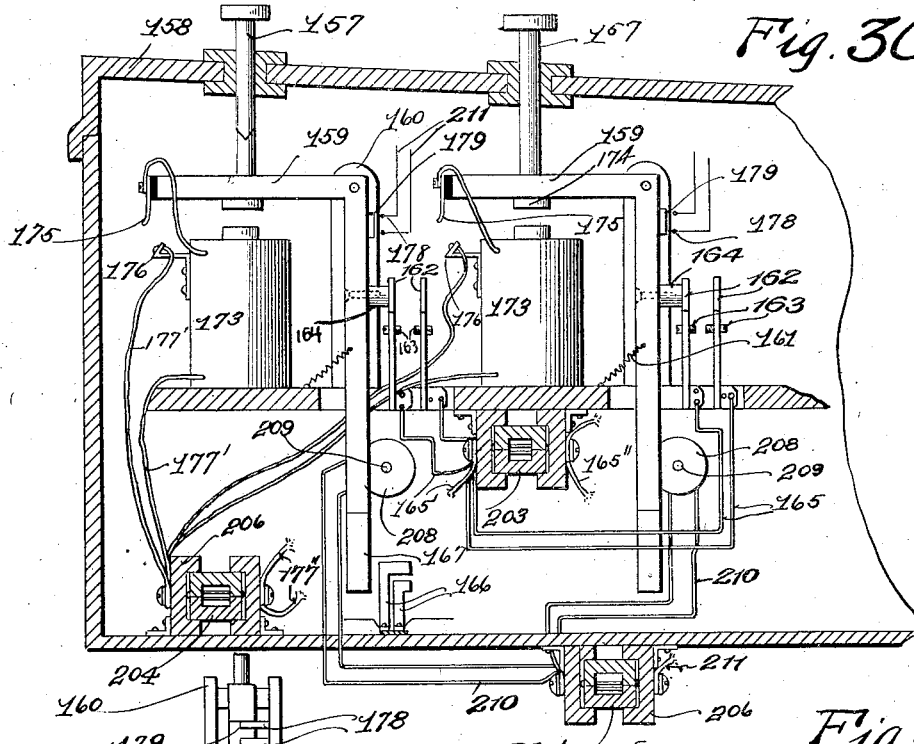

Figure 30 is a sectional view through a portion of the key-board.

Figures 31, 32:
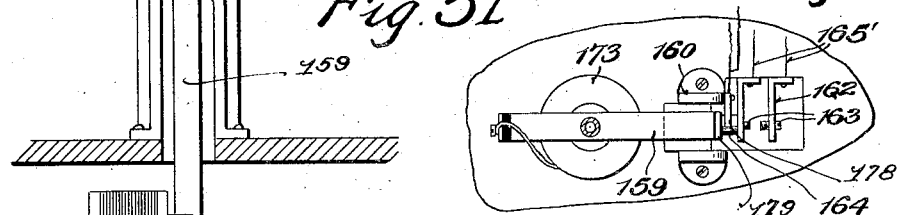

Figure 31 is a sectional view through the key-board taken at right angles to the line on which Figure 30 is taken.

Figure 32 is a plan elevational view of one of the manipulative devices.

Figure 33:
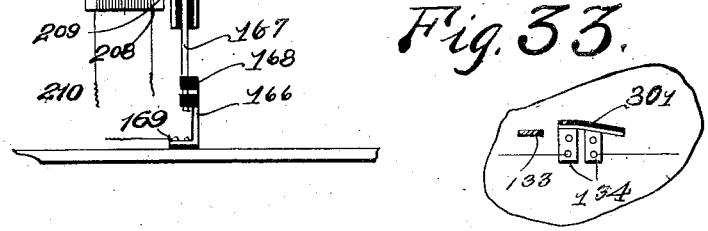

Figure 33 is an enlarged detail view of one of the switches controlled by the stop shown in Figures 27 and 28.

Figure 34 is an inside view with the cover thrown back, of one of the switch boxes for electrically connecting the manipulative devices with the several delivery mechanisms.

Figure 35 is a sectional view taken on line 35—35 of Figure 34.

Figure 36 is a transverse sectional view through one of the switch or route boxes shown in position attached to the key-board.

Figure 37 is a sectional view through one of the terminals of the switch box.

Figure 38 is a diagrammatical view of the means for moving the initial delivery chute.

Figure 39 is a diagrammatical view of the take-off mechanism and the initial selective delivery mechanism.

Figure 40 is a diagrammatical view of one of the units of manipulative devices or keys, together with the electric wiring connected thereto.

Figure 41 is a diagrammatical view of the control mechanism of one of the final delivery mechanisms, and this figure, together with Figures 38, 39 and 40 from a complete diagram showing conventionally most of the operative parts of the machine, together with the manner of electrically connecting the same.

Figure 42 is a diagrammatical view, showing graphically the relation between the manipulative devices and the letter receiving boxes or pigeon-holes.

Figure 43 is a diagrammatical view of a lock out mechanism for rendering certain of the keys inoperative when one of the keys has been actuated.

In the drawings, like numerals represent like parts in the several views. In these drawings, 10 designates a support for the mixed letters, and in the present instance, this support is shown more or less conventionally, as it may be of any suitable construction. If desired, it may be adjustable and it may be located in close proximity to a cancelling machine, so as to receive the letters as they are delivered therefrom. The letters are placed upon the support substantially vertically with their addresses facing all in the same direction and away from the operator.

Figure 6:
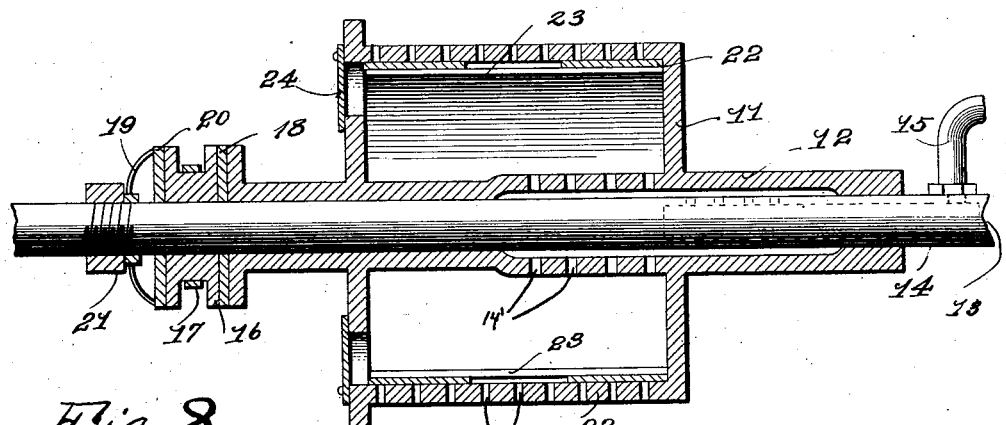
Figure 6 is a longitudinal sectional view through the drum of the take-off mechanism.
Figure 8:
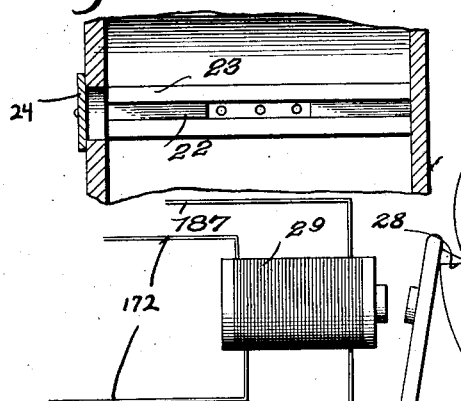
Figure 8 is a detail view of a section of the interior surface of the drum and shows one means whereby the number of holes, through which the air is drawn to suck the letters against the drum, may be limited.
Figure 7:
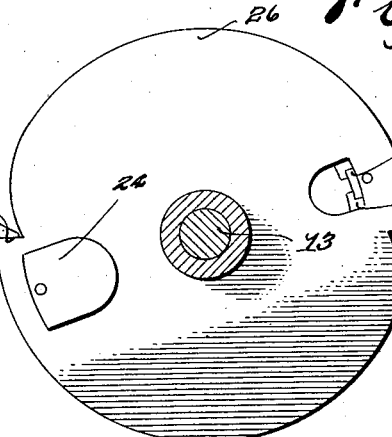
Figure 7 is a side elevational view of the take-off drum together with the trip mechanism for limiting the drum to a step by step movement.

The letters are taken singly and successively from the support by a suitable take-off mechanism which presents the letters with their addressed faces towards the operator so that he can readily discern the same. This take-off mechanism may be of any suitable construction, but in the present illustrative disclosure of our invention, we have shown the same as comprising, in part, a rotatably hollow drum 11 carried by a hollow spindle 12 which surrounds a fixed shaft 13. The circular wall of the drum is provided with rows of openings, in the present instance, two diametrically opposite rows being illustrated, but it is of course understood that the number of rows may be varied as desired and four, if found preferable, may be employed. The spindle 12 within the drum 11 is also perforated to permit communication through suitable openings in the fixed shaft 13 with a hollow portion or chamber 14, of this shaft. The chamber, shown in dotted lines in Figure 6, is connected by means of a pipe 15 with a suitable suction device, the latter not being shown, as it may be of any suitable construction. For the purpose of rotating the drum 11, we mount loosely upon the shaft 13, a pulley 16, which is connected up with any suitable driving device, (not shown) by means of a belt 17. Between the pulley 16 and the flared end of the spindle 12 is provided a friction washer 18 of any suitable material and for the purpose of maintaining the pulley against this washer 18 with sufficient force to cause rotation of the drum 11 when the latter is free, we provide a member 19 having spring arms bearing against a washer 20 which abuts the pulley 16 and the tension of these spring arms is varied, as desired, by means of nuts 21 threaded upon the fixed shaft 13.

For the purpose of permitting the take-off mechanism to remove letters of different sizes from the support and to prevent in certain cases, the removal of more than one letter at a time from the support, as in instances where the first letter on the letter support 10 is a short one and the next is a long one, we provide means for closing off some of the through openings in the walls of the drum. This means, may of course be varied as desired, but for illustrative purposes, it may comprise slides 22 mounted in guide ways 23 on the inner circumference of the drum and these slides may be removed from the drum or adjusted therein through an opening in the end of the drum which is normally closed by a door 24. The slides 22 are made in sections. When the machine is operating on short letters, the openings at one end of the drum are open and the remaining openings are closed, while in case the machine is operating on longer letters, it is preferable that the more central openings be opened and the side openings closed. In case the machine is operating on unusually heavy mail, such as circulars or the like, which are of substantial length, then all of the openings may be uncovered.

For the purpose of limiting the drum to a step by step movement, we provide a suitable trip mechanism comprising in the present instance, a pivoted trip 25 which is normally held in engagement against a flange 26 of the drum 11 by means of a spring 27. The flange 26 is provided with notches 28 which are so formed that the free end of the trip will engage therein when the notches are brought opposite thereto. The trip 25 is under the control of a magnet 29 which is connected up to all of the manipulative devices so that upon actuation of any one of these manipulative devices or keys, the trip will be withdrawn so as to release the drum and permit of a partial rotation thereof.

The switch mechanism for throwing the magnet 29 in and out of operation is such that the magnet 29 is only momentarily energized, so that immediately after the current is made, it is again broken to permit the trip, under tension of the spring 27, to again engage the flange 26.

From the arrangement of take-off mechanism just described, it will be seen that the drum 11 is so arranged that when the trip 25 is maintaining the drum stationary, the foremost letter in the support 10 is drawn against the outer circumference of the drum, a state of reduced pressure always being maintained within the drum by drawing the air therefrom through the openings in the spindle 12, the chamber 14 in the fixed shaft 13 and the pipe 15 leading to the suction device. The pulley 16 rotates continuously so that when the trip 25, under influence of the magnet 29, is withdrawn from one of the notches 28, the friction between the pulley and the spindle 12 will cause the drum to rotate carrying with it the letter pneumatically held against its outer perimeter, and the drum in the present instance will be rotated through an angle of 180° to bring the letter with its addressed face opposite or immediately in front of the operator of the machine. The drum is stopped in this position due to the fact that the trip is again in engagement with the periphery of the flange 26 so that when the next notch 28 comes into a proper position, it receives the free end of the trip.

The initial selective conveying means comprises, in part, in the present instance, a chute 30 which is differentially or selectively movable so as to deliver to one of the selective channels which carries the letter to the proper final conveying mechanism. By the term "differentially movable" is meant that the chute has a variable stroke whereby it moves over any selected channel. The chute 30 is pivotally carried by a shaft 32 located in front of and somewhat below the axis of the drum with which it is in parallelism. The chute is closed on all four sides and at its upper open end it has at its outer side an upwardly extending nose or hopper portion 33 which is employed to insure the proper delivery of the letters from the take off drum 11 to the chute irrespective of the angular position of the latter. The chute at its lower end, is provided with a door 34 normally maintained closed by means of a spring and this door has at its forward end, a forwardly and laterally extending and downwardly inclined finger 35. Bridging the space between the drum 11 and the open mouth of the chute 30 is a plate 36 which strips the letter off of the drum 11 and delivers it into the chute when the drum 11 is rotated. It is, of course, understood that the construction and mounting of the chute 30 and the arrangement of the door 34 may be varied, as desired.

As stated above, the chute 30 delivers to a plurality of channels, these channels being designated by the numerals 37. The channels are formed by boards 38 placed on edge in parallelism with each other over an endless belt 39 which passes over pulleys 40. As clearly seen from Figure 1, each of the channels, except the first channel 37ª, terminates at its respective final conveying mechanism, the outermost channel being associated with the first final conveyor, the next channel with the second conveyor, and so on. Each of the channels is deflected at its delivery end towards its final conveyor mechanism as at 41. The belt 39 extends the full length of the machine and is equal in width to the aggregate widths of the channels 37.

The chute 30 is differentially movable and is selectively controlled by means of suitable stops located within a casing 42 extending transversely of the channels and preferably located immediately adjacent the lower end of the chute 30. Each of the stop mechanisms, one for each channel being provided, comprises a stop or armature 43 and a pair of oppositely disposed electro-magnets 44 and 250. It is, of course, obvious, that the casing 42 and the stops 43, together with the arrangement of the magnets within the casing may be varied as desired, but for illustrative purposes, we have shown, in the present instance, the electro-magnets 44 and 250, of each pair as being in alignment with each other and extending longitudinally over the channels 37.

If desired, the magnets may be located within recesses provided within the casing 42. The opposed ends of the magnets of each pair are spaced apart and located in the channel and provided between the ends of these magnets is a bus bar 64. The stops 43, in the present instance, are shown as being of L-shape and one leg of each of the stops is located over and in contact with the bus bar between the ends of the opposed magnets. The other leg of each stop is located within a groove 251 adjacent and extending longitudinally of the magnets 44 and 250. The side wall of the casing 42 is provided with openings 252 through which the ends of the stops 43 may project into the path of travel of the chute 30.

Each of the electro-magnets 44 is electrically connected to all of the selective stop mechanisms of that final conveyor which is associated with the same channel 37 as is the particular stop 43, as will be more clearly hereinafter described. All of the magnets 250 are connected in series with each other and with the stops 43, the bar 64 and a contact 255 on the chute 30, as will be hereinafter explained. When any one of the magnets 44 is energized, it causes the stop 43 associated therewith to move outwardly of the casing 42 and into the path of travel of the chute 30. When any one of the magnets 250 is energized, it withdraws the stop associated therewith from projecting position and into normal or withdrawn position.

For the purpose of swinging the chute about its pivotal point, a pneumatically operated device is provided which comprises, in part, a cylinder 45 within which is mounted a piston 46 connected to a stem or piston rod 47 which in turn is connected at its outer end, by means of a pin and slot connection, to the link 48 pivoted at its upper end to a fixed support 49 and connected at its lower end to the chute by means of a pin and slot connection 50. The piston 46 within the cylinder is normally forced inwardly thereof by means of a coil spring 52, so as to normally maintain the chute 30 in such position that the lower end thereof is immediately above the outermost channel.

This outermost channel designated by the numerals 37ª, is adapted to discharge direct into a receptacle, such as a box, 51, (Figure 1) and does not deliver to any one of the final conveying mechanisms. This channel is adapted to receive all pieces of mail which are not to be or can not be routed, such for instance, as local city mail, mail bearing no address or unintelligible addresses, or no stamp or the like. The discharge end of this chute 30 is preferably located normally immediately over this channel for the reason that a large percentage of the mixed letters are to be delivered to this channel, it being usual that about half of the mail is for local distribution.

It may be remarked that the door 34 of the chute 30 is maintained in open position when the chute is over the channel 37ª, by means of a stationary abutment or stop 61. This stop is so disposed as to engage the finger 35′ and open the door 34 each time the chute 30 returns to normal position, so that it is not necessary to connect the stop 61 with a manipulative device. To cause a letter to be delivered from the drum 11, through the chute 30 to the channel 37ª, it is only necessary to set the drum into rotation and for this purpose a special "local" key is provided on the key-board, as will be later explained.

The space within the cylinder 45 behind the piston 46 is provided with a pipe connection 53 having a two-way valve 54 (Figures 9 and 10) which comprises a casing 55 within which is mounted a rotatable plug 56 having a through straight opening 57 and an opening 58, the branches of the second opening being at right angles to each other. The casing has a discharge pipe 59 through which the air behind the piston exhausts when the plug 56 is in such position that the opening 58 therein registers with the pipe 53 and the opening 59. When the plug is in the position shown in Figure 10, air is admitted from a suitable pressure device (not shown) through the plug to the space behind the piston thereby causing the piston to move outwardly and swing the chute to the left, referring to the several figures in which the chute is illustrated.

The plug 56 is rotated in one direction to admit air to the chamber 45 and in the other direction to permit the air to exhaust by electric means comprising a pair of oppositely disposed magnets, one of these magnets 60 being electrically connected with all of the manipulative devices or keys, and the other magnet 63 being in circuit with the delivery chute 30 and the bus bar 64 with which the various stops 43 are in electrical connection. As clearly seen from Figures 10 and 11, the bus bar 64 lies immediately beneath the armatures 44, so that all of these armatures, at all times, are in contact therewith. The magnets 60 and 63 co-operate with an armature 62 consisting of a pivoted lever extending between the magnets. The free end of the lever 62 is connected by means of a pin and slot connection with an arm 65 located externally of the valve casing 55 of the two-way valve and connected to the plug 56 thereof.

Figure 9:
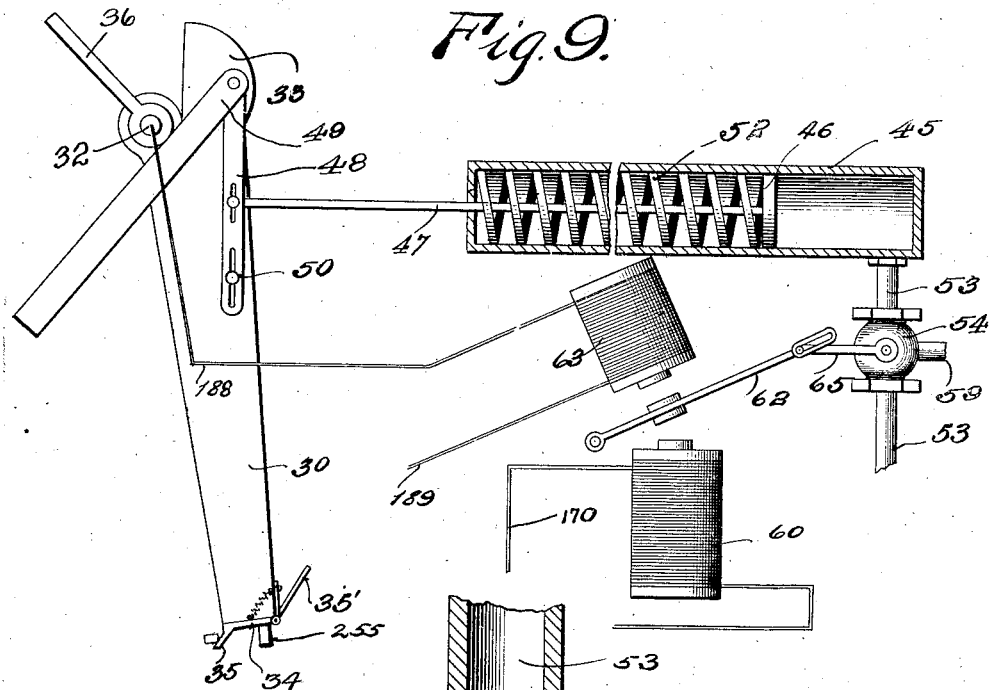
Figure 9 is a side elevational view of the differentially movable delivery chute together with the mechanism for moving same, a portion of the latter being in cross-section for purposes of clearness.
Figure 10:
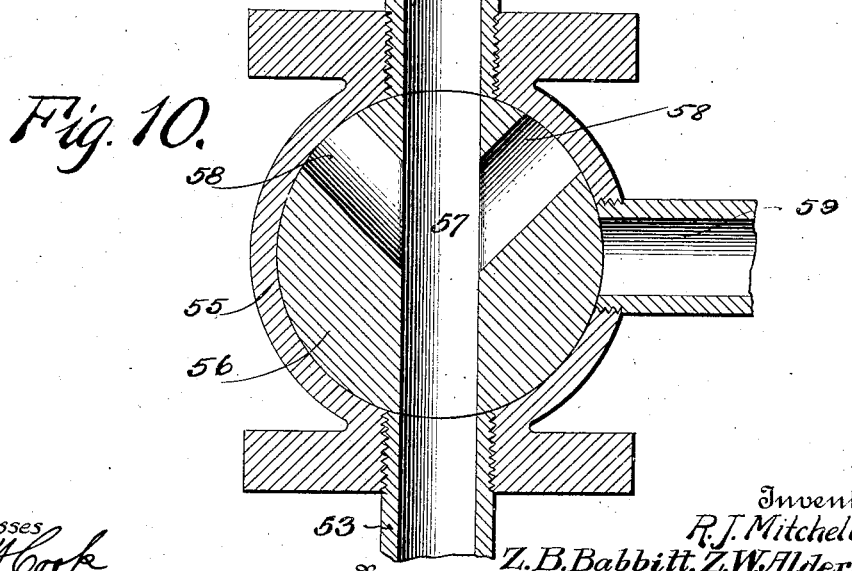
Figure 10 is a sectional view of a two-way valve which controls the admission of fluid pressure to and from the pneumatic means for actuating the chute illustrated in Figure 9.

With the arrangement just described for initially and selectively delivering letters to the channels 37, upon actuation of one of the manipulative devices, the particular device manipulated corresponding, of course, to the address appearing on the exposed letter on the drum 11, the lever 25 is tripped and the drum is rotated which carries the exposed letter on to the wiper plate 36 which strips the letter from the drum and delivers it to the chute 30. Simultaneously the proper magnet 44 of the selective stops has been momentarily actuated so as to move the proper stop 43 outwardly into the path of travel of the chute. The magnet 60 has also been momentarily energized and it attracts the armature lever 62 to turn the plug 56 into the position shown in Figure 10, and admit air pressure behind the piston 46 to thereby differentially move the chute 30 to its selective position. When the chute 30 is swung over the channels 37, the actuated stop or armature 43 engages the finger 35 of the door 34, as shown in Figure 9, and swings the door into open position, and when the contact 255 has been brought into engagement with this stop further movement of the chute 30 is prevented. When the chute 30 or the door thereof, strikes the actuated selective stop 43, the circuit is momentarily closed through the chute 30, the bar 64 and the magnet 63, whereupon the latter is energized to attract the lever 62 and turn the plug 56 to bring the opening 58 into registry with the pipe 53 and pipe 59.

This permits the spring 52 to force the piston 46 inwardly of the cylinder 45 and move the chute 30 into its initial position over the "local" channel 37ᵃ. Substantially at the same time, a circuit is closed through the contact 255 of chute 30, the stop 43 with which it is in contact, the bus bar 64 and the magnets 250 so as to withdraw the actuated stop from its projecting position.

The pigeon-holes or boxes into which the letters are finally delivered are arranged in units, the boxes of each unit being preferably superimposed one above the other. The various units of the boxes are designated by the letters A′, B′, C′, et cetera, and the pigeon-holes themselves are designated by the numerals 66. Each unit of boxes is formed of two sides 67 and transverse plates or boards 68 inclined downwardly from the front of the boxes and forming the floors of the pigeon-holes. The back of each pigeon-hole is normally closed by a spring pressed door 69, so as to permit ready removal of the letters which accumulate in the pigeon-holes. Each unit of boxes is inserted between vertical, rectangular hollow guards 70, which enclose the rear runs of the endless belts or chains of the final conveying mechanism, to be hereinafter described. The guards have on their side walls horizontally disposed slots or groove ways 72 which receive correspondingly disposed cleats 73 fixed to the external surfaces of the sides 67 of the boxes.

Extending between the guards 70 and secured to the front faces thereof, are sheets 74 having rectangular openings 71, the sheets being so disposed relative to the boxes or pigeon-holes 67 that the portions of the sheets between the openings partially close off the front of the boxes and the openings 71 are located above the floor of the boxes and through these openings the letters are delivered.

Figure 3:
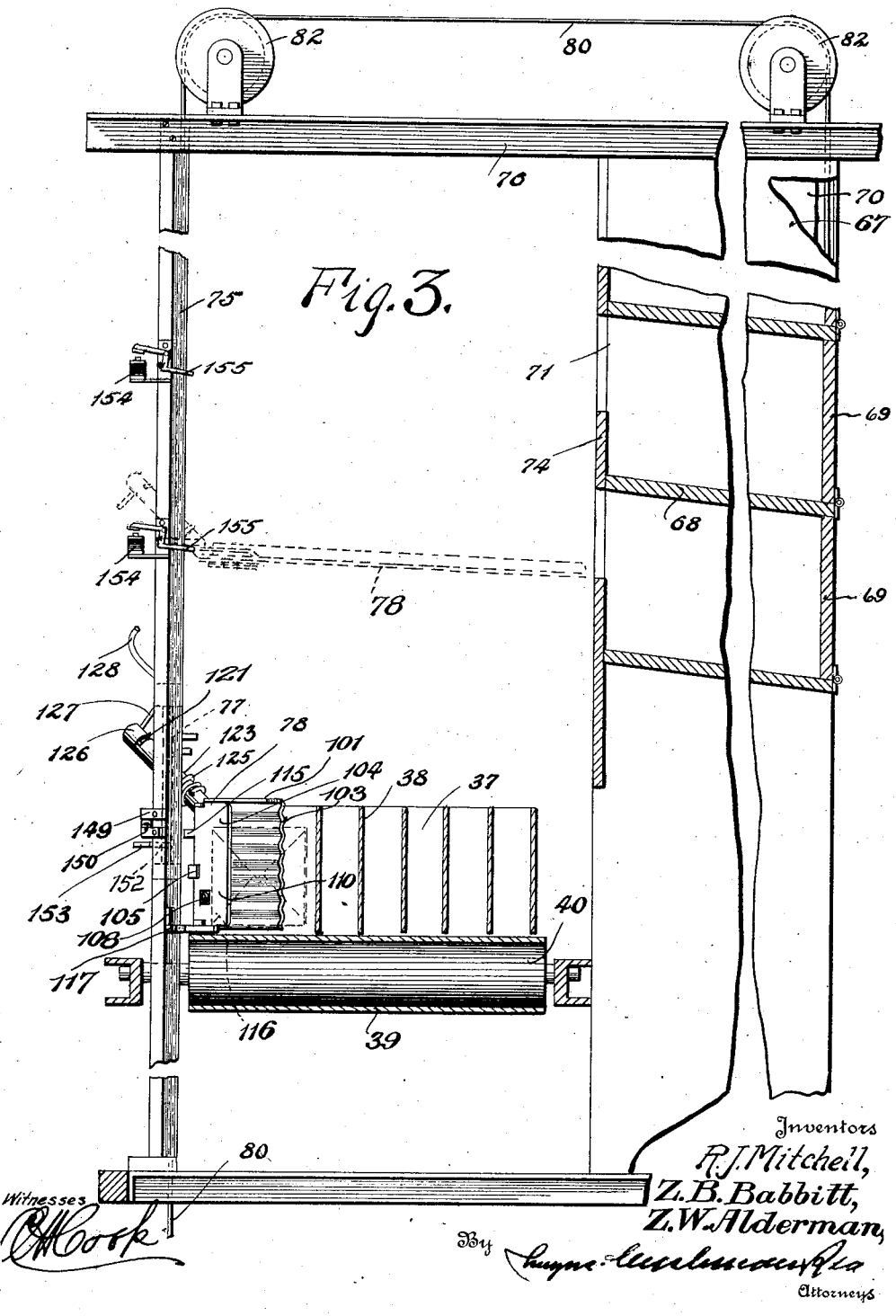
Figure 3 is an enlarged detail view similar to Figure 2 but omits the lower portion of the machine.
Figure 4:
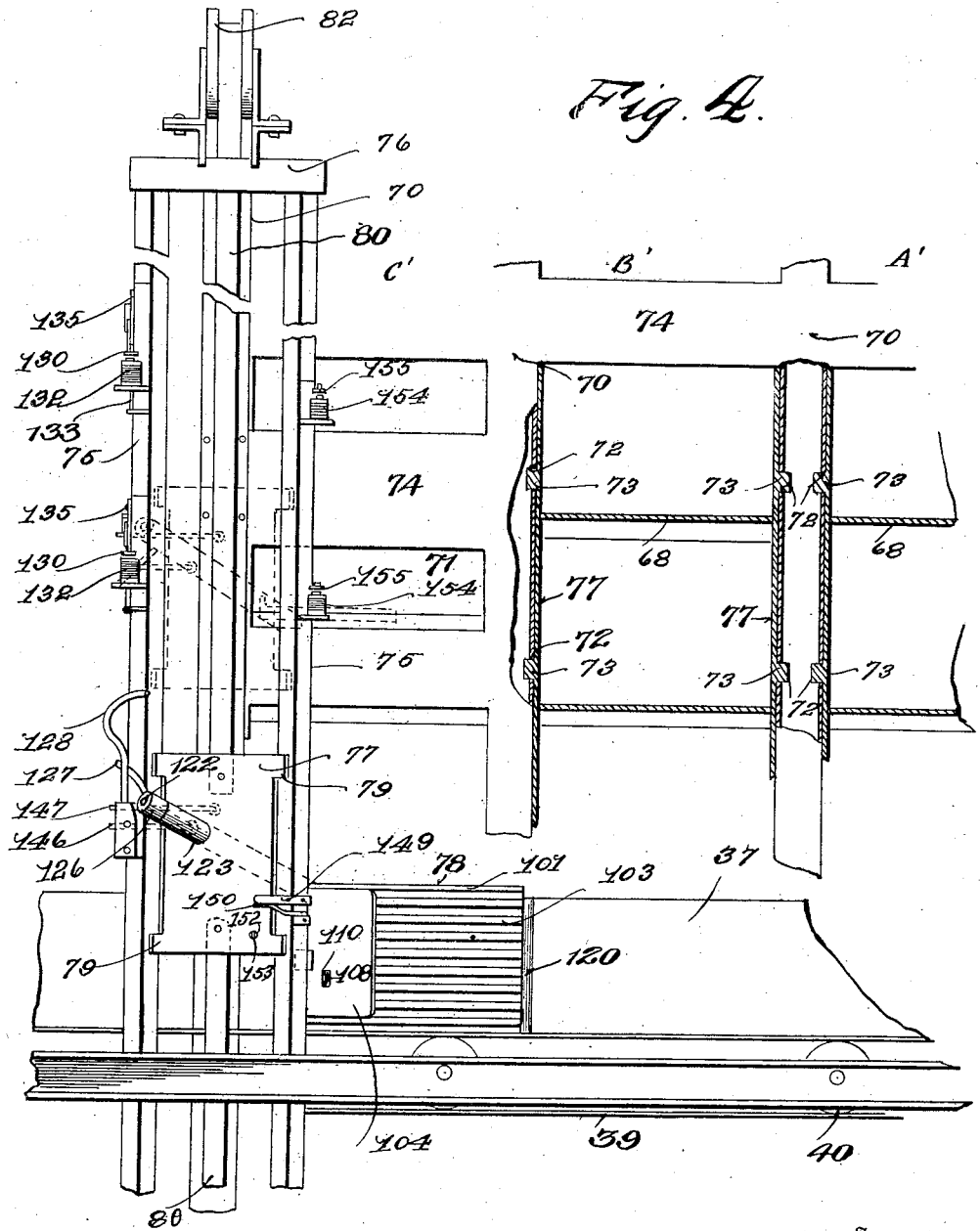
Figure 4 is a front elevational view of a portion of the machine showing one of the final delivery conveyors together with the arrangement of the pigeon-holes or receptacles.
Figure 5:
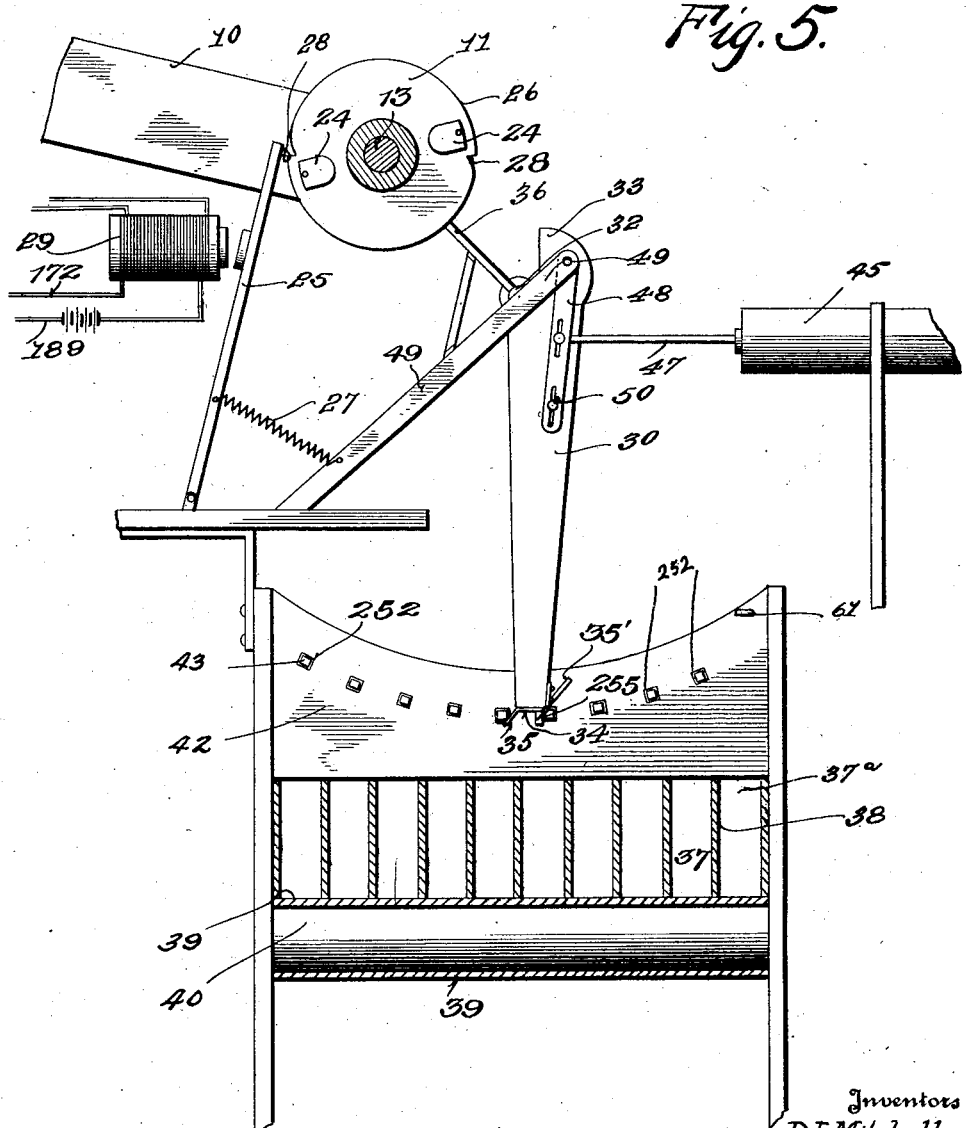
Figure 5 is an enlarged detail view showing the take-off mechanism and the initial conveyor device in elevation, and the conveyor for carrying the letters from the initial to the final delivery mechanisms in cross-section.

The boxes of each unit may be nested as desired, that is to say, they may be divided up into parts of any preferred number. For instance, if there are ten boxes to each unit, these boxes may be nested into two groups, each comprising five boxes. The grooves in the guards 70 are so arranged that the nesting of the boxes may be varied, as desired. In Figures 3 and 4, I have shown the bottom two boxes of each unit as being unattached to the remaining boxes of the units, the line of contact between the upper edge of the sides 67 of the lower boxes and the lower edge of the sides of the upper boxes being designated by numeral 303.

Each unit of boxes is removable from the machine for the purpose of facilitating the collection of the letters where more than one machine is in operation. If there are a number of machines in operation and the operator wishes to collect from the various machines all letters which have the same destinations, he may take a truck and go from machine to machine and remove entire units of boxes, and then stand up the various units collected side by side, and withdraw the letters through the unobstructed front opening thereof. In case it is not desired to remove the entire unit, but only a portion thereof, this may readily be accomplished as each unit is arranged in groups.

Figure 2:
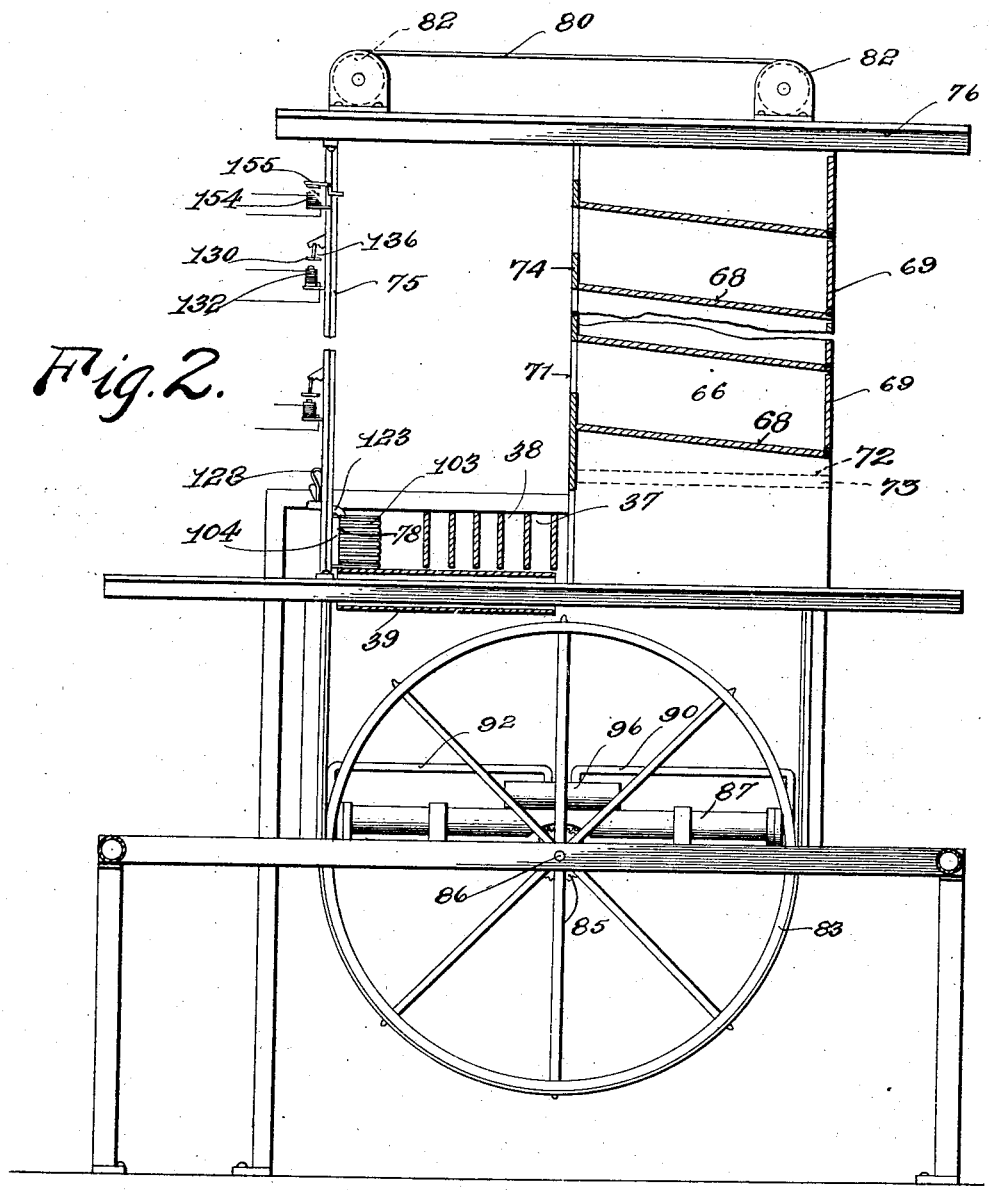
Figure 2 is a cross-sectional view of the machine taken on a vertical plane through one of the units or boxes or pigeon-holes.

Each unit of boxes is provided with a selectively or differentially movable conveyor having a carrier which normally lies longitudinally and in a vertical plane within the deflected portion 41, of its respective channel 37, so as to receive a letter therefrom and after the carrier has received a letter it moves upwardly on a pair of standards and while so moving is brought into a horizontal plane. The carrier is termed "differentially" movable for the reason that it is adapted selectively to move from its station at the base of a unit of boxes to a position adjacent any one of the boxes. These conveyors have associated therewith selective stop mechanisms for differentially stopping the carriers at the proper boxes and causing them to deliver the letters carried thereby into the proper box. Each of these conveyors comprises in part, a pair of vertical, spaced apart standards or guide rods 75 arranged adjacent the outer edge of the endless belt 39, and secured at their upper ends to cross beams 76. The guides 75, as will be seen from Figures 16 and 21, are illustrated as being constructed of bars or rods which are square or rectangular in cross-section, but it is to be understood that the configuration and size of these standards may be varied as desired. Each pair of standards 75 is employed as guides for a slide or cross-head 77 to which is rotatably connected the carrier, designated generally by the numerals 78. Each slide 77 has at each of its corners a pair of ears 79 arranged substantially at right angles to each other so as to receive the inner opposed corners of the standards 75. Each of the slides 77 is connected to an endless belt 80, which, as shown most clearly in Figures 2, 3 and 4, passes upwardly between the standards 75, over pulleys 82 mounted in bearings on top of the cross-beams 76, then downwardly through the hollow guards 70, and then about a large wheel 83 located beneath the boxes and the endless belt 39 and then back to the slide. The belt 80 is preferably formed from a band of flexible sheet metal.

To cause each of the slides 77 to move upwardly and downwardly on the standards 75, so that the carrier 78 may be raised to the proper height to deliver a letter and then returned to lowered position, pneumatic means is provided for rotating the large wheel 83 and imparting movement to the belt 80. This means, as most clearly shown in Figure 13, has a pneumatically controlled reciprocating rack 84, the teeth of which mesh with the teeth of the pinion 85 fixed to one end of an axle 86 on which the large wheel 83 is mounted. The rack 84 is mounted within a cylinder 87 and the rack has on its opposite ends pistons 88 which closely fit the interior wall of the cylinder. The pinion 85 meshes with the rack 84 through an opening 89 located intermediate the ends of the cylinder 87. The opposite ends of the cylinder 87 are closed and are connected by means of pipes 90 and 92 to a valve chamber to which air is admitted by means of a pipe 93 leading from a suitable pressure device, the latter not being shown as it may be of any suitable or approved construction. The admission of air to and from the pipes 90 and 92 and the ends of the cylinder associated with these pipes is controlled by an electrically operated valve 94, this valve at its opposite ends, having heads 95 which snugly fit within the valve casing 96 and intermediate the heads the valve is of reduced sectional area. The valve 94 is under the control of a pair of oppositely disposed electro-magnets 97 and 98, one of which, in the present instance, the magnet 97, is electrically connected with selective switch mechanisms carried by the standards 75 and actuated by the manipulative key devices and the carrier 78. In circuit with the magnet 98 is a letter actuated switch which will later be described in detail. It will be noted from the drawings, particularly Figure 13, that an air space or passage 91 is provided between each of the magnets 97 and 98 and the valve casing 96, so as to permit air pressure to escape from each of the pipes 90 and 92 and each end of the cylinder 87 when the valve 94 is in the proper position.

With the construction just described, when the magnet 98 is energized, which occurs when the letter being conveyed reaches its respective carrier 78 and closes the letter actuated switch heretofore referred to, the valve 94 is drawn to the left, referring to Figures 14 and 41; air pressure thereupon passes from inlet pipe 93 through the space in the valve casing 96 between the heads 95 of the valve 94 and the pipe 92 to the left hand end of the cylinder 87. The pressure thus admitted bears against the left hand head or piston 88 of the rack 84, thereby forcing the rack to the right and causing rotation of the pinion 85 and the large wheel 83 fixed thereto in a clock-wise direction, to cause the belt or band 80 to travel in such direction as to raise the slide 77 together with the carrier 78 carried thereby. When the carrier 78 moves upwardly the letter actuated switch is released and the magnet 98 is de-energized, but the valve 94 remains in position to permit air to flow into the left hand end of cylinder 87 until the slide 77 has come into contact with the actuated selective stop mechanism, hereinafter to be described as located upon one of the guides 75. The magnet 97 is thereupon momentarily energized causing the valve 94 to move to the right, Figures 13 and 41, to permit communication between the inlet pressure pipe 93 and the right hand end of the cylinder 87, and the pressure admitted forces the rack 84 to the left and the endless belt 80 is caused to move in such direction as to lower the slide 77. When the valve 94 is drawn to the right to admit air to the right hand end of the cylinder 87, pressure from the left hand end of the cylinder escapes through the pipe 92 and through the space 91 about the magnet 98.

It will be noted from the drawings that the oppositely disposed protruding ends 99 of the cores of the magnets 97 and 98 are tapered or cone-shaped, and the heads 95 of the valves 94 have correspondingly shaped recesses 100 which receive the tapered ends of the cores. About the ends of the cores are brass rings 102 which limit the movement of the valve 94 and prevent contact between the magnetic portion of the cores of the magnets and the valve 94. With this construction the air gap between the cores of the magnets and the ends of the valve 94 may be reduced to a minimum, the opposed areas between the cores and the recesses 100 of the valve 94 are at a maximum, and at the same time actual contact between the cores and the valve 94 is prevented.

The carrier 78 of each of the final delivery mechanisms has a bed plate or platform 103, which is preferably provided with longitudinal corrugations, so as to reduce the frictional area between this plate and the letter carried thereby to a minimum. The plate 103 is substantially of a length equal to the distance between the standards 75 and the front of the boxes or pigeon-holes 66, so that when the carrier has been raised into position to deliver a letter into the selected pigeon-hole, the inner end of the plate will be in close proximity to the openings 71 leading to the pigeon-holes. Along one edge of the plate 103 is an outstanding flange 101 for guiding the letter along the plate 103.

Figure 1:
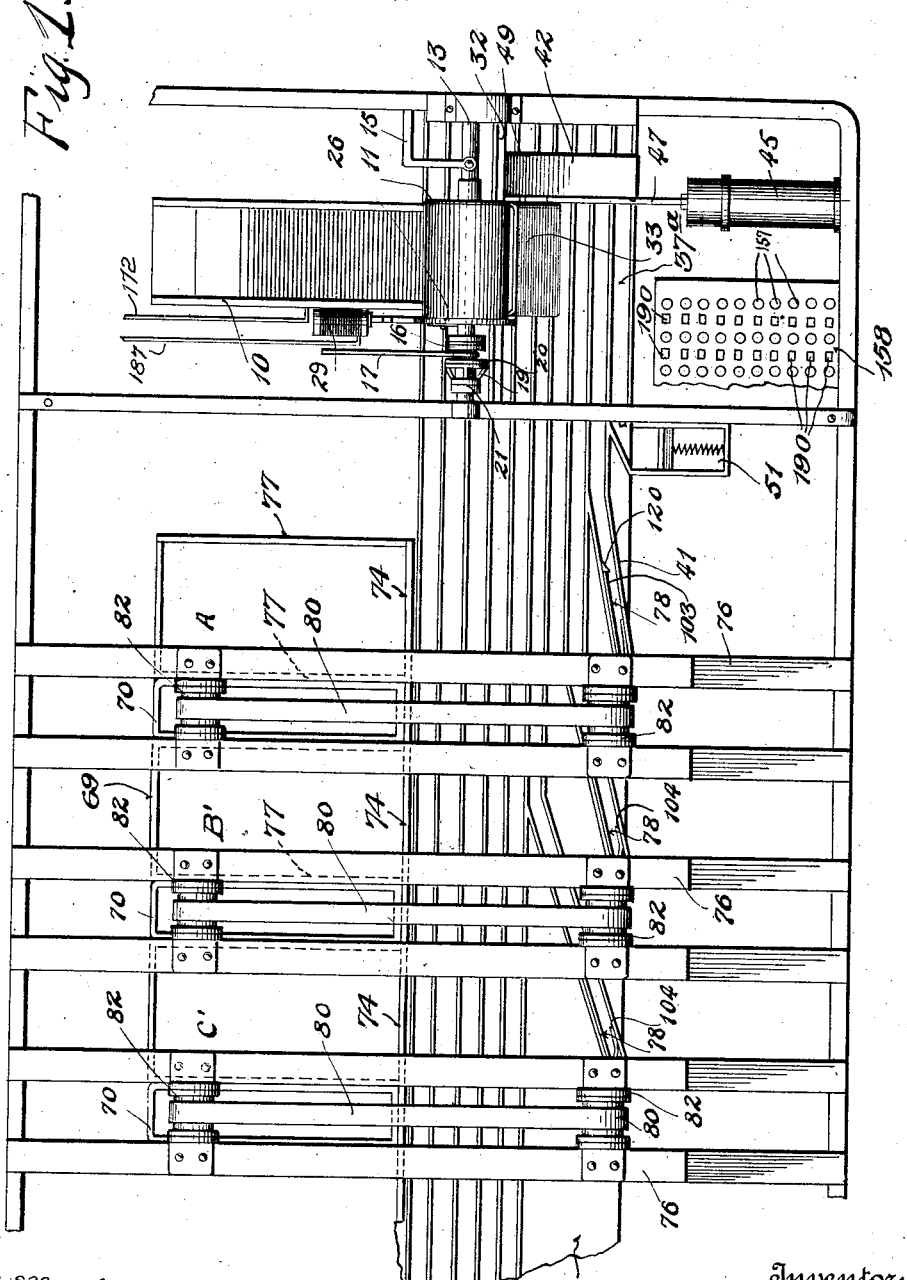
Figure 1 is a top plan view of one end of the machine and shows three of the final differentially movable conveying mechanisms, it being deemed unnecessary to illustrate the remainder of the machine as it comprises a further number of these final delivery mechanisms together with their respective units of boxes.

As heretofore stated, each of the carriers 78 when in lowered position lies within the deflected portion 41 of its respective channel 37, and in this position the plate 103 lies in a vertical plane with its back surface resting against the rear wall 38 of the channel in which the carrier is located, and to insure that the letter being delivered by the belt 39 rides into engagement with the front or upper face of the plate 103, a small deflector or guide 120 having an outwardly inclined surface is vertically placed on the wall of the channel adjacent the inner or free edge of the plate 103, as clearly shown in Figures 1 and 4. That surface of the plate 103 which is the bottom face, when the plate 103 is in a horizontal plane, will hereinafter be referred to as the under surface, although when the plate is in a vertical plane this surface is the inner face. The plate 103 may be reinforced by means of a back plate 302, (see Figure 20).

Each of the carriers has at its fixed end means for clamping the letters to the plate 103 so that when the carrier is moving vertically out of the channel 37 and turning from a vertical into a horizontal plane, the letter will be maintained securely in place. This clamping device comprises a clamping plate 104, hinged along one end of the plate 103. The free end of the clamping plate 104 is normally urged against the plate 103 by means of a spring 105, which may be of any suitable construction.

Each of the carriers 78 is further provided with a kicker mechanism for discharging a letter carried by the plate 103 into the selected pigeon-hole when the carrier is brought to rest, and this kicker mechanism as will be seen from Figures 19 and 20, comprises, in part, a lever 106 pivoted intermediate its ends to the under surface of the plate 103. A spring 107 connected at its opposite ends to one end of lever 106 and the plate 103, normally urges the free end of the lever 106 outwardly towards the free end of the plate 103. The lever 106 carries a finger 108 which moves within an arcuate slot 109 in the plate 103, and this finger, when the kick-off mechanism is set, engages in a slot 110 in the clamping plate 104. The lower end of the lever 106 carries a crosshead 112, the outer edge of which is curved to form a cam surface which, when the carrier is being lowered to its letter receiving position, engages a roller 113 mounted upon the upstanding end of an arm 114 fixed to one of the standards 75 immediately above the upper run of the endless belt 39. It will be noted from Figure 16, that the arm 114 extends inwardly over the belt 39 and into the channel in which the carrier is located when in lowered position, so that the roller 113 can engage the cam surface of the head 112, when the carrier is lowered and the configuration of the cam surface of the head 112 is such that the lower end of the lever 106 is moved towards the hinged end of the clamping plate 104, as to bring the finger 108 into position where it engages in the slot 110 of the clamping plate 104.

The clamping plate 104 is provided with an outstanding finger 115 which engages against an electrically and selectively controlled trip mechanism hereinafter described, and shown in Figures 21 and 22, when the carrier is brought to its selected position upon the standards to deliver a letter.

When the carrier 78 is returned to its lowermost position, the clamping plate 104 at its free edge engages against the outer face of the plate 103, and for the purpose of moving this clamping plate a sufficient distance from the plate 103 to permit a letter to be received between the two plates, we provide a wedge 116 shown in detail in Figure 17 carried by an arm 117 fixed to one of the standards 75. The location of the wedge 116 is such that when the carrier, with which it is associated, is brought into lowered position, the wedge engages between the plates 103 and 104 to move the latter plate outwardly a sufficient distance from the former to receive a letter without at the same time, releasing the finger 108 of the kicker mechanism, from the slot 110 in the plate 104.

Carried by the arm 117 on which the wedge 116 is located, is a switch having a spring contact 118, the free end of which is adapted to be brought into contact with a fixed contact 119, which in the present instance comprises a screw carried by and insulated from the arm 117. When a letter is delivered along its selected channel by the endless belt 39 to the carrier 78, it engages the spring contact 118, thereby closing the switch and energizing the electromagnet 98 of the pneumatic device shown in Figure 13, which moves the valve 94 to cause the carrier 78 to be moved upwardly.

When the carrier is in lowered position, the bed plate 103 lies in a vertical plane extending substantially longitudinally of the channels 37 so that the plate 103 may receive a letter. When the carrier is raised upon the standards 75 it is desired that the plate 103 be moved so as to lie in a substantially horizontal plane and in this position the plate extends transversely of the channels 37 to bridge the space between the standards 75 and the front faces of the boxes 66. To accomplish this result, the carrier is carried by a spindle 122, shown in detail in Figures 23, 25 and 26, and this spindle is rotatably mounted within a bearing member 123 carried by the slide or cross-head 77. The spindle 122, at its forward end, is provided with a lip 124 which extends at an angle to the axis of rotation of the spindle, and to this lip the carrier at one of its corners is secured. The bearing member 123 is inclined downwardly and forwardly at an angle to the plane in which slide 77 moves. The lip 124 of the spindle and the bearing member 123 are disposed at such angles relative to the spindle 122 and the slide 77, respectively, that when the carrier is in lowered position, the plate 103 extends at a slight angle across the belt 39, so as to lie within the deflected portion 41 of its respective channel, and when the carrier is raised and the spindle 122 is rotated, the plate is rotated about an axis passing longitudinally through the plate and at the same time it is turned at an angle of ninety-degrees (90°) about a vertical axis. In its raised position the plate 103 is substantially in a horizontal plane, but inclines downwardly slightly, at its inner or free end so as to facilitate the movement of a letter from the plate 103 to the pigeon-hole 66 to which it is to be delivered.

A coil spring 125 is mounted about one end of the bearing member 123, and its opposite ends are connected to this bearing member and spindle 122, respectively. The spring 125 tends to uncoil so that the carrier is normally urged to rotate from a vertical to a horizontal plane, in a counter clockwise direction, referring to Figure 16. To limit the extent of rotation of the spindle 122 within the bearing 123, the wall of the latter is notched or slotted circumferentially, at one end, as at 121, and the spindle carries a screw 131 which operates in the notch. When the screw 131 engages the terminal shoulders of the notch 121, further rotation of the carrier is prevented.

For the purpose of positively rotating the spindle 122 and thereby moving the carrier from a horizontal plane and transverse position to a vertical plane and longitudinal position with respect to the channels 37, we provide on the outer end of the spindle 122, which protrudes beyond the bearing member 123, a removable and adjustable sleeve 126, carrying an outstanding finger 127 which co-acts with a cam 128 carried by one of the standards 75. As clearly shown in Figures 16, 23 and 24, the cam 128 comprises an upstanding rod which for a substantial part of its length is straight and vertical and then it curves upwardly and outwardly of the channel and then inwardly at its upper end. When the carrier is moved into lowered position after depositing a letter in the proper pigeon-hole, the plate 103 is in a horizontal and transverse position, and is maintained in this position under the influence of spring 125 until the finger 127 carried by the spindle 122 engages the cam 128, whereupon the spindle will be caused to rotate until the finger 127 comes into engagement with the vertical portion of the cam 128, and during this interval the carrier has been rotated from a horizontal to a vertical plane and from a transverse to a longitudinal position, and in the latter position, it is superimposed immediately above the deflected portion 41 of its respective channel 37. On a further downward movement of the carrier, the latter is maintained in a vertical position, due to the engagement of finger 127 with the vertical straight portion of cam 128.

The operation of each of the final conveying mechanisms, the various parts of which have been described, is briefly as follows: A letter, carried along its selected channel 37 by the conveyor belt 39 is delivered between the plate 103 and the clamping plate 104 of the carrier associated with this channel. The spring contact 118 of the letter switch, heretofore described, is engaged by the letter as the latter is brought into position upon the carrier, and thereupon the pneumatic operating mechanism of the final conveyor is placed in operation causing the wheel 83 to rotate, and the slide 77, together with its carrier, to move upwardly. As the carrier 78 moves upwardly, the clamping plate 104 is withdrawn from the wedge 116, so that the clamping plate under influence of the spring 105, will hold the letter in position upon the bed plate 103. The spindle 122 is now rotated within its bearing 123 under the influence of spring 125, in a manner heretofore described, so that when the carrier reaches its selective stop, which stop has been actuated by the proper manipulative device, the bed plate is in a substantially horizontal, but slightly downwardly inclined plane opposite the proper pigeon-hole 66. At the same time that the carrier reaches the upward limit of its differential movement, a trip mechanism 155, carried by one of the standards 75, engages the finger 115 thereby swinging the free end of the clamping plate 104 upwardly, and this movement releases the finger or lug 108 of the kicker mechanism from the slot 110 of plate 104, thereby permitting the free end of the lever 106 to swing towards the free end of the plate 103 under tension of spring 107 to discharge the letter carried by the plate 103 into its pigeon-hole with the proper speed.

It will be noted that the lug or finger 108 of the kicker mechanism is located at some distance from the longitudinal center of the plate 103 and to that side of the center line opposite the flange 101 of the plate. The purpose of this arrangement is that the letters, when the kicker mechanism is released, are discharged at a slight angle towards the flange 101, so that there is no danger of the letters dropping off of that side of the plate 103, which is not provided with the flange. The carrier 78, when it reaches its selected position, strikes a switch (hereafter described) to reverse the operation of the pneumatic device shown in Figure 13, so as to cause the carrier to travel downwardly. As the carrier 78 travels downwardly, the finger 127 of the spindle 122 engages the cam 128 to swing the carrier into a vertical plane and longitudinal position in a manner heretofore described. As the carrier descends into its channel 37, the roller 113, carried by the arm 114, engages the cross-head 112 to swing the lever 106 in a direction to bring the lug 108 into engagement with the slot 110 and thus set the kicker mechanism. On further downward movement of the carrier, the lower edge of the clamping plate 104 is brought into contact with the wedge 116, to withdraw the clamping plate 104 slightly from the plate 103 so as to receive the next letter.

As previously stated, the slide 77 together with the carrier 78 mounted thereon are differentially movable in a vertical plane and to control this differential movement, each final conveyor mechanism is provided with a series of selective stops, there being one of said stops for each of the pigeonholes with which the particular conveyor mechanism is associated. In the present instance, these selective stops are secured to the standards 75, but it is, of course, understood that they may be carried by a member independent of the standards, it being only necessary that they properly co-act with the carrier, when it is raised and lowered.

These stops, as clearly shown in detail in Figures 27 to 29, each comprises an arm 130 pivoted intermediate its ends, to one of the standards 75, as at 129. One end of each arm is of sufficient length to protrude, when brought into horizontal position, inwardly beyond the plane of the standards, and into the path of travel of the slide 77 or a member carried thereby. Each stop or arm 130 carries, at its outer end, a magnetic armature which is located immediately above a magnet 132, each of which magnets is electrically connected to its respective manipulative device. The arm or stop 130, carries a depending spring switch or contact bar 133, which, when the magnet 132 is energized to move the stop 130 into position to engage the rising carrier, makes momentary contact between the two terminal contact terminals 134 fixed on the standard 75. As clearly shown in Figure 33, the upper ends of the contact terminals 134 are disposed at an angle to and are in the plane in which the switch bar 133 moves, and the rear faces of these terminals are surfaced with a layer of insulating material 301. With this arrangement when the stop 130 is moved into actuated position, the contact bar 133, which is a tongue of spring material, wipes across the uncovered faces of the terminals to make contact therebetween and momentarily energize the magnet 44 with which they are connected, and when the stop is moved back into normal position, the arm 133 does not make electrical contact as it wipes against the insulation 301 on the rear faces of the terminals 134. The contact terminals 134 of all of the switches of each final conveyor mechanism are connected to that magnet 44 of the selective stop mechanism for the initial delivery conveyor which is associated with the same channel 37 as is the particular final conveyor.

Associated with each of the stops or arms 130, is a switch mechanism electrically connected with the means for raising and lowering the carriers 78. Each of these switch mechanisms has a plate 135 pivoted immediately above the stop 130, as at 137. The plate 135 is connected to the arm 130 by a link 136 and carries a hinged, inwardly extending metallic switch arm 138, the downward swinging movement of which is limited by a stop 139. A pair of contact terminals 140, in substantial alignment with the pivotal point of arm 138 and located above this switch member or arm 138, is carried by the plate 135, and all of the pairs of these contact terminals of each final conveyor are electrically connected to the magnet 97 of the respective pneumatic device for raising and lowering the slide 77 and the carrier 78, the magnet 97 being the one which admits air to that end of the cylinder 96 to cause the carrier to fall. The stops or arms 130 and the fingers 138 are each normally maintained in inoperative or withdrawn position by means of a spring 145, so that the slide 77 may move upwardly without interference with those selective stops which are not thrown into operation upon manipulation of the operator's keys, until it strikes the stop which has been actuated.

Carried upon the inner face of each slide 77 is a stop finger 146 which extends rearwardly and then laterally so that its outer end is in close proximity to and extends laterally beyond the edge of one of the standards 75 for engagement with the protruding end of that selective stop 130 which has been thrown into operative position by manipulation of the proper key (see Figures 4 and 16). The slide 77 is further provided with a switch finger 147 which extends rearwardly beyond the stop finger 146 and laterally beyond the plane in which the stops 130 lie. The outer end 148 of this finger 147 is bent at an angle inwardly towards the plane in which the standards 75 are located so as to engage the switch 138 which is associated with the operated stop 130. The distance between the fingers 146 and 147 is such that the finger 147 has moved the switch 138 into its uppermost position to make contact between the terminals 140, at the same time the finger 146 has engaged the stop 130 for the purpose of limiting the upper movement of the carrier. If found preferable, the engagement of the finger 147 with the switch arm 138 may occur, first, so as to reverse the operation of the valve 94 of the pneumatic operating device and thus prevent the slide 77 from striking the selected stop 130 with excessive force. In this event, the finger 147 may be of spring material so as to prevent damage to the switch 138.

Secured to each pair of standards 75 at a point adjacent the lowermost position of the carrier 78, is a key release switch comprising a pair of contacts 149 and 150, these contacts being normally in engagement with each other. Contact 150 is of spring material. Carried upon the outer face of the slide 77 is a finger 152 having at its outer end a spring tongue 153, which is adapted, on downward movement of the slide 77, to engage the lower contact 150 and momentarily break the connection between contacts 149 and 150, and so release the actuated manipulative device or key which is held in inoperative position until the letter is delivered and the carrier 78 returned to its lowered position, as will be described hereinafter. The spring member or tongue 153 is of sufficient resiliency to flex when it is brought into contact with the contact 150 on the upward movement of the slide 77.

Also mounted upon one standard 75 of each conveyor unit is a trip mechanism electrically connected to each selective stop mechanism and adapted to trip the clamping plate 104 of the carrier 78 and set the kicker mechanism into operation so as to discharge the letter into the proper pigeonhole 66 when the carrier 78 has been brought to rest. Each trip mechanism, one being provided for each box or pigion-hole, has, as clearly shown in Figures 21 and 22, a magnet 154, the wires of which lead to the respective selective devices, and a pivoted trip arm 155 having at one end an armature immediately above the magnet 154. The inner end of the trip arm 155 is adapted to be thrown out into the path of travel of the finger 115 when the magnet 154 is energized. Normally the trips are maintained in withdrawn position, that is out of the path of travel of finger 115, so that these trips, unless properly actuated, will not interfere with the vertical movement of the carriers 78 and for this purpose springs 156 are provided.

As heretofore stated, the various operative parts of the machine are placed in operation by manipulative devices which are under the control of the operator distributing or routing the mail, and in the present instance, these manipulative devices comprise key mechanisms.

It is understood that each of these key mechanisms corresponds to a city or plurality of cities to which the mail is to be finally delivered, and that, at all times, the same keys or manipulative devices represent the same cities, so that after the operator has familiarized himself with the location of the several keys, it will be an easy matter for him to immediately strike the correct key, with practically no mental strain, for delivering the letter, the address of which is exposed to his view, to the proper box. Preferably the keys of the manipulative devices are arranged upon a key-board, the keys of each row being in alignment and the corresponding keys of the several rows being in transverse alignment. At any given time, each of these keys is associated with one of the pigion-holes or boxes which receives the mail so that upon actuation of the proper key, the letter will be delivered to its proper box, although it is to be understood that, at least, some of the keys, are not at all times associated with the same respective boxes.

In the present illustrative disclosure of our invention, we have shown the key of the manipulative devices as comprising push rods 157 located in rows upon a cover 158. In close proximity to each of the keys 157, as shown diagrammatically in Figure 42, are placed the names of the cities which each particular key represents, so that the operator may easily familiarize himself, by studying the key board, with the location of the several keys.

Of course, after he has familiarized himself with the position of the keys, the operation becomes more or less mechanical on his part, and after some little experience, the operator can readily manipulate the keys without taking his eyes off the take-off mechanism. As will be seen from Figures 30, 31 and 32, each of the keys 157 rests, at its lower end upon a horizontal arm of a bell crank lever 159 located beneath the keyboard 158. Each of these levers is pivotally carried by standards 160.

Each of the levers 159 of the manipulative devices carries or is associated with four switches, one of which comprises a pair of spring contact terminals 162 secured to the fixed support and having adjusting screws 163 between which contact is established when one of the members 162 is flexed. The vertical arm of the lever 159 carries an insulated contact bar 164 which, when the push rod 157 is forced downwardly, is brought to bear against the adjacent contact 162 and flexes it to bring the screws 163 into contact. The contact terminals 162 of each of these switches are, at any given time, electrically connected by means of wires 165, with the respective magnet 132 of that stop 130 of the final conveyor mechanism which is associated with that pigeonhole or box 66 corresponding to the particular key. Each of the levers 159 is normally maintained in inactive position by a spring 161.

A second key switch comprises a pair of spring contact terminals 166 and a switch bar 167 depending from the lower end of the vertical arm of the lever 159. This switch is similar to that shown in Figure 33, in that the upper ends of the contact terminals 166 are disposed at an angle to the plane in which the switch bar 167 moves and the rear faces of the contact terminals 166 are surfaces with a layer of insulating material 168. All the terminal contacts 166 of all the manipulative devices are connected by means of branch lines 169 to a single main line 170 leading to the magnet 60 of the pneumatic control device for the delivery chute 30. The magnet 60 when energized, operates the valve 54 to admit air to the cylinder 45 and differentially move the conveyor chute 30 from its normal position to its selective position. Branching from the main line 170 are wires 172 leading to the magnet 29 of the trip device and which magnet, when energized, permits rotation of the take off drum 11. With this arrangement of switch, when any one of the keys 157 is depressed, the contact bar 167, which is of a spring material, is brought into engagement with the terminals 166 to close the circuit through the magnets 60 and 29, and thereby rotate the plug 56 into the position shown in Figure 10, and to attract the trip 25 of the take off mechanism. This contact is momentary only for the bar 167 swings past the contact terminals 166, and on the return movement of the lever 159, the bar wipes against the insulated face 168 of the terminals, so that the magnets 29 and 60 are not again energized.

Located immediately beneath the horizontal arm of each of the levers 159 is a holding magnet 173, which, when energized, attracts a magnetic armature 174 carried by the lever 159. In circuit with the winding of each of these magnets 173 is a switch comprising a spring contact finger 175 carried by the lever 159, and a fixed contact terminal 176. The contact terminals 175 and 176 and the core of the magnet 173 are in circuit in a line 177 leading to the carriage actuated switch 149 and 150, heretofore described. At any given time each of the holding magnet terminals 175 and 176, is connected to the release switch 149 and 150 of that final conveyor unit which carries the selective stop 130 which is electrically connected to the same manipulative device as is the particular switch 175 and 176.

Each manipulative device has a lock out switch comprising a pair of fixed contacts 178 and a contact bar 179, the latter being carried by the vertical arm of the lever 159 and being adapted, when the lever is depressed, to close the circuit between the contacts 178. The lock out mechanism will be described more in detail hereinafter.

The contact members 134 of all of the selective stops 130 of each final conveyor mechanism are connected by means of branch wires 180 and a main wire 182 with that magnet 44 of the selective stop of the initial selective delivery mechanism which is associated with the same channel 37 as is the particular final conveyor mechanism to which the actuated stop 130 belongs, so that when a manipulative key is actuated, the proper stop mechanism 130 is actuated to cause the carrier 78 of that final conveyor to stop at the proper box, and the actuation of the selective stop will automatically bring into operation the proper selective stop 43 of the initial conveyor mechanism.

The magnet 154 of each of the trip mechanisms, which are adapted to trip the plate 104 of the carrier 78, as heretofore described, is connected by means of a pair of wires 183 with the wires 165 leading from the manipulative device to the magnet 132 of the selective stop with which the particular magnet 154 is associated.

Each of the letter switches, heretofore described, as comprising a fixed contact 119 and a spring contact 118, is connected by means of wires 184 with the winding of the magnet 98 of the pneumatic operating device for the final conveyor, which is associated with the same channel 37 as is the particular letter switch. It will be remembered that the magnet 98 is the one which attracts the valve 94 to admit air into the left hand end of the cylinder 87, (Figure 41), and cause the actuated carrier 78 to move differentially upward into contact with the actuated stop 130.

The contact members 140 of all of the selective stop switches of each final conveyor mechanism are connected, by means of branch wires 181, to main wires 191 and the latter wires are connected to the winding of the magnet 97 of the pneumatic operating device of the final conveyor which is associated with the same channel 37, as the particular selective stop switches.

Located on the key board is a key 185 which is marked "Local" and this key operates a switch of any suitable construction, in the present instance, it being shown as comprising a pair of normally spaced apart contacts 186 which are connected by means of wires 187 with a secondary winding on the magnet 29 of the trip device for the take-off mechanism. This local key 185 is connected only to the take-off trip mechanism so that, on manipulation of same, the take off drum 11 will be allowed to rotate one half revolution to discharge the exposed letter carried thereby into the delivery chute 30, while the latter remains in its normal position with its delivery end immediately over the local channel 37ª, heretofore described. Preferably, this local key is of substantial size and is conveniently placed on the key board, so that it may be readily struck by the operator since it will be manipulated to a greater degree than any other key.

Connected to one terminal of the winding of the magnet 63 of the pneumatic operating device for the initial selective conveyor mechanism, and which magnet, when energized, is adapted to shut off the flow of air to the cylinder 45 and permit the air to exhaust therefrom, as heretofore described, is a line wire 188 leading to the shaft 32 upon which the chute 30 is pivotally mounted. Connected to the other terminal of magnet 63 is a second wire 189, leading to the bus bar 64 of the selective stop mechanism for the initial conveyor. With this arrangement, when door 34 at the lower end of the chute 30 comes into contact with any one of the armatures 43 of the selective stop mechanisms, the circuit is closed through the armature 43 with which the chute 30 is in contact, the bus bar 64, wire 189, magnet 63, wire 188, shaft 32 and chute 30, so that the magnet 63 is energized to cause the plug 56 of the valve 54 to rotate into position where opening 58 therein is in registry with the outlet pipe 59 and pipe 53.

The magnets 250 of the selective stop mechanisms for the initial conveyor mechanism are connected in series, as shown in Figure 39. The end magnet of this series is connected, by means of a wire 253, to the line wire 189, which as shown in Figure 39, is connected through a battery to the bus bar 64. The other end magnet 250 is connected up by wire 254 to the contact member 255 carried by the chute 30. As clearly shown in Figures 11 and 12ª, the contact member 255 extends beyond the end of the chute 30 and is adjacent the outermost wall thereof. It is insulated from the chute, as shown in Figure 12ª, and the door 34 of the chute is notched as at 256, so as to permit the stop 255, to protrude through the door without making contact therewith. With this arrangement, when the chute 30 has reached its selected position, the contact member 255, comes into engagement with the actuated stop 43, and the circuit is closed through the contact 255, actuated armature 43, bus-bar 64, the battery in the line 189, the magnets 250 and the wire 254 leading to the contact member 255. When this circuit is closed, all of the magnets 250 are energized and thereupon the actuated stop 43 is attracted and withdrawn from operative into normal position. This arrangement is provided for the reason that it is necessary to withdraw the actuated stop 43 back into normal position as soon as the chute has delivered its letter to the selected channel 37, so that a different manipulative device delivering to a channel 37 beyond the first channel may be immediately manipulated to bring the stop 43 associated with the second channel into play and allow the chute 30 to move into engagement with this last stop without interference with the stops 43 for the outermost channels 37.

The purpose of locating the stop 255, adjacent the hinged end of the door 34, is to permit the chute 30 to be moved into full selective position before the actuated stop or armature 43 has been withdrawn. It will be noted that as soon as the door 34 engages the actuated stop 43, the magnet 63 is energized to permit the air to exhaust from behind the piston 46 of the pneumatic operating device, and allow the spring 52 to withdraw the chute into normal or outermost position. Although the magnet 63 is energized as soon as the free or inner end of the door 34 engages the actuated stop 43, the chute will continue to move inwardly due to the momentum of the chute, and due to the fact that an appreciable lapse of time takes place before the air pressure behind the piston 46 is effected after the magnet 63 is energized. The chute will continue to move into selective position until the actuated stop 43 engages the contact 255, and in this position the door 34 is in full, open position to permit the chute to deliver the letter carried thereby into the proper channel 37. It is, of course, obvious that the wire 254 may be carried to an insulated member on the shaft 32 and then through the chute to the contact 255.

Having described in detail the various parts of the machine, excepting the means for changing the routing of the letters and the lockout mechanism, a résumé of the operation of the various parts will be here given in order that the mind may be refreshed as to the various functions performed by the machine, and in the present description of the operation, it will be assumed for the purposes of clearness, that all keys of one unit correspond to the respective boxes of the corresponding unit of boxes, although, as hereinafter described, in actual practice this arrangement will not be followed.

In the diagrammatical showing in Figure 42, it is assumed that the keys and boxes are arranged in what may be termed a "primary" manner, that is, that the first key of the first unit of keys will cause, upon actuation, a letter to be delivered to the first box of the first unit of boxes, and that the second key of the first unit or row, upon actuation, will cause a letter to be delivered to a second box of the first unit of boxes, and so on. For the purpose of simplicity, we, in this figure, make each key represent one city and the cities are designated by the letters of the alphabet. It is to be understood, however, that in actual practice, each key may represent any number of cities and that the name plates for the keys, designated by the numeral 190, will bear the names of these several cities. The first row of keys is designated collectively by the letter a', the second b' and the third c'. The first row of boxes is designated by the letter A′, the second B′ and the third C′, and the boxes of each of these units are lettered to correspond to the lettering of the keys.

In this Figure 42, we have shown each row or unit of keys and boxes as having five keys and five boxes respectively, but it is to be understood that any number of keys and boxes may be employed in each unit and any number of units may be adopted; in actual practice, the total number of boxes will be approximately two hundred, and preferably, these boxes will be arranged ten to a unit and in twenty units.

In the diagrammatical views 39, 40 and 41, it is assumed that Figure 40 illustrates the first unit of keys a′ which are five in number, and that Figure 41 illustrates the first final conveyor mechanism A′. In Figure 1, this first final conveyor mechanism is associated with the outermost channel 37, and, therefore, each of the selective stop mechanisms of this final conveyor, is shown in Figure 41 as being connected by wires 182 with the magnet 44 of the first selective stop of the initial conveyor mechanism or chute 30. In the diagrammatical views 40 and 41, we have shown some of the wires 165 leading from the manipulative devices 157 to the magnets 132 of the selective stops of the final conveyor mechanism, and some of the wires 177 of the manipulative key holding circuits, as passing through switch or route boxes, but for the present, it will be assumed that these route boxes are not in these circuits.

It might be stated, that this "primary" arrangement, namely that in which the keys in each unit correspond to the respective boxes or pigeon-holes 66 of corresponding units of boxes may be employed in cases where the mail is undergoing primary distribution, for in this case, letters bearing the same destinations are at all times delivered to the same respective boxes upon manipulation of the same keys. In practice, it will be found desirable to so arrange the machine that the lowermost boxes of the first units of boxes will correspond to those cities or localities which are to receive the most mail, and that the upper boxes of the last units of boxes correspond to cities receiving the least mail, for by this arrangement the efficiency of the machine is increased, since the distances which most of the letters must travel from the initial conveyor mechanism to the final conveyor mechanisms and the distances through which the final carriers 78 must travel are at a minimum.

The operator takes his place immediately in front of the take off drum 11 and the key board. A letter is carried by the drum 11 with the addressed face towards the operator. The operator upon determining the destination of the letter presses the key corresponding to this destination, and upon manipulation of this key, say key a of Figures 40 and 42, contact is made between the terminals 162, whereupon the topmost magnet 132 of Figure 41, is energized which causes the stop 130 to be drawn into operative position, and contact is thereby momentarily made between the terminals 134 and a current passes through the wires 182 to momentarily energize the magnet 44 of the first selective stop of the initial conveyor mechanism. Upon energizing magnet 44, the stop 43 associated therewith, is drawn into position with its outer end extending into path of travel of the chute 30. At the same time, the circuit is closed momentarily, between the contacts 166 by the tongue 167 of key a, thereby energizing the magnet 60 to actuate the valve 54 and admit air to the cylinder 45 and move the chute 30 into contact with the first selective stop 43, in a manner heretofore described. Contact between the terminals 166 and tongue 167 also results in energizing the magnet 29 of the take off trip device and the trip 25 is withdrawn from the notch 28 in which it was lodged, thereby permitting a one-half revolution of the take off drum 11 which causes the letter to be wiped off the drum, onto the plate 36 and into the chute 30. The letter admitted to the chute 30 drops through the now open end thereof, (the door 34 of the chute having been thrown into open position upon engaging the actuated stop 43, as before explained) into the first channel 37 which carries the letter to the carrier 78 of the first final conveyor mechanism where it strikes the letter switch 118, thereby momentarily closing the circuit through the magnet 98 and setting the pneumatic operating device of the first final conveyor mechanism into operation. As the carrier rises between the standards 75, the clamping plate 104 rides off of the wedge 116 and the letter is clamped onto the bed plate 103 and the bed plate 103 under the influence of spring 125, is swung into a horizontal plane and transverse position, as heretofore described. The carrier will move upwardly until the finger 146 thereof strikes the stop 130 which has already been thrown into operative position, and substantially at the same time, the trip arm 155, which is associated with the uppermost selective stop and the magnet 156 of which has been energized, engages the finger 115 of the clamping plate 104 causing the latter to swing upwardly, to release a letter and permitting the kicker mechanism to discharge the letter into the pigeon-hole A. Substantially, at the same time that the carrier strikes the stop 130, the finger 147 of the carrier has moved the switch arm 138 into contact with the terminals 140 of the switch associated with the stop A and immediately the magnet 97 of the pneumatic operative device of the first final conveyor is energized to shift the valve 94 and admit air to the right hand end of the cylinder 87, (Figure 41) to cause the carrier 78 to be moved to its normal lowermost position. As the carrier 78 approaches its lowermost position, the plate 103 is moved from a horizontal plane and transverse position to a vertical plane and longitudinal position; the clamping plate 104 is moved away from the bed plate 103 by the wedge 116, and the kicker mechanism is set by the arm 114, as in the manners heretofore described.

During the travel of the letter from the take-off drum 11 to its proper box and during the time the carrier is moving from its raised selected position opposite box A to its normal position within channel 37, the key $a$ which has been manipulated, is held in closed position by means of the magnet 173, so as to maintain the flow of current through the magnet 132 of the selective stop A and the lock out mechanism to be hereinafter described. The circuit through the magnet 173 was closed upon depression of the key $a$ by bringing the contact finger 175 into engagement with the contact 176. The circuit through the holding magnet 173 is broken when the carrier reaches its lowermost position and strikes the release switch 150, momentarily breaking the contact between the members 149 and 150 whereupon the lever 159 will move into normal position under influence of the spring 161.

As the chute 30 is moved towards its selected position, and when the door 34 of the chute has engaged the actuated selective stop 43, a current is set up through the magnet 63, which attracts the arm 62 whereupon the plug 56 of the valve 54 is rotated to permit fluid pressure to flow from the rear end of the cylinder 45, and the spring 52 will force the piston 46 into the cylinder 45 and withdraw the chute 30 into its outermost position, in which position the open end of the chute is immediately above the local channel 37ª and the door 39 of the chute is held open by the stop 61. The magnets 250, as heretofore explained, are energized when the chute 30 has moved into full selective position to make an electrical contact between the actuated stop 43 and contact terminal 255. Thus while one letter is on its way from the chute 30 to one final conveyor mechanism, another manipulative key associated with a different final conveyor may be manipulated to rotate the drum 11 and move the chute 30 into position to deliver a second letter to the channel 37 associated with the second mentioned final conveyor.

As heretofore stated, upon manipulation of the local key 185 only the trip 25 of the take off mechanism is affected, so that the drum 11 may rotate and the letter is allowed to slide down the wiper plate 36, and through the chute 30 into the channel 37ª which discharges it into the receptacle or box 51, shown in Figure 1.

As heretofore stated, one of the objects of this invention is to provide a machine wherein "final separation" of the mail may be effected, and as described, in this separation, it is necessary in order that certain of the letters may, at one time, be dispatched over one railway post office route and at another time over a different railway route, to change the pigeon-holes or boxes to which these letters are delivered. In some cases, it is found necessary to satisfy the requirements of routing, that, whereas certain letters having different addressed destinations were heretofore delivered to a single box, are now to be delivered into two or more boxes, and in other cases, whereas heretofore, the letters were delivered into two or more boxes are now to be delivered into a single box. In the present machine, these changes are effected without in any way changing the location of the keys corresponding to the various cities on the key board. Generally, these changes are provided for by a route or switch box which is inserted in the connections between certain of the keys and the stop mechanisms of the final conveyors, so that by merely substituting one route or switch box for another, a key, upon manipulation, will at one time actuate one of the stop mechanisms of the final conveyor, and therethrough one of the stop mechanisms of the initial conveyor, and at another time will effect operation of a different stop mechanism of the final conveyors, and a different stop mechanism of the initial conveyor. When the connections between the manipulation devices and their respective stop mechanisms of the differentially movable conveyors are disturbed, it is necessary for reasons hereinafter described, to also change the connections between the several key release switches 149 and 150 and the several keys and also the connections of the several lock out mechanisms. These latter changes are each effected by separate switch boxes, which may be similar in construction to the first mentioned route box, although it will be understood that all of these changes may be provided for by a single switch box.

Each of these switch boxes may be of any suitable and approved construction. For purposes of illustration, we have shown in Figures 34 to 37 inclusive, a switch box having a casing of two similar portions 192 and 193 hinged together along one edge so that the box may be readily opened to permit the wires therein to be changed. The abutting edges of the walls of the parts of the casing are provided with complementary semi-circular sockets 194, which are adapted to receive plugs 195 shown in cross-section in Figure 37. The plugs 195 may be of any suitable construction and it is, of course, understood that the construction of the plug shown in the drawing, may be varied if desired. In the present instance, this plug comprises a cylinder 196 having a central bore which is provided with an insulating sleeve 197. The outer end of each of these plugs 195 is closed by a screw-threaded disc 198 carrying on its outer surface a spring contact member 199. The plugs along one side of the box are connected to certain plugs along the other side of the box by means of wires 200 which are secured at their ends to the screw threaded discs 198. The number of plugs along one side of the switch box which are connected to a single plug on the other side of the switch box will vary, in accordance with the number of wires which are to be connected with a single wire. For instance, if the switch box is inserted in the connecting wires 165 between the keys 157, and the stop mechanisms 130 of the final conveyors, and it is desired to connect two of these keys 157 with but one stop mechanism 130, then two plugs on one side of the box will be connected with the single plug on the other side of the box. In the lock-out mechanism, as hereinafter described, it will be found necessary, when each unit comprises ten keys, to connect one wire leading from one of the terminal contacts of each key with nine magnets, and in this case one plug on one side of the switch box will be connected with nine plugs on the other side of the switch boxes. It is, of course, evident in the present instance, that we have described the particular form of switch box, shown in the drawings, for illustrative purposes only, and we do not wish to restrict this invention to the particular form of box shown and described.

In the drawings, the route switch box, inserted in the connections between the keys and the selective stops of the final conveyor mechanisms is designated by the numerals 203; the switch box for the key release mechanisms by the numerals 204, and the switch box for the lockout mechanisms by the numerals 205. Each of the switch boxes is preferably secured in close proximity to the manipulative devices or keys, and preferably they are mounted, as shown in Figure 30, upon the key box beneath the key board 158. Each of the switch boxes is received in a guide way provided between oppositely disposed channel shaped members 206. Passing through the opposite walls of these channel members 206 are insulated contact terminals 207 which are spaced apart to correspond with the spacing of the plugs 195, so that, as shown in Figure 34, each contact member 207 will register or engage the spring contact 199 of its respective plug 195 when the switch box is inserted between the channel members 206. It will be readily understood from the foregoing description, that the various switch boxes may be withdrawn from their position upon the key box by sliding the same longitudinally from between the channels 206.

In practice, it is not found necessary to so arrange the machine that all the manipulative devices be capable of interchangeable association with the several pigeon-holes, for it is obvious that during the final separation of the mail, some of the letters, having certain destinations will, at all times be delivered to the same pigeon-holes upon the manipulation of the same keys corresponding to these letters and no other letters having different addressed destinations will be delivered to these respective pigeon-holes. This is particularly the case with a large city, the mail for which is not to be distributed or assorted by the railway postal clerk of the route over which this mail is dispatched. It is only necessary to provide means for interchangeably associating such a number of keys and pigeon-holes as will take care of the smaller cities, the mail for which is to be further assorted and distributed by the postal clerk of the various post office railway routes. In actual practice, it will be found, in some cases, that it will be sufficient to provide this interchangeable feature between twenty keys and twenty pigeon-holes. It will, of course, be understood that the number of keys and boxes which are capable of being interchangeably associated may be varied to suit the particular requirements of the region or State being routed.

For illustrative purposes, we have shown in the drawings, the top three transverse rows or bank of keys as being adapted to be interchangeably associated with the various boxes of the first three top rows of boxes. That is to say, each of the top three keys of each unit of keys may be associated with any one of the top three boxes of any of the units of boxes. Of course, any other arrangement between the pigeon-holes and keys may be provided for.

In Figures 40 and 41 we have shown, the terminal contacts 162 of the top three keys *a*, *b*, and *c*, as being connected by the wires 165' with their terminals 207 along one side of the switch box 203, and the magnets 132 of the first three selective stops A, B and C as being connected with the terminals 207 along the other side of the switch box by means of wires 165''. The wires 165 leading from the terminal contacts 162 of the lower two keys, *d* and *e* are shown as passing over the switch box 203 and as being directly connected with the magnets 132 of the two lower stop mechanisms D and E.

In these Figures 40 and 41 we have embraced all of the wires leading from the terminal contacts 162 of the first unit of keys in the bracket $a'$ and the wires leading to the magnets 132 of the first final conveyor mechanisms are embraced in the bracket $A'$. The wires 165 and 165' leading from the contacts 162 of the second unit of keys are embraced in a bracket $b'$, and the wires 165 and 165'' of the second final conveyor mechanism are shown embraced in the bracket $B'$.

When a change is effected in the line wires 165 leading from the terminals 162 of the keys to the selective stops 130 of the final mechanisms, a change must be also brought about in the connections between the release switches 149 and 150 and the magnets 173 of the holding magnets. Therefore, in Figures 40 and 41, we have shown leading from the contacts 149 and 150 respectively of the release switch to terminals 207 along one side of switch box 204, two wires designated by numerals 177''. Leading from the holding magnets 173 of the first or top three keys $a$, $b$, $c$, to the other side of the switch box 204 are the wires 177'. The wires 177 leading from the magnets 173 of the lower two keys $d$, $e$ are illustrated as passing around the switch box 204 and are connected directly to the wires 177''. The groups of wires leading from the various units of keys and from the several release switches are embraced in brackets $a'$, $b'$, $A'$, $B'$, respectively, so that these wires are grouped in the same manner as are the wires leading from terminals 162 of the keys to the selective stop mechanisms of the final conveyors.

The manner in which the several keys may be changed to deliver letters to different boxes will be readily understood from the explanation of the diagrammatical Figure 42.

It has heretofore been assumed that the keys of the first unit correspond in order to the pigeon-holes of the first unit boxes, et cetera. To change this arrangement we have shown the route switch box 203 inserted in the lines leading from the first three banks or transverse rows of keys to the first three transverse or horizontal rows of pigeon-holes, and the bottom two banks of keys are shown as being directly connected to the bottom two horizontal rows of boxes.

Thus the arrangement shown in Figure 42 corresponds to that heretofore described as existing in Figures 40 and 41, and to make these views further correspond, we have designated the lines leading from the keys $a$, $b$, $c$, et cetera, to the switch box 203, with the numerals 165' and the lines from the switch box to the pigeon-holes A, B, C, et cetera by the numeral 165'', and the lines from the lower keys directly to the lower pigeon-holes by the numeral 165. The holding magnet 173 of each of the keys of the first three banks of keys is shown as connected by wires 177' to one side of the release switch box 204, and the wires leading from the other side of the switch box to the release switches by the numeral 177''. The lines leading directly from the lower two banks of keys and about the switch box 204 to the wires 177'' are designated by the numeral 177.

Presume that the "primary" arrangement heretofore described, is to be maintained and at the same time, the switch boxes are to be employed. In this case, the wires 165' leading from the terminals 162 of the keys to the switch box 203 are connected, as shown in dotted lines, through the route box 203 to the wires 165''. In this arrangement, key $a$, when actuated will cause a letter to be delivered to box A, key $b$ to box B, and so on.

Assume now that it is desired to cause certain of the keys to deliver the letters upon actuation, to other pigeon-holes than those to which they did deliver when the "primary" arrangement was employed. Then the connections or wires 200 in the route box are changed to change the connections between the wires 165' and 165''. In actual practice a second route box 203 would be employed for this purpose.

For example, suppose it is desired to cause key $a$ and key $k$ to deliver to the same box A. This case would arise, where, at one time, the mail for city $a$ and the mail for city $k$ are to be dispatched over different post office routes, and at another time over the same post office route. For instance, suppose the city $a$ was between Washington and Fredericksburg, and city $k$ between Fredericksburg and Richmond, then referring back to the example given in the first part of this specification, up until 9.30 p. m., at which time a train passes over the Washington and Hamlet route, the mail for both cities $a$ and $k$ would be given to that train. After 9.30 the mail for these two cities would be divided and the mail for city $a$ would be dispatched over the 3 a. m. train from Washington over the Washington and Charleston railway post office route, and the mail for city $k$ would be made up in a separate package and dispatched to the Washington and Charlotte railway post office having a train leaving Washington at 11 p. m. To divert the mail for the city $k$ into A box, the line 165' leading from the key $k$ is connected, as shown by line 200 passing through the switch box 203 to line 165'' leading to the box A. The key $a$ is also associated with box A.

In case it is desired that the key $l$, upon manipulation, deliver to the box B, then the wire 165' leading from this key $l$ is connected, as shown by line 200ª within the switch box 203, to the wire 165" leading to the box B. In the same way, as shown in this figure, key $x$ and key $u$ may be caused to deliver the mail for cities $x$ and $u$ to the boxes C and M respectively. These changes are noted in the boxes 66 by the letters A, K, L, X and U shown in broken lines.

It will be noted that, when the connections from one of the keys of one unit is changed so as to cause this key to correspond to a box of a different unit of boxes, the connection between the holding magnet 173 of this key should be changed so that this holding magnet is connected to that release switch which is associated with the same unit of boxes as is that box or pigeon-hole to which this key now delivers. When the keys and boxes are arranged in the "primary" manner heretofore described, all the holding magnets 173 of each unit of keys are connected to the release switch of that unit of boxes to which the particular unit of keys corresponds.

In Figure 42 we have shown the switch box 204 inserted in the lines between the holding magnet 173 and the release switches 149, 150, and the wires 200 of this switch box are so arranged that all the keys which correspond to the boxes of the first unit are connected to the release switch of the first conveyor, and all the keys which deliver letters to the second unit of boxes are connected to the second release switch.

Since the lower two transverse rows or banks of keys in the present illustrative example are at all times connected to the same respective selective stops 130 of the two lower transverse or horizontal rows of boxes, the holding magnets 173 of these keys are, at all times, connected to the same release switches, the holding magnets of the two keys $d, e$, being connected to the first release switch, the two keys $n, o$ to the second release switch, and so on, without passing through the switch box 204.

With the connections or wires 200 within the switch box 203 arranged as above described, and in which key $a$ and $k$ deliver to the box A; and key $l$, to box B; and key $x$ to box C; and key $u$ to box M the holding magnets of keys, $a, k, l, x, d$ and $e$, are connected to the release switch of the first unit of boxes A'; keys $u, n$ and $o$ to the release switch of the second unit of boxes B'; and keys $q, y,$ and $z$ to release switch of the third unit of boxes C'. When the carrier 78 of the first final conveyor has delivered a letter to any one of the boxes A' and this carrier on its downward movement strikes the finger or contact 150 of the first release switch, any one of the keys which has been actuated to deliver to this first unit of boxes is released, since the current through the holding magnet 173 thereof, is broken.

In Figures 40 and 41, we have shown the several keys associated with the several pigeon-holes or boxes in the same manner as that just described as being disclosed in Figure 42. The wires 165' leading from the terminals 162 of the first key $a$ are connected through the route switch box 203 with the wires 165" which lead to the first selective stop mechanism A of the first unit of boxes A'. The wires 165' leading from the key $k$ of the second unit of keys is also shown connected through the switch box 203 with the wires 165" leading to the first selective stop mechanism A of the first unit of boxes A'.

The wires 165' leading from the terminals 162 of the key $l$ of the second set or unit of keys is shown as being electrically connected through the switch box 203 with the magnet 132 of the selective stop associated with the pigeon-hole B. In the arrangement just described, it will be noted, that when a letter addressed to city $a$ appears on the take off roll, the operator manipulates the key $a$ and the letter will be delivered to the box A of the first unit of boxes in the manner heretofore described. Now when a letter addressed to city $k$ appears on the take-off drum, the operator actuates the key $k$ and due to the connections through the switch box, the magnet 132 of the selective stop of box A is also actuated so that this letter is also delivered to the box A. Thus while the key $k$ belongs to the second unit of keys, after the switch box 203, wired as above described, is inserted, this key will actuate a selective stop 130 of the first final conveyor mechanism A', and through this selective stop, the selective stop 43 of the initial conveyor mechanism associated with the same channel 37 as is the first final conveyor will be actuated. The fact that a key of one unit is so arranged as to deliver into a pigeon-hole which belongs to a different unit of boxes, does not change the operation of the take-off trip 25 nor the pneumatic means for actuating the delivery chute 30, nor the magnets 250 for withdrawing an actuated stop 43 into normal position. Of course, the wires 184 leading from the several actuated letter switches 118 and 119 to the magnets 98 of their respective pneumatic operating means, and the wires 181 and 191 leading from the terminal contacts 140 of the stop mechanisms to the magnets 97 of their pneumatic operating devices for raising and lowering the carrier are not disturbed.

It will be noted, however, that when a key is associated with a pigeon-hole of a different unit of boxes from that which the key is associated, when the keys and boxes are arranged in the primary manner heretofore described, it will be necessary to correspondingly change the connections between the holding magnet of this key and the release switches 149 and 150, so that the holding magnet of this key will be associated with the release switch of final conveyor to which the key is now connected. For instance, in the present case, the key $k$ which is in the second unit of keys, has been changed to cause a letter to be delivered into a box of the first unit of boxes, and it will, therefore, be necessary to connect the holding magnet of this key $k$ with the release switch of the first conveyor A'. For this purpose the switch box 204 is so wired as to connect to wires 177'' of the first release switch to the wires 177' leading to the holding magnet 173 of the key $k$. Similarly, the holding magnets of keys $a$ and $l$ are shown connected to the release switch of the first final conveyor. Of course, the magnets 173 of keys $d$ and $e$ are at all times connected to the first release switch and keys $n$ and $o$ to the second release switch.

It will be seen from the foregoing description that by providing means independent of the key board, for interchangeably associating some of the keys with some of the boxes or pigeon-holes so that changes for routing letters in the machine may be taken care of, that the operator may, at all times, strike the same key for sending certain letters having the same destinations to their correct pigeon-holes although the locations of the latter are changed from time to time. When a change in the routing of certain letters within the machine is to take place so as to divert certain letters having certain addressed destinations to different boxes from those to which they have heretofore been delivered, it is only necessary to remove the switch boxes 203 and 204 and substitute other switch boxes which are wired up to take care of these changes. In actual practice as many route switch boxes and corresponding release switch and lock out switch boxes will be provided as there are times when changes are to be effected, and these switch boxes will preferably be labelled "9 o'clock", "10 o'clock" or whatever time they are to be inserted into the machine. For instance, when an operator is routing the mail for the State of Virginia at the Washington office after the 9 o'clock train has left Washington for Richmond, the route switch box and the release switch and lock out switch boxes used before 9 o'clock will be respectively replaced with the "9 o'clock" route box and the corresponding release switch and lock out switch boxes, so as to divide the mail north and south of Fredericksburg. It, of course, requires no experience of mental strain upon the operator to change the switch boxes at the proper times. It is to be understood that every time a route switch box 203 is changed for another one, release switch boxes 204 and lock out switch boxes 205 must be changed to effect the same corresponding changes in the several circuits.

The key board 158, together with the keys 157 carried thereby are preferably removable from the box containing the levers 159, so that the same machine may be used for routing various States by merely replacing one key board with another. The keys of all the key boards will be arranged to engage, at their lower ends, the levers 159. With this arrangement, as soon as the mail from one State has been disposed of, the same operator or a different operator, as the case may be, may remove the key board for that State, place another key board bearing the names of the cities of another State, over the key board box, change the switch plugs, and operate the keys of this latter key board so as to properly distribute or assort the mail of the second State.

It is, of course, obvious that to take care of mail to be dispatched to large cities, for instance, where there is one large city in a State which receives a fair percentage of the mail matter being assorted, a channel similar to the channel 37$^a$ may be provided which is to receive this mail and deliver it to a box without affecting any one of the final conveyor mechanisms. In this case, it will only be necessary to add another channel similar to channel 37$^a$ and to provide a selective stop 43 and 44 for this channel, and this selective stop would be directly connected to the manipulative key for this city, and would not be in any way associated with the selective stop mechanisms of the final conveyors.

It is to be noted that, in the present machine, two or more letters for the same box or pigeon-hole 66, or for two or more pigeon-holes of the same unit of boxes, can not be enroute from the take off drum 11 to their destinations at one and the same time. While one letter is traveling towards its pigeon-hole in one unit, it is necessary to wait until the carrier 78 for that unit of boxes has returned to its lowermost position within its channel 37 before another letter can be sent to any one of the boxes of this unit. To prevent the operator from manipulating two keys delivering to the same unit of boxes, in such close succession, that two letters would be enroute to the same unit of boxes at the same time, we provide a lock out mechanism whereby, upon the manipulation of any one of the keys which delivers to the same unit of boxes, all the other keys delivering to the same unit of boxes will be locked against actuation. Since some of the keys may be interchangeably associated with different units of boxes, it is necessary to devise a lock out mechanism in which these changes may be provided for, and for this purpose, we employ the lock out switch box 205 which, as heretofore stated, is similar in principle to the route box 203. It is, of course, obvious that two or more letters may be en route in the machine at one and the same time, when these letters are to be delivered to pigeon-holes of different units of boxes.

In the present illustrative disclosure of our invention we have shown associated with the lever 159 of each key a magnet or solenoid 208 disposed at right angles to the plane in which the horizontal arm of the lever 159 moves when the key for actuating this lever, is depressed. Extending through an opening in the magnet is a spring-retracted armature 209, which, when the magnet is energized, is repelled outwardly into the path of movement of the lever 159 so as to lock the same against actuation, and when the circuit is broken through the magnet 208 the armature is withdrawn. The main portion of core 209, as stated above, is normally held within the solenoid by spring means (not shown) so as to be out of the path of the lever 159 and is of the well known permanently magnetized type which will be repelled outwardly and hence thrown into the path of the lever 159 when the magnet is energized. The winding of each of these magnets is connected by means of wires 210, to the terminals 207 along one side of the switch box 205. The terminals 178 of the key switch, heretofore described, are connected to the terminal contacts 207, on the other side of the switch box 205 by means of the wires 211. The wires 211 of each of the key switches are connected up, through the switch box 205, with the wires 210 of the magnets 208 of the remaining keys which deliver to the same unit of boxes as any particular key.

Thus, if there are ten keys to each circuit, then the terminals 178 of each key switch are connected up with the magnets 208 of the remaining nine keys which deliver to the same unit of boxes. The particular key actuated is maintained in actuated position by the holding magnet 173, as heretofore described.

In Figure 43 we have shown for illustrative purposes, the lock out mechanism applied to three units of keys, each unit comprising three keys and these keys are lettered in the same manner as are the keys in Figure 42. When the key $a$ is so connected as to cause, upon actuation, a letter to be delivered to the box A of the first unit of boxes and the key $l$ so connected as to deliver a letter to box B of the first unit of boxes, and the key $x$ so connected as to deliver a letter to box C of the first unit of boxes, then, as shown in Figure 43, the wires 211 leading from the terminals 178 of key $a$ are connected up to wires 210 leading to the magnet 208 of the key $l$, and also connected to the wires 210, leading to the magnet 208 of key $x$. The wires 211 leading from the switch terminals 178 of key $x$ are connected to the wires 210 leading to the magnets 208 of keys $a$ and $x$. Similarly the wires 211 of key $l$ are connected to wires 210 of magnets 208 of keys $a$ and $x$.

It will be seen from the above description that when the key $a$ is depressed, the holding magnet 173 is energized to hold this key against actuation. Due to the lock out mechanism, the magnets 208 of keys $l$ and $x$ are energized to prevent manipulation of these keys. When the holding magnet 173 of key $a$ is deenergized, which occurs when the carrier 78 of the first final conveyor strikes the contact 150 of the first release switch, the lever 159 of key $a$ under influence of the spring 161, is swung into its normal position. By the above described movement contact between terminals 178 is broken, the lock out magnets 208 and keys $l$ and $x$ thus being deenergized and their armatures 209 withdrawn by their springs to permit manipulation of keys $l$ and $x$.

The relation between the levers 159, contact terminals 162 and the solenoids 208 is such that when the levers are swung by pressing keys 157 the lower end of the levers will pass the solenoid cores 209 before the two contacts 163 of the terminals 162 are brought together. Thus the lower end of the levers pass the solenoid cores before the magnets 208 are energized and their cores repelled. It is therefore clear that the solenoid cores will not interfere with the proper operation of the levers 159 since the depending arms of these levers pass the solenoids before the latter are energized. Upon the return movement of the levers (permitted by the de-energizing of the magnets 273 in the manner hereinbefore described) the contact terminals 162 separate, the solenoids being thereby de-energized and the cores 209 withdrawn by their respective springs before the lower end of the levers 159 reach the cores. Thus it is clear that the cores 209 do not interfere with the return of the levers 159.

In actual practice all of the keys, which are so connected as to deliver letters to the same unit of boxes, are connected together through the switch box 205. Each time the route switch box 203 is changed, the switch box 205 is changed for obvious reasons.

While the form of mechanism herein shown and described is admirably adapted to fulfil the objects primarily stated, it is to be understood that it is not intended to confine the invention to the one form of embodiment shown and described herein, as it is susceptible of embodiment in various forms, all coming within the scope of the claims which follow.

We claim:

1. In a machine of the class described a plurality of open receptacles arranged in units, an independently operable conveying mechanism for each of said units and common means for selectively delivering to said mechanisms.

2. In a machine of the class described, a plurality of receptacles arranged in units, an angularly and rectilinearly movable conveying mechanism for each unit, and means for delivering to said mechanisms.

3. A plurality of receptacles arranged in units, an angularly and rectilinearly movable conveying mechanism for each unit, and common means for selectively delivering to said conveying mechanisms.

4. In a machine of the class described, a plurality of receptacles arranged in units, a differentially movable conveyor mechanism for each unit, and common means for selectively delivering to said conveying mechanisms from a common source of supply.

5. In a machine of the class described, a plurality of receptacles arranged in units, a differentially movable conveyor mechanism for each unit, and a differentially movable conveyor mechanism common to said first conveyor mechanisms.

6. In a machine of the class described, a plurality of receptacles arranged in units, an independent and differentially movable conveyor mechanism for each unit, and means common to said conveyor mechanisms for selectively delivering thereto.

7. In a machine of the class described, a plurality of receptacles with their letter receiving openings facing in the same general direction, said receptacles being arranged in units located side by side, a conveying mechanism for each unit, delivery means common to said conveying mechanisms, and means on said conveying mechanisms for kicking an article into one of said receptacles.

8. In a machine of the class described, a plurality of receptacles with their letter receiving openings facing in the same general direction, said receptacles being arranged in units located side by side, a differentially movable conveyor mechanism for each unit, said mechanisms being arranged side by side to correspond to the units of receptacles, and means for selectively delivering to said mechanisms.

9. In a machine of the class described, a plurality of receptacles arranged in vertical rows, a differentially movable conveyor mechanism for each of the vertical rows of receptacles, and means for delivering letters to said conveyors from a common source of supply.

10. In a machine of the class described, a plurality of receptacles arranged side by side in vertical rows and facing in the same general direction, a vertically and differentially movable conveyor mechanism for each vertical row of receptacles, and means for selectively delivering from a common source to said conveyor mechanisms.

11. In a machine of the class described, delivery means, a conveyor having a movable carrier adapted to receive letters from said delivery means, and means automatically operable upon the receipt of a letter by the carrier for imparting angular and rectilinear movements to said carrier.

12. In a machine of the class described, delivery means, a conveyor mechanism having a differentially movable carrier adapted to receive letters from said delivery means, means for moving said carrier rectilinearly, and means for moving said carrier from one plane to a plane at an angle to the first plane.

13. In a machine of the class described, delivery means, a conveyor having a differentially movable carrier adapted to receive letters from said delivery means, means for moving said carrier rectilinearly, and means for moving said carrier from a vertical position into substantially a horizontal plane.

14. In a machine of the class described, a delivery means, a plurality of receptacles, a conveyor having a differentially movable carrier adapted to receive letters from said delivery means and selectively deliver them to said receptacles, and means for moving said carrier from a position longitudinally of said delivery means to a position transversely thereof.

15. In a machine of the class described, delivery means, a plurality of receptacles, a differentially movable carrier adapted to receive letters from said delivery means and selectively convey them to said receptacles, and means for moving said carrier from a position longitudinally of said delivery means and in a plane vertical thereto to a position transversely of said delivery means and substantially into a horizontal plane.

16. In a machine of the class described, a vertical row of receptacles, delivery means moving transversely of said receptacles, a differentially and vertically movable carrier for said receptacles and adapted to extend substantially longitudinally of the direction of movement of said delivery means when in a position to receive a letter therefrom, means for moving said carrier vertically, and means for moving said carrier into a position transversely of the direction of said delivery means.

17. In a machine of the class described, a vertical row of receptacles, delivery means moving transversely of said receptacles, a differentially and vertically movable carrier for said receptacles and adapted to extend substantially longitudinally of the direction of movement of said delivery means and in a vertical plane when receiving a letter from said delivery means, means for moving said carrier vertically, and means for moving said carrier into a position transversely of the direction of movement of said delivery means and in which position said carrier is substantially in a horizontal plane.

18. In a machine of the class described, a plurality of receptacles, delivery means, a differentially movable conveyor for receiving letters from said delivery means and selectively delivering the same to said receptacles, means for moving said carrier rectilinearly, and means for moving said carrier upon rectilinear movement from a longitudinal position over the delivery means to a transverse position thereof and bringing said carrier from a vertical to a horizontal plane.

19. In a machine of the class described, delivering means, a conveyor having a differentially movable carrier adapted to receive letters of said delivery means, means for moving said carrier rectilinearly, and means for moving said carrier from a horizontal to a vertical plane.

20. In a machine of the class described, delivery means, a pluraity of receptacles, a differentially movable carrier to receive letters from said delivery means and selectively deliver them to said receptacles, and means for moving said carrier from a position transversely of said delivery means to a position longitudinally thereof.

21. In a machine of the class described, delivery means, a plurality of receptacles, a differentially movable carrier adapted to receive letters from said delivery means and convey them selectively to said receptacles, and means for moving said carrier from a position longitudinally of said delivering means and in a plane vertical thereto to a position transversely of said delivering means and into a horizontal plane and vice versa.

22. In a machine of the class described, a vertical row of receptacles, delivery means moving transversely of said receptacles, a differentially and vertically movable carrier for said receptacles and adapted to extend transversely of the direction of movement of said delivery means and in a horizontal plane when discharging a letter to said receptacles, means for moving said carrier vertically, and means for moving said carrier into a position horizontally of the direction of said movement of said delivering means and into a vertical plane when said carrier is moved into letter receiving position.

23. In a machine of the class described, a plurality of receptacles, delivery means, a vertically and differentially movable carrier for receiving letters from said delivery means and selectively delivering the same to said receptacles, means for moving said carrier vertically, and means for causing said carrier to move from a vertical plane and a longitudinal position to a horizontal plane and a transverse position upon upward movement of the carrier and also to cause said carrier to return to its initial position upon lowering said carrier.

24. In a machine of the class described, a plurality of receptacles, delivery means, a differentially and vertically movable carrier for receiving letters from said delivery means and selectively delivering the same to said receptacles, said carrier having a pintle, a bearing rotatably receiving said pintle, a cam cooperating with said pintle, and means for moving said carrier vertically, said cam upon vertical movement of said carrier being adapted to move the same from a transverse position and horizontal plane relative to said delivery means to a longitudinal position and vertical plane.

25. In a machine of the class described, a plurality of receptacles, delivery means, a differentially and vertically movable carrier for receiving letters from said delivering means and selectively delivering the same to said receptacles, said carrier having a pintle, a bearing rotatably receiving said pintle, a cam cooperating with said pintle, means for moving said carrier vertically, said cam upon downward movement of said carrier being adapted to move the same from a transverse and horizontal plane over the delivery means to a longitudinal position and vertical plane, and means for moving said carrier into a transverse position and horizontal plane upon upward movement.

26. In a machine of the class described, a plurality of receptacles, delivery means, a vertically and differentially movable carrier for receiving letters from said delivery means and selectively delivering the same to said receptacles, means for moving said carrier vertically, a spring for causing said carrier to move from a vertical plane and a longitudinal position over the delivery means to a horizontal plane and a transverse position upon upward movement of the carrier, and a cam for returning said carrier to said first mentioned position.

27. In a machine of the class described, a plurality of receptacles arranged in units, delivery means traveling transversely of said receptacles, a differentially movable carrier for each of said units, means for moving each of said carriers vertically, and means for moving said carriers from a transverse plane and longitudinal position relative to said delivery means to a transverse position and horizontal plane, and vice versa.

28. In a machine of the class described, delivery means, a conveyor having a movable carrier adapted to receive letters from said delivery means, means for moving said carrier rectilinearly, and means for moving said carrier about a horizontal axis from one plane to a second plane at right angles to said first plane upon vertical movement of said carrier.

29. In a machine of the class described, a vertical row of receptacles, a belt moving transversely of said receptacles, a differentially and vertically movable carrier for said receptacles and adapted to extend substantially longitudinally of the direction of movement of said belt when receiving a letter therefrom, means for moving said carrier vertically, and means for moving said carrier into a position transversely of the direction of movement of said belt upon upward movement of the carrier and for moving the carrier into longitudinal position upon lowering the carrier.

30. In a machine of the class described, a vertical row of receptacles, a belt moving transversely of said receptacles, a differentially and vertically movable carrier adapted to extend substantially longitudinally of the direction of movement of said belt and in a vertical plane when receiving a letter therefrom, means for moving said carrier vertically, and means for moving said carrier from a longitudinal position and vertical plane into a transverse position and horizontal plane and vice versa upon upward and downward movements of the carrier.

31. In a machine of the class described, a reciprocatory carrier plate, a clamping plate adapted to maintain letters in clamped position against said carrier plate, and means operative prior to the reception of a letter by the carrier for moving said clamping plate from the carrier plate when the carrier plate is moved into letter receiving position.

32. In a machine of the class described, a vertically reciprocatory carrier plate adapted to lie edgewise when in position to receive a letter, a clamping plate pivoted to said carrier plate, an inclined surface for moving the free end of said clamping plate from the carrier plate when the carrier is moved into position to receive a letter, and means for urging said clamping plate against said carrier plate.

33. In a machine of the class described, a vertically movable carrier plate adapted to lie in a vertical plane when receiving a letter and to be moved to a horizontal plane thereafter, a clamping plate pivoted to the carrier plate for maintaining letters upon the carrier plate, a stationary wedge adapted to move the clamping plate from the carrier plate when the carrier plate is moved into position to receive a letter, and a spring for urging the free end of the clamping plate against said carrier plate.

34. In a machine of the class described, a plurality of receptacles, a carrier plate adapted to selectively deliver to said receptacles, and a kicker mechanism carried by said carrier plate for discharging letters from said carrier plate into the selected receptacle.

35. In a machine of the class described, a carrier plate, and a kicker mechanism comprising a finger carried by the carrier plate and adapted to engage the letter thereon, a spring for urging said finger in such direction as to discharge the letter from said carrier plate when the finger is released, and electro-magnetically operated means for releasing said finger.

36. In a machine of the class described, a letter carrier plate, and a kicker mechanism comprising a lever pivotally carried by said plate, a finger on the lever adapted to engage the letter and a spring for moving said lever in a direction to cause said finger to discharge the letter from said carrier plate when the finger is released.

37. In a machine of the class described, a carrier plate, clamping means adapted to maintain a letter in clamped position against said carrier plate, and a letter discharging mechanism carried by the carrier plate and maintained in set position by said clamping means.

38. In a machine of the class described, a carrier plate clamping means adapted to maintain letters in clamped position against said carrier plate, and a kicker mechanism comprising a finger adapted to engage the letter, and means for urging said finger towards the letter, said finger being maintained in set position by said clamping means.

39. In a machine of the class described, a carrier plate, a clamping plate carried thereby and having a slot, and a letter discharging mechanism comprising a lever having a finger engaging the slot in said clamping plate and adapted to discharge the letter from the carrier plate when the clamping plate is moved therefrom, and means for urging said lever in a direction to discharge the letter when the finger is released.

40. In a machine of the class described, a carrier plate, clamping means adapted to maintain a letter in clamped position against said carrier plate, a letter-discharging mechanism carried by the carrier plate and maintained in set position by said clamping means, and means for engaging said letter-discharging mechanism to move the same into set position when the carrier plate is moved into letter-receiving position.

41. In a machine of the class described, a carrier plate, clamping means adapted to maintain letters in clamped position against said carrier plate, and a letter discharging mechanism comprising a finger adapted to engage the letters carried by the carrier plate and means for urging said finger toward the letter, said finger being maintained in set position by said clamping means, and means for engaging said discharging mechanism to move the same into set position when the carrier plate is moved into a letter-receiving position.

42. In a machine of the class described, a carrier plate adapted to move edgewise into letter-receiving position, a lever carried by the carrier plate and having a finger adapted to engage letters on the plate, a spring for urging said lever in a direction to cause the finger to discharge letters from the carrier plate, a cam carried by the lever, and an abutment adapted to engage the cam when the carrier is moved into letter-receiving position so as to set said kicker mechanism.

43. In a machine of the class described, a carrier plate, means for clamping letters to the carrier plate, means for moving said clamping means from the carrier plate when the carrier plate is moved into letter-receiving position, means for discharging a letter from the carrier plate, said discharging means being maintained in set position by said clamping means, and means for setting said discharging means when the carrier plate is moved into letter-receiving position.

44. In a machine of the class described, a carrier plate, a clamping plate having a slot and pivoted to the carrier plate, means for moving the clamping plate from the carrier plate as the latter moves into letter-receiving position, a lever carried by the carrier plate, a finger on the lever adapted to engage in the slot of said clamping plate, a spring for moving said lever to discharge a letter from the plate when the finger is released, and means for moving said lever in a direction to engage the finger in the slot when the carrier plate is moved into letter-receiving position.

45. In a machine of the class described, a carrier plate, clamping means adapted to maintain a letter in clamped position against the carrier plate, a letter-discharging mechanism carried by the carrier plate and maintained in set position by said clamping means, and means for engaging said clamping means when the carrier plate approaches its selected discharging position so as to release said letter-discharging mechanism.

46. In a machine of the class described, a plurality of receptacles, a carrier plate adapted to selectively deliver to said receptacles, a letter kicking mechanism carried by said carrier plate for positively kicking letters from the carrier plate into its selected receptacle, and means for releasing said letter-kicking mechanism when the carrier plate is moved into selective position.

47. In a machine of the class described, a carrier plate, clamping means adapted to maintain letters in clamped position against said carrier plate, a letter discharging mechanism comprising a finger adapted to engage the letters carried by the carrier plate and means for urging said finger toward the letter, said finger being maintained in set position by said clamping means, and means for engaging said clamping means when the carrier plate approaches its selected discharging position so as to release said letter discharging mechanism.

48. In a machine of the class described, a carrier plate, a clamping plate carried thereby and having a slot, a lever carried by the carrier plate and having a finger adapted to engage in the slot of said clamping plate, a spring for urging said lever in a direction to cause the finger to discharge the letter from the carrier plate, and means adapted to engage the clamping plate when the carrier is moved into letter discharging position so as to raise the clamping plate and release said kicker mechanism.

49. In a machine of the class described, a plurality of receptacles, a carrier plate, a clamping plate carried by the carrier plate, means for moving the clamping plate from the carrier plate when the latter is moved into letter-receiving position, means for discharging letters from the carrier plate, means for moving the discharging means into set position when the carrier plate is moved into letter-receiving position, and means for releasing said discharging means when the carrier plate is in selected delivery position.

50. In a machine of the class described, a carrier plate positioned in a vertical plane when in letter receiving position, means for moving said plate into a longitudinal plane when the plate is raised, means for clamping letters to the carrier plate, means for moving said clamping means from the carrier plate when the carrier plate is moved into letter-receiving position, means for discharging a letter from the carrier plate, said discharging means being maintained in set position by said clamping means, and means for setting said discharging means when the carrier plate is moved into letter-receiving position, and means for engaging clamping means to release the letter discharging means when the carrier plate is moved into discharging position.

51. In a machine of the class described, a carrier plate, means for clamping letters to the carrier plate, means for moving the clamping means from the carrier plate when the latter is moved into letter-receiving position, means for discharging letters from the carrier plate and maintained in set position by said clamping means, means for setting said discharging means when the carrier plate is moved into letter-receiving position, and means adapted to engage the clamping means so as to move the clamping means from the carrier plate and thus release said discharging means when the carrier plate reaches its selected delivery position.

52. In a machine of the class described, a carrier plate, a clamping plate pivoted to said carrier plate, means for moving the clamping plate from the carrier plate when the latter is moved into letter-receiving position, a finger carried by said clamping plate, means for discharging letters from the carrier plate and maintained in set position by said clamping plate, means for setting said discharging means when the carrier plate is moved into letter-receiving position, and a selective member adapted to engage the finger of said clamping plate so as to move the clamping plate from the carrier plate and thus release said discharging means when the carrier plate reaches its selected delivery position.

53. In a machine of the class described, a plurality of receptacles arranged in units, a differentially movable conveyor mechanism for each unit, and a belt for delivering to said differentially movable conveyor mechanisms.

54. In a machine of the class described, a plurality of receptacles arranged in units, a differentially movable conveyor mechanism for each unit, a channel for each conveyor mechanism, and means for moving the letters in said channels to the said conveying mechanism.

55. In a machine of the class described, a plurality of receptacles arranged in units, a differentially movable conveyor mechanism for each unit, a continuously moving belt for said differentially movable conveyor mechanisms, and channels over said belt for guiding the letters to their respective delivery mechanisms.

56. In a machine of the class described, a plurality of receptacles arranged in units, a vertically movable conveyor mechanism for each unit, a channel for each conveyor mechanism, means for moving the letters in said channels, and means for selectively delivering to said channels.

57. In a machine of the class described, a plurality of receptacles arranged in vertical units, a vertical and differentially movable conveyor mechanism for each unit of receptacles, a belt movable transversely of said receptacles, channels extending longitudinally of said belt, and means for selectively delivering to said channels.

58. In a machine of the class described, a plurality of receptacles arranged in units, a differentially movable conveyor mechanism for each unit, a variable stroke conveyor, and means for each of said differentially movable conveyor mechanisms for moving the letters from the variable stroke conveyor to the respective differentially movable conveyors.

59. In a machine of the class described, a plurality of receptacles arranged in units, a differentially movable conveyor mechanism for each unit, a channel for each conveyor mechanism, means for moving letters in said channels, and a differentially movable gravity conveyor for selectively delivering from a common source of supply to said channels.

60. In a machine of the class described, a plurality of receptacles arranged in vertical units, a vertically and differentially movable conveyor mechanism for each unit of receptacles, a belt movable transversely of said receptacles, channels extending longitudinally of said belt, and a differentially movable gravity conveyor for selectively delivering to said channels.

61. In a machine of the class described, a plurality of receptacles arranged in vertical units located side by side, a differentially and vertically movable carrier for each unit, guide means for said carriers, a channel for each of said carriers, said channels being in parallelism with each other and extending transversely of the receptacles and between the receptacles and said carrier guiding means, and means for moving letters longitudinally of the channels.

62. In a machine of the class described, a plurality of receptacles arranged in vertical units located side by side, a differentially and vertically movable carrier for each unit, means for guiding said carriers, a channel for each carrier, said channels being in parallelism with each other and extending transversely of the receptacles between said guiding means and said receptacles, means for moving the letters in the channels to said carriers, each of said carriers when in letter receiving position being adapted to lie longitudinally within its associated channel, means for moving the carriers upwardly, and means for moving each of the carriers into a position transversely of the channels so as to bridge the space between the guiding means and the receptacles when delivering a letter into the latter.

63. In a machine of the class described, a plurality of receptacles arranged in vertical units located side by side, a differentially movable carrier for each unit, means for guiding said carriers, a channel for each carrier, said channels extending transversely of said receptacles and being located between the receptacles and said guiding means, each of said carriers when in letter-receiving position being adapted to lie in a vertical plane and longitudinally within its associated channel, and means for moving the carrier, when raised, into a horizontal plane and into a position transversely of said channels and returning it to its initial position when the carrier is lowered.

64. In a machine of the class described, a pair of standards, a cross head carried by said standards, means for raising and lowering the cross head on said standards, a carrier plate, means for delivering to said plate, an obliquely extending pintle carrying said carrier plate, an obliquely extending bearing in said cross head for receiving said pintle, and means cooperating with said pintle for swinging the carrier from a longitudinal position and vertical plane into a transverse position and horizontal plane, relative to the direction of movement of said delivery means.

65. In a machine of the class described, a pair of standards, a cross head carried by said standards, means for raising and lowering the cross head on said standards, a carrier plate, an obliquely extending pintle carrying said carrier plate, an obliquely extending bearing in said cross head for receiving said pintle, means for delivering to said carrier and a cam at the lower end of said standards adapted to engage said pintle for swinging the carrier from a transverse position and horizontal plane into a longitudinal position and vertical plane relative to the direction of movement of said delivery means.

66. In a machine of the class described, a plurality of receptacles arranged in units, a differentially movable conveyor mechanism for each unit of receptacles, a differentially movable chute, and means for each of said differentially movable conveyor mechanisms for delivering the selected letters thereto from the said chute.

67. In a machine of the class described, a plurality of receptacles arranged in units, a differentially movable conveyor mechanism for each unit, a channel for each of said conveyor mechanisms, means for moving letters in said channels, and a differentially movable gravity chute for selectively delivering from a common source of supply to said channels.

68. In a machine of the class described, a plurality of receptacles arranged in vertical units located side by side, a differentially and vertically movable conveyor mechanism for each unit, a channel for each of said conveyor mechanisms and extending transversely of said boxes, means for moving letters in said channels, and a differentially movable gravity chute having movement transversely of said channels for selectively delivering from a common source of supply to said channels.

69. In a machine of the class described, a source of supply, a plurality of points of delivery, a differentially movable gravity conveyor for selectively delivering from said source of supply to said points of delivery, and electro-magnetically controlled means for moving said conveyor.

70. In a machine of the class described, a source of supply, a plurality of points of delivery, a differentially movable pivoted chute for selectively delivering from said source of supply to said points of delivery, and electro-magnetically controlled means for moving said conveyor.

71. In a machine of the class described, a source of supply, a plurality of points of delivery, a differentially movable gravity conveyor for selectively delivering from said source of supply to said points of delivery, said conveyor being normally closed at its lower end, and selectively operable means for positively opening the lower end of the conveyor when the same is brought into selected position.

72. In a machine of the class described, a source of supply, a plurality of points of delivery, a differentially movable chute for selectively delivering to said points of delivery, a door for closing the lower end of said chute, and means selectively movable into and out of the path of said chute for opening the door when the chute is moved into selected position.

73. In a machine of the class described, a source of supply, a plurality of points of delivery, a differentially movable chute for selectively conveying to said points of delivery, a door for closing the lower end of said chute, and selective stops adapted, when actuated, to engage and open the door when the chute is moved into selected position.

74. In a machine of the class described, a source of supply, a plurality of channels, and an electro-pneumatically operated differentially movable gravity conveyor for selectively delivering from the source of supply to said channels.

75. In a machine of the class described, a plurality of receptacles arranged in units, a differentially movable conveyor mechanism for each of said units, means for selectively delivering to said differentially movable conveyor mechanisms, and means for delivering letters from the source of supply to said last-mentioned means.

76. In a machine of the class described, a plurality of receptacles arranged in units, a differentially movable conveyor mechanism for each of said units, a variable stroke conveyor for selectively delivering to said conveyor mechanisms, and means for singly delivering letters to said variable stroke conveyor.

77. In a machine of the class described, a plurality of receptacles arranged in units, a differentially movable conveyor mechanism for each unit, a channel for each conveyor mechanism, means for moving letters in said channels, means for selectively delivering to said channels, and means for delivering letters from the source of supply to said selective delivering means.

78. In a machine of the class described, a plurality of differentially movable conveyor mechanisms, a differentially movable gravity conveyor for selectively delivering to said differentially movable conveyor mechanisms, and means for delivering letters to said gravity conveyor.

79. In a machine of the class described, a plurality of differentially movable conveyor mechanisms, a differentially movable chute for selectively delivering to said conveyor mechanisms, and means for singly delivering letters from the source of supply to said chute.

80. In a machine of the class described, a source of supply, a differentially movable pivoted chute, means for taking off letters from said source of supply and delivering them to said chute, and single means for throwing into operation said last means and for moving said chute.

81. In a machine of the class described, a source of supply, a differentially movable chute, a take-off drum between said source of supply and chute for singly delivering letters to the chute, and electro-pneumatic means for operating said chute.

82. In a machine of the class described, a source of supply, a differentially movable chute, a pneumatic take-off mechanism between the source of supply and chute for singly delivering letters to the chute, and a common means for throwing into operation said take-off mechanism and said chute.

83. In a machine of the class described, a source of supply, a take-off drum for removing letters singly from the source of supply, pneumatic means for maintaining the letters against the face of said take-off roll while being delivered thereby, a differentially movable chute, a wiper plate between the drum and chute for wiping off the letters from the drum when the drum is rotated and delivering them to the chute, and a single means for throwing into operation said take-off mechanism and said chute.

84. In a machine of the class described, a conveyor, means for moving said conveyor, letter actuated means for setting said moving means into operation and selectively operable means for stopping said conveyor at various stages in its path of movement.

85. In a machine of the class described, a differentially movable carrier, means for guiding said carrier, pneumatically operated means for moving said carrier, and letter actuated means for setting said moving means into operation when a letter is delivered to the carrier.

86. In a machine of the class described, a differentially movable carrier, guiding means therefor, electrically controlled and pneumatically operated means for moving said carrier, and a letter actuated switch adapted to set said moving means into operation when a letter is delivered to the carrier.

87. In a machine of the class described, a vertically and differentially movable carrier, guiding means therefor, pneumatically operated means for moving said carrier, electrical means for controlling said moving means, and a letter-actuated switch for closing the circuit through said electrical controlling means so as to operate said moving means when a letter is delivered to said carrier.

88. In a machine of the class described, a differentially movable conveyor, means for moving said conveyor, and selective means adapted, when actuated, to be engaged by said conveyor for setting said moving means into operation to return the conveyor to letter-receiving position.

89. In a machine of the class described, a differentially movable conveyor, means for moving said conveyor, means for electrically controlling said moving means, a plurality of selective means associated with said electrical controlling means and adapted, when actuated, to be engaged by said conveyor so as to cause said moving means to move in a direction to return the conveyor into letter-receiving position.

90. In a machine of the class described, a differentially movable conveyor, pneumatically operated means for moving said conveyor, means for controlling said moving means, a plurality of selective means associated with said controlling means and adapted, when actuated, to be engaged by said conveyor so as to cause said moving means to move in a direction to return the conveyor into letter-receiving position.

91. In a machine of the class described, a differentially movable conveyor, pneumatically operated means for moving said conveyor, electrical controlling means for said moving means, a plurality of selective members associated with said controlling means and adapted, when actuated, to be engaged by said conveyor so as to cause the moving means to return the conveyor into letter-receiving position.

92. In a machine of the class described, a differentially movable carrier, means for guiding the carrier, selective mechanisms for controlling the differential movement of the carrier, pneumatically operated means for moving the carrier, electrical means for controlling said moving means, each of said selective mechanisms being associated with said electrical controlling means and adapted, when actuated, to be engaged by said carrier to close the circuit through said electrical controlling means so as to return the carrier into letter-receiving position.

93. In a machine of the class described, a differentially movable conveyor, means for moving said conveyor, electrical means for controlling said moving means, selective stops for controlling the differential movement of said conveyor, said electrical means being energized when said conveyor engages said stops to cause said moving means to return the conveyor to its normal position.

94. In a machine of the class described, a carrier, guiding means therefor, means for moving the carrier, electrical means for controlling the moving means, a plurality of selective stops, and a switch associated with each stop, all of said switches being associated with said controlling means and being adapted, when actuated, to be engaged by the carrier to operate the controlling means in a direction to move the carrier into letter-receiving position.

95. In a machine of the class described, a differentially movable carrier, guiding means therefor, means for moving said carrier, letter-actuated means for setting said moving means in operation to move the carrier into selected position, a plurality of selective means adapted, when actuated, to be engaged by said carrier for setting said moving means in operation in a direction to return the carrier into letter-receiving position.

96. In a machine of the class described, a carrier, guiding means therefor, means for moving said carrier, electrical means for controlling said moving means, a letter-actuated switch for said electrical means and adapted to be actuated by the letter upon delivery to the carrier, a plurality of selectively actuated switches adapted, when actuated, to be engaged by the carrier so as to actuate said electrical means and return the carrier to letter-receiving position.

97. In a machine of the class described, a carrier, guiding means therefor, pneumatically operated means for moving said carrier, electrical means for controlling said moving means, a letter-actuated switch for said electrical means and adapted to be actuated by the letter upon delivery to the carrier, a plurality of selectively actuated switches associated with said electrical means and adapted, when actuated, to be engaged by the carrier so as to return the carrier to letter-receiving position.

98. In a machine of the class described, a differentially movable conveyor, a cylinder, a piston therein, a connection between said piston and conveyor to cause the same to move in unison, a valve for controlling pressure in said cylinder, means for moving said valve in one direction to cause movement of the piston in a direction to bring the conveyor into selective delivery position, and means for moving said valve in the opposite direction to cause reverse movement of the piston and bring the conveyor into letter-receiving position.

99. In a machine of the class described, a differentially movable conveyor, a cylinder, a piston therein, a connection between said piston and conveyor to cause the same to move in unison, a valve for said cylinder, means for moving said valve in one direction to cause movement of the piston in a direction to bring the conveyor into selective delivery position, a plurality of selective stop mechanisms for said conveyor, and means associated with said selective stops and adapted to cause the valve to move in a direction to return the conveyor to letter-receiving position when the conveyor engages said stops.

100. In a machine of the class described, a differentially movable conveyor, a cylinder, a piston in the cylinder, a connection between the piston and conveyor to cause the same to move in unison, a valve for controlling pressure within said cylinder, a magnet for moving the valve in a direction to cause the conveyor to move into selective position, means for closing the circuit through the magnet, a second magnet for moving the valve in the opposite direction, and selective means for controlling the differential movement of said conveyor, said selective means being in circuit with said second magnet.

101. In a machine of the class described, a differentially movable conveyor, moving means therefor, controlling means for said moving means and having a pair of magnets, means for energizing one of said magnets to cause said moving means to move the conveyor into selective position, and a plurality of selective stops for controlling the differential movement of said conveyor mechanism and in circuit with the other magnet so that when the conveyor engages any one of said stops the second magnet is energized to cause the moving means to return the conveyor into letter-receiving position.

102. In a machine of the class described, a differentially movable conveyor, pneumatic operating means therefor, a valve controlling said pneumatic operating means, a magnet adapted, when energized, to move the valve in a direction to cause the operating means to move the conveyor into selective position, a letter-actuated switch adapted, when engaged by the letter delivered to the conveyor, to close the circuit through said magnet, a second magnet which, when energized, is adapted to move the valve in a direction to cause the operating means to return the differential conveyor into letter-receiving position, and a plurality of selective switches adapted to be engaged by said differentially movable conveyor and in circuit with said second magnet so as to energize the second magnet when the conveyor is moved into selective position.

103. In a machine of the class described, a differentially movable conveyor, a cylinder, a piston, a connection between the conveyor and piston to cause the same to move in unison, a valve chamber communicating with the opposite ends of said cylinder, a valve in said chamber, a magnet for moving the valve in a direction to admit pressure to one end of the cylinder and cause the conveyor to move into selective position, a letter-actuated switch in circuit with said magnet, a second magnet for moving the valve in the opposite direction, and a plurality of selective switches for said differentially movable conveyor and in circuit with said second magnet so that the second magnet is energized when the conveyor is moved in selective position.

104. In a machine of the class described, a differentially movable carrier, guides therefor, a belt connected to said carrier, a wheel about which said belt passes, a cylinder, a piston within the cylinder, a rack and pinion connection between the piston and wheel to cause the wheel to be rotated when the piston is moved, an electrically actuated valve for controlling pressures to and from said cylinder, and means operable by the carrier load to actuate said valve.

105. In a machine of the class described, a differentially movable carrier, guides therefor, a belt connected at its opposite ends to said carrier, a wheel about which said belt passes, a pinion carried by the wheel, a cylinder, a piston within the cylinder, a rack carried by the piston and meshing with said pinion, a valve for controlling pressures within the cylinder, a magnet adapted, when energized, to move the valve in one direction to admit pressure to one end of the cylinder, a letter-actuated switch in circuit with said magnet, a second magnet adapted, when energized, to move the valve in the opposite direction to admit pressure to the opposite end of the cylinder, and a plurality of selective switches in circuit with said second magnet.

106. In a machine of the class described, a differentially movable conveyor, a cylinder, a piston within the cylinder, a connection between the differentially movable conveyor and piston, a spring for urging the piston in a direction to move the conveyor into letter-receiving position, a valve for admitting air behind the piston, manually actuated means for moving the valve in one direction to admit air to the cylinder and cause the conveyor to move into selective position, means for moving the valve in the opposite direction to permit the air to exhaust from behind the piston, and selective stops associated with said last mentioned means and adapted to actuate the same when the differential conveyor engages any one of the stops.

107. In a machine of the class described, a differentially movable chute, a cylinder, a piston therein, a connection between the differentially movable chute and piston, a spring for urging the piston in a direction to move the chute into letter-receiving position, a magnet adapted, when energized, to move the valve in a direction to admit air behind the piston, manipulative means for closing the circuit through said magnet, a second magnet for moving the valve in the opposite direction to permit pressure to exhaust from the cylinder, and a plurality of selective stops in circuit with said second-mentioned magnet, the circuit through said second magnet being closed when the chute engages an actuated stop.

108. In a machine of the class described, a differentially movable carrier, guiding means therefor, a plurality of selective stops for controlling the differential movement of said carrier, means for moving said carrier, a switch associated with each of said selective stops, all of said switches being associated with said moving means, said carrier, when moved into selective positions, being adapted to engage said switches so as to close the same and cause the moving means to return the carrier into letter-receiving position.

109. In a machine of the class described, a differentially movable carrier, means for clamping a letter on the carrier, a plurality of differentially movable stops for controlling the differential movement of the carrier, a switch associated with each of the stops, means for moving said carrier, all of said switches being associated with said moving means and adapted to be engaged by the carrier when the carrier is moved into selective position so as to cause the moving means to return the carrier to letter-receiving position, and a trip mechanism associated with each of said stops and adapted to raise the clamping means from the carrier to release the letter thereon when the carrier is moved into letter-receiving position.

110. In a machine of the class described, a differentially movable conveyor, selective means having operative and inoperative positions for controlling the differential movement of said conveyor, and manipulative devices located adjacent each other for actuating said selective means to operative position.

111. In a machine of the class described, a differentially movable conveyor, selective stops having operative and inoperative positions for controlling the differential movement of said conveyor, means for moving said stops to operative position, and manipulative devices for actuating said operating means, said manipulative devices being located adjacent each other.

112. In a machine of the class described, a differentially movable conveyor, selective means for controlling the differential movement of said conveyor, said means having operative and inoperative positions, a magnet for each of said means, and a plurality of manipulative devices located together for closing the circuit through said magnets to actuate said selective means to operative position.

113. In a machine of the class described, a plurality of receptacles arranged in units, a differentially movable conveyor for each unit, a selective stop for each of said receptacles for controlling the differential movement of said conveyors, and manipulative devices for said stops.

114. In a machine of the class described, a plurality of receptacles arranged in units, a differentially movable conveyor for each unit, selective means for each of said receptacles for controlling the differential movement of said conveyors, a variable stroke conveyor for selectively delivering to said conveyors, means operable through said selective means for controlling the differential movement of said variable stroke conveyor, and manipulative means for actuating said selective means.

115. In a machine of the class described, a plurality of receptacles arranged in units, a differentially movable conveyor mechanism for each unit, selective means for each receptacle for controlling the differential movement of said conveyors, a magnet for each of said selective means, and a manipulative device in circuit with each of said magnets and adapted, when manipulated, to cause the selected magnet to be energized.

116. In a machine of the class described, a plurality of receptacles arranged in units, a differentially movable conveyor mechanism for each unit, a selective stop for each receptacle for controlling the differential movement of said conveyors, a magnet for each of said stops, and a manipulative device in circuit with each of said magnets and adapted, when manipulated, to cause the selected magnet to be energized.

117. In a machine of the class described, a plurality of receptacles arranged in units, a differentially movable conveyor for each unit, a plurality of selective means for each differentially movable conveyor, delivery means for selectively conveying to said differentially movable conveyors, selective means for controlling the differential movement of said delivery means, and manipulative devices for said selective means.

118. In a machine of the class described, a plurality of receptacles arranged in units, a differentially movable conveyor for each unit, a plurality of selective means for each differentially movable conveyor mechanism, a variable stroke conveyor for selectively conveying to said differentially movable conveyors, selective means for controlling the differential movement of said variable stroke conveyor, and manipulative devices for said selective means.

119. In a machine of the class described, a plurality of receptacles arranged in units, a differentially movable conveyor mechanism for each of said units, a plurality of selective means for each of said differential conveying mechanisms for controlling the differential movement thereof, delivery means for selectively conveying to said differentially movable conveyors, a plurality of selective means for controlling the differential movement of said delivery means, said last-mentioned selective means being actuated through the selective means of said differentially movable conveyors, and manipulative devices for actuating said selective means for the differentially movable conveyors.

120. In a machine of the class described, a plurality of receptacles arranged in units, a differentially movable conveyor mechanism for each of said units, a plurality of selective means for each of said differential conveying mechanisms for controlling the differential movement thereof, delivery means for selectively conveying to said differentially movable conveyor mechanisms, a plurality of selective means for controlling the differential movement of said delivery means, each of the last-mentioned selective means being associated with the selective means of one of the differentially movable conveyor mechanisms, and manipulative devices for actuating said selective means.

121. In a machine of the class described, a plurality of receptacles arranged in units, a differentially movable conveyor for each unit, a plurality of selective means for each of said conveyors for controlling the differential movement thereof, a variable stroke conveyor for selectively delivering to said differentially movable conveyors, a plurality of selective means for controlling the differential movement of said variable stroke conveyor, each of the last-mentioned selective means being associated with all of the selective means of that final conveyor to which the particular last-mentioned selective means will cause the variable stroke conveyor to deliver, and manipulative devices for actuating the selective means of said differentially movable conveyors.

122. In a machine of the class described, a plurality of receptacles arranged in units, a differentially movable conveyor mechanism for each unit, a plurality of selective stops for each conveyor for controlling the differential movement thereof, delivery means for selectively conveying to said conveyors, a plurality of selective stops for said delivery means, each of the selective stops of the delivery means being associated with the selective stops of that differentially movable conveyor to which the particular delivery means stop will cause the delivery means to convey.

123. In a machine of the class described, a plurality of receptacles arranged in units, a differentially movable conveyor mechanism for each unit, a plurality of selective stops for each conveyor for controlling the differential movement thereof, a variable stroke conveyor for selectively delivering to said first conveyors, a plurality of selective stops for controlling the differential movement of the variable stroke conveyor, each of said last-mentioned stops being associated with all of the stops of that differentially movable conveyor to which the particular variable stroke conveyor stop will cause the variable stroke conveyor to deliver, and manipulative means for actuating said stops for said differentially movable conveyors, the stops for said variable stroke conveyor being actuated upon actuation of any one of the stops of the differentially movable conveyor to which it is associated.

124. In a machine of the class described, a plurality of receptacles arranged side by side in vertical rows and facing in the same vertical direction, a vertically and differentially movable conveyor mechanism for each vertical row of receptacles, a plurality of selective stops for each of said conveyor mechanisms, a variable stroke conveyor for selectively delivering to said first conveyors, and a plurality of selective stops for said variable stroke conveyor, each of said stops for the variable stroke conveyor being associated with all of the stops of one of the differentially movable conveyors so as to be actuated therethrough.

125. In a machine of the class described, a plurality of receptacles arranged in units, a differentially movable conveyor for each unit, means for controlling the differential movement of said conveyors, and delivery means for selectively conveying to said conveyors, said delivery means being controlled through said means for controlling the differentially movable conveyors.

126. In a machine of the class described, a plurality of receptacles arranged in units, a differentially movable conveyor mechanism for each unit, a variable stroke conveyor, conveying means for each of said differentially movable conveyor mechanisms for moving the letters from the variable stroke conveyor to the respective differentially movable conveyors, selective means associated with each of said conveying means and adapted to control the differential movement of said variable stroke conveyor, and means for manipulating said selective stops.

127. In a machine of the class described, a plurality of receptacles arranged in units, a differentially movable conveyor mechanism for each unit, selective means for controlling the differential movement of said conveyor mechanisms, a variable stroke conveyor, conveying means for each of said differentially movable conveyor mechanisms for moving the letters from the variable stroke conveyor to the respective differentially movable conveyors, selective means for controlling the differential movement of said variable stroke conveyor, said last-mentioned selective means being controlled through said first selective means, and manipulative means for operating the first-mentioned selective means.

128. In a machine of the class described, a plurality of receptacles arranged in units, a differentially movable conveyor mechanism for each unit, a plurality of selective stops for each differentially movable conveyor, a variable stroke conveyor, conveying means for each of said differentially movable conveyor mechanisms for moving the letters from the variable stroke conveyor to the respective differentially movable conveyors, a selective stop for each of said conveying means and adapted to control the differential movement of said variable stroke conveyor, each of said last-mentioned stops being associated with all of the stops of that differentially movable conveyor which is associated with the same conveying means as is the particular last-mentioned stop.

129. In a machine of the class described, a plurality of receptacles arranged in units, a differentially movable conveyor for each unit, a plurality of selective stops for each differentially movable conveyor, manipulative devices for actuating said stops, a variable stroke conveyor, conveying means for each of said differentially movable conveyors for moving the letters from the variable stroke conveyor to the respective differentially movable conveyors, and a plurality of selective stops for controlling the variable stroke conveyor, each of said last-mentioned stops being associated with one of said conveying means, each of said selective stops for said variable stroke conveyor being associated with all of the selective stops of the differentially movable conveyor which is associated with the same conveying means as is the particular stop for the variable stroke conveyor so as to be actuated through the first-mentioned stops.

130. In a machine of the class described, a plurality of receptacles arranged in units, a differentially movable conveyor mechanism for each unit, a plurality of selective stops for each of said differentially movable conveyor mechanisms, a channel for each of said conveyor mechanisms, means for moving letters in said channels, a variable stroke conveyor for selectively delivering to said channels from a common source of supply, a plurality of selective stops for controlling the differential movement of the variable stroke conveyor, each of said stops being associated with one of said channels, each of the selective stops for the variable stroke conveyor being associated with all of the selective stops of that differentially movable conveyor which is associated with the same channel as is the particular selective stop for the variable stroke conveyor, and manipulative means for operating the selective stops for the differentially movable conveyors.

131. In a machine of the class described, a plurality of receptacles arranged in units, a differentially movable conveyor mechanism for each unit, a plurality of selective stops for each of said differentially movable conveyor mechanisms, a channel for each of said conveyor mechanisms, means for conveying letters in said channels, delivery means for selectively delivering letters to said channels, a plurality of selective stops for said delivery means, each stop for the delivery means being associated with one of said channels and being associated with all of the stops of that differentially movable conveyor mechanism to which the particular channel delivers, and means for manipulating the stops of said differentially movable conveyor mechanism, each of said stops for the delivery means being actuated upon actuation of any one of the selective stops of the differentially movable conveyor mechanism with which it is associated.

132. In a machine of the class described, a plurality of receptacles arranged in units, a differentially movable conveyor mechanism for each unit, a plurality of selective stops for each of said differentially movable conveyor mechanisms, a magnet for each of said stops, manipulative devices for closing the circuit through said magnets, a variable stroke conveyor for selectively delivering to said differentially movable conveyors, a plurality of selective stops for controlling the differential movement of said variable stroke conveyor, a magnet for each of said second-mentioned stops, a switch mechanism associated with each of said first-mentioned selective stops, the magnet for each of said second-mentioned stops being associated with all of the switches of the selective stops of one of the differentially movable conveyor mechanisms.

133. In a machine of the class described, a plurality of receptacles arranged in units, a differentially movable conveyor mechanism for each unit, a plurality of selective stops for each conveyor mechanism, a channel for each conveyor mechanism, means for moving letters in the channels, a variable stroke conveyor for selectively delivering to the channels from a common source, a plurality of selective stops for said variable stroke conveyor, each of said second-mentioned stops being associated with one of said channels, and a switch for each of said first-mentioned stops, each of said second-mentioned stops being associated with all of the switches of the stops of that differentially movable conveyor mechanism which is associated with the same channel as is the particular second-mentioned stop.

134. In a machine of the class described, a differentially movable carrier, a clamping plate for maintaining the letters upon the carrier, a plurality of selective stops for controlling the differential movement of said carrier, means for moving said carrier, controlling means therefor, a switch mechanism associated with each of said stop mechanisms, all of said switch mechanisms being in circuit with the controlling means for said moving means, a plurality of trip mechanisms adapted to engage the clamping plate to release the letter upon the carrier when the latter reaches its selective position, and manipulative means for moving said stops, switches and trip mechanisms into the path of travel of said carrier.

135. In a machine of the class described, a differentially movable carrier, guides therefor, means for moving said carrier upon said guides, controlling means for said moving means, a plurality of selective stops for controlling the differential movement of said carrier, a switch associated with each of said stops, all of said switches being in circuit with the controlling means for said moving means, a clamping plate carried by the carrier for maintaining the letters upon the carrier, a trip mechanism for each of the selective positions of said carrier and adapted to engage said clamping plate to release the letter when the carrier is moved into the selective positions, a magnet for each of said stops and adapted, when energized, to move its respective stop and switch into the path of movement of said carrier, a magnet for each of said trip mechanisms adapted, when energized, to move the trip into the path of travel of said carrier, and a key for closing the circuit through said magnets.

136. In a machine of the class described, a plurality of differentially movable conveyors, a plurality of selective mechanisms for each of said conveyors for controlling the differential movement thereof, a plurality of manipulative devices for actuating said selective mechanisms, and means for maintaining a manipulative device after actuation in actuated position until the conveyor with which the manipulative device is associated has moved into selective position.

137. In a machine of the class described, a plurality of differentially movable conveyors, a plurality of selective means for each conveyor for controlling the differential movement thereof, a manipulative device for each of said selective means, and means for maintaining each of the manipulative devices after actuation in actuated position until the conveyor with which the manipulative device is associated has moved into selective position and back into letter-receiving position.

138. In a machine of the class described, a plurality of differentially movable conveyors, a plurality of selective stops for each conveyor for controlling the differential movement thereof, a manually operable key for each stop, and means for maintaining the key in actuated position until the conveyor having the stop with which the actuated manipulative device is associated has moved into selective position and back into letter-receiving position.

139. In a machine of the class described, a plurality of differentially movable conveyors, a plurality of selective stops for each conveyor, a manipulative device for each stop, a circuit between each stop and its respective manipulative device and adapted to be closed when the device is manipulated to move its associated stop in actuated position, and means for maintaining the circuit closed until the conveyor associated with the actuated stop has moved into selective position.

140. In a machine of the class described, a plurality of differentially movable conveyors, a plurality of selective stops for each of said conveyors, a magnet for each of said stops, a manipulative device for each of the stops, each manipulative device having a switch in circuit with its respective stop magnet, said switches being closed upon manipulation of said devices to close the circuits through the magnets and actuate the stops, and means for maintaining each of the manipulative devices after actuation in actuated position until the conveyor with which the actuated manipulative device is associated moves into selective position and back into letter-receiving position.

141. In a machine of the class described, a plurality of differentially movable conveyors, a plurality of selective mechanisms for each conveyor for controlling the differential movement thereof, a plurality of manipulative devices for actuating said selective mechanisms, a holding magnet for each of said manipulative devices, and a carrier actuated switch for each of said conveyors, the magnets of those manipulative devices adapted to cause the machine to deliver letters to a certain conveyor being in circuit with the switch of that conveyor, said switches being adapted to be engaged by the conveyors as the latter reach their letter-receiving positions so as to release said manipulative devices.

142. In a machine of the class described, a plurality of differentially movable conveyors, each having a carrier, a plurality of selective stops for each of said conveyors, a magnet for each of said stops, a manipulative device for each of said stops, each manipulative device having a switch in circuit with its respective stop magnet, said switches being closed upon manipulation of said devices to close the circuit through the magnets and actuate the stops, a holding magnet for each of said manipulative devices, and a carrier actuated switch for each of said conveyors, the holding magnets of those manipulative devices adapted to cause the machine to deliver letters to a certain conveyor being in circuit with the carrier actuated switch of that conveyor, said carrier actuated switches being adapted to be engaged by the carriers as the latter reach their letter-receiving positions so as to release said manipulative devices.

143. In a machine of the class described, a plurality of differentially movable conveyors, a plurality of selective mechanisms for each conveyor for controlling the differential movement thereof, a manipulative device for each of said selective mechanisms, a holding magnet for each manipulative device for maintaining the same when actuated in actuated position, a normally closed switch for each conveyor and associated with said holding magnets, and a normally open switch for each holding magnet and adapted to be closed when the manipulative devices are operated, the circuit through said magnet being closed when the manipulative devices are manipulated and the circuit being opened when the conveyors open the normally closed switches.

144. In a machine of the class described, a plurality of differentially movable conveyors, a plurality of selective stops for each conveyor for controlling the differential movement of the same, a magnet for each stop, a manipulative device for each of the stops, each manipulative device having a switch in circuit with its respective stop magnet and adapted to be closed upon manipulation of said devices, a holding magnet for each manipulative device, normally closed switches associated with the holding magnets and adapted to be opened by the conveyors after they have moved into selective positions, and a normally open switch for each holding magnet adapted to be closed when the manipulative device is actuated.

145. In a machine of the class described, a plurality of differentially movable conveyors, a plurality of selective stops for each conveyor for controlling the differential movement thereof, a plurality of manipulative devices for actuating said stops, holding means for each manipulative device for maintaining the same after actuation in actuated position, and a conveyor actuated means for each conveyor for releasing the holding means, the holding means of all of the manipulative devices associated with each conveyor being associated with the conveyor actuated releasing means of that conveyor.

146. In a machine of the class described, a plurality of differentially movable conveyors, a plurality of selective stops for each conveyor, for controlling the differential movement thereof, a manipulative device for each selective stop, a holding magnet for each manipulative device for maintaining the same after actuation in actuated position, and a releasing switch for each conveyor adapted to be actuated thereby, all of the holding magnets of the manipulative devices associated with the selective stops of any one of said conveyors being in circuit with the releasing switch of that conveyor.

147. In a machine of the class described, a plurality of differentially movable conveyors, a plurality of selective mechanisms for each conveyor for controlling the differential movement thereof, a manipulative device for each selective mechanism, a holding magnet for each manipulative device, a normally closed switch associated with each conveyor and adapted to be actuated by the conveyors after they have moved into selective positions, and a normally open switch for each manipulative device adapted to be closed upon manipulation of the manipulative devices, all of the holding magnets of the manipulative devices associated with the selective mechanisms of any one of the conveyors being in circuit with the normally closed switch of that conveyor.

148. In a machine of the class described, a take-off mechanism, a plurality of differentially movable conveyors, a plurality of selective stop mechanisms for each of said conveyors, means for selectively delivering to said conveyors, and a manipulative device for each of said stop mechanisms, all of said manipulative devices being associated with the take-off mechanism so that upon manipulation of any one of the manipulative devices the take-off mechanism is actuated.

149. In a machine of the class described, a take-off mechanism, a trip for limiting the same to a step by step movement, a magnet for said trip, a plurality of differentially movable conveyor mechanisms, a plurality of stop mechanisms for each of said conveyor mechanisms, delivery means for selectively delivering from the take-off mechanism to said conveyor mechanisms, and a manipulative device for each of said stop mechanisms; all of said manipulative devices having a switch in circuit with said magnet so that the magnet is energized upon manipulation of any one of said manipulative devices.

150. In a machine of the class described, a plurality of differentially movable conveyors, a plurality of selective mechanisms for each conveyor for controlling the differential movement thereof, a manipulative device for each of said selective mechanisms, and a variable stroke conveyor for selectively delivering to said differentially movable conveyors; all of said manipulative devices being associated with said variable stroke conveyor to cause the same to move into selective position when any one of the manipulative devices is operated.

151. In a machine of the class described, a plurality of differentially movable conveyors, a plurality of selective mechanisms for each conveyor for controlling the differential movement thereof, a manipulative device for each of said selective mechanisms, a variable stroke conveyor for selectively delivering to said differentially movable conveyors, operating means for said variable stroke conveyor, controlling means for said operating means; all of said manipulative devices being associated with said controlling means to cause said means to move the variable stroke conveyor into selective position when any one of the manipulative devices is operated.

152. In a machine of the class described, a plurality of differentially movable conveyors, a plurality of stops for each conveyor for controlling the differential movement thereof, a manipulative device for each of said stops, a variable stroke conveyor for selectively delivering to said differentially movable conveyors, controlling means for said variable stroke conveyor and having a magnet which, when energized, causes the variable stroke conveyor to move into selective position, and a switch associated with each of said manipulative devices; all of said switches being in circuit with said magnet.

153. In a machine of the class described, an intermittently movable take-off mechanism; a variable stroke conveyor to which the take-off mechanism delivers and having operating means and a plurality of selective stop mechanisms associated with said operating means; a plurality of differentially movable conveyors to which said variable stroke conveyor selectively delivers and having a carrier, a plurality of selective stop mechanisms for controlling the differential movement of the carrier, operating means connected to said selective stop mechanisms, a letter-actuated switch connected to said operating means, and a carrier actuated means, and manipulative devices all connected to said take-off mechanism and the operating means of the variable stroke mechanism and each connected to one of the selective means of the differentially movable conveyors, each of said manipulative devices having a holding magnet connected to one of said carrier actuated switches; all of the selective means of each of the differentially movable conveyors being connected with one of the selective mechanisms of the variable stroke conveyor.

154. In a machine of the class described, an intermittently movable take-off mechanism; a variable stroke conveyor to which the take-off mechanism delivers and having operating means and a plurality of selective stop mechanisms which are connected to said operating means; a plurality of differentially movable conveyors to which said variable stroke conveyor selectively delivers and each having a carrier, and selective means for controlling the differential movement of the carrier; and manipulative devices all associated with said take-off mechanism and the operating means of the variable stroke mechanism and each connected to one of the selective means of the differentially movable conveyors; all of the selective means of each of the differentially movable conveyors being connected with one of the selective mechanisms of the variable stroke conveyor.

155. In a machine of the class described, an intermittently movable take-off mechanism, a variable stroke conveyor to which the take-off mechanism delivers and having a plurality of selective stop mechanisms; a plurality of differentially movable conveyors to which said variable stroke conveyor selectively delivers and each having a carrier and selective means for controlling the differential movement of the carrier; and manipulative devices all of which are associated with said take-off mechanism and the variable stroke mechanism and each manipulative device being connected to one of the selective means of the differentially movable conveyors, the selective means of each of the differentially movable conveyors being connected with one of the selective mechanisms of the variable stroke conveyor.

156. In a machine of the class described, an intermittently movable take-off mechanism, a variable stroke conveyor to which the take-off mechanism delivers and having a plurality of selective stop mechanisms; a plurality of differentially movable conveyors to which said variable stroke conveyor selectively delivers; and each having a carrier, selective means for controlling the differential movement of the carrier, and a carrier actuated release switch; and manipulative devices all of which are associated with said take-off mechanism and the variable stroke mechanism and each connected to one of the selective means of the differentially movable conveyors; all of the selective means of each of the differentially movable conveyors being connected with one of the selective mechanisms of the variable stroke conveyor, each of said manipulative devices having a holding magnet connected to the carrier actuated release switch of that differentially movable conveyor with which the particular manipulative device is associated.

157. In a machine of the class described, an intermittently movable take-off mechanism, a variable stroke conveyor to which the take-off mechanism delivers and having operating means and a plurality of selective stop mechanisms which are connected to said operating means; a plurality of differentially movable conveyors to which said variable stroke conveyor selectively delivers, and each having a carrier, selective means for controlling the differential movement of the carrier, moving means connected to said selective means, and a letter-actuated switch connected to said moving means; manipulative devices connected to said take-off mechanism and the operating means of the variable stroke mechanism and each connected to one of the selective means of the differentially movable conveyors; the selective means of each of the differentially movable conveyors being connected with one of the selective mechanisms of the variable stroke conveyor; and a lockout mechanism for maintaining the manipulative devices associated with each differentially movable conveyor against actuation while one of these devices is in actuated position.

158. In a machine of the class described, a plurality of receptacles arranged in units, a manipulative device associated with each receptacle, and means for maintaining all of the manipulative devices associated with the same unit of receptacles from actuation while one of said manipulative devices is in actuated position.

159. In a machine of the class described, a plurality of receptacles arranged in units, a differentially movable conveyor mechanism for each unit of receptacles, manipulative devices for controlling the differential movement of said conveyor mechanisms, and means for maintaining the manipulative devices associated with the same conveyor from actuation while one of said devices is in actuated position.

160. In a machine of the class described, a plurality of receptacles arranged in units, a differentially movable conveyor mechanism for each unit, selective means for each receptacle for controlling the differential movement of the conveyors, a manipulative device for each of said selective means, and lockout means for maintaining all of the manipulative devices associated with the selective means of one of said conveyors from actuation while one of said manipulative devices is in actuated position.

161. In a machine of the class described, a plurality of receptacles, a differentially movable conveyor mechanism for each unit of conveyors, a plurality of selective devices for each conveyor, a manipulative device for each selective device, and a lockout mechanism for automatically locking all of the manipulative devices associated with one of the conveyors against actuation upon actuation of one of the manipulative devices.

162. In a machine of the class described, a plurality of receptacles arranged in units, a differentially movable conveyor mechanism for each unit, a plurality of selective stop mechanisms for each conveyor, a manipulative device for each stop mechanism, lockout means for each manipulative device, and a connection between each lockout means and the manipulative devices associated with the same differentially movable conveyor.

163. In a machine of the class described, a plurality of receptacles arranged in units, a differentially movable conveyor mechanism for each unit, a plurality of selective stops for each differentially movable conveyor, a manipulative device for each of said stops, a locking magnet for each of said manipulative devices, and a switch associated with each of said manipulative devices, the locking magnet of any one of the manipulative devices being in circuit with the switches of the manipulative devices associated with the same differentially movable conveyor.

164. In a machine of the class described, a plurality of receptacles arranged in units, a differentially movable conveyor mechanism for each unit, selective means for each receptacle for controlling the differential movement of the conveyors, a manipulative device for each of said selective means, lockout means for maintaining all of the manipulative devices associated with the selective means of one of said conveyors from actuation while one of said manipulative devices is in actuated position, and means for releasing the manipulative devices when the conveyor associated therewith is moved into letter-receiving position.

165. In a machine of the class described, mail distributing mechanism, and interchangeable devices for controlling the distribution thereby as desired.

166. In a machine of the class described, mail distributing mechanism, and quickly detachable devices for controlling the course of distribution by said distributing mechanism.

167. In a machine of the class described, electrically controlled mail distributing mechanism, and interchangeable switch units for controlling the course of distribution by said distributing mechanism.

168. In a machine of the class described, a plurality of receptacles, mail distributing means therefor, and interchangeable devices for establishing different courses of distribution from a source of supply to said receptacles.

169. In a machine of the class described, a plurality of receptacles, electrically controlled distributing mechanism, and interchangeable quick detachable switch boxes for changing the electrical connections of said distributing mechanism.

170. In a machine of the class described, mail distributing mechanism, means for controlling the same, and interchangeable means for varying the distribution of the mail under the action of said controlling means.

171. In a machine of the class described, a plurality of receptacles arranged in units, mail distributing mechanism, means for controlling the same, and interchangeable means between the controlling means and distributing means for establishing various predetermined systems of distribution.

172. In a machine of the class described, a plurality of receptacles, mail distributing mechanism, means for controlling the mail distributing mechanism, electrical connections between the distributing mechanism and the controlling means, and interchangeable switch units in the electrical connections for varying the system of distribution as desired.

173. In a machine of the class described, a plurality of receptacles, mail distributing mechanism, controlling means for the mail distributing mechanism, and means for interchangeably associating the receptacles and controlling means to establish various systems of distribution.

174. In a machine of the class described, a plurality of receptacles arranged in units, mail distributing mechanism, manipulative devices for controlling the same, and interchangeable means for varying the distribution of the mail under the action of said manipulative devices.

175. In a machine of the class described, a plurality of receptacles, mail distributing mechanism, manipulative devices for controlling the mail distributing mechanism, and interchangeable means externally of said manipulative devices and adapted to establish various systems of distribution under the action of said manipulative devices.

176. In a machine of the class described, a plurality of receptacles, electrically controlled distributing mechanism, means for controlling the distributing mechanism, and interchangeable switch units between the controlling means and the distributing mechanism for varying the system of distribution under the action of the manipulative devices.

177. In a machine of the class described, a plurality of receptacles, mail distributing mechanism therefor, manipulative devices for controlling the mail distributing mechanism, and means for changing the system of distribution effected by the manipulative devices without disturbing the relative positions of the manipulative devices.

178. In a machine of the class described, a plurality of receptacles, mail distributing mechanism therefor, a manipulative device for normally controlling distribution to one receptacle, and means for establishing a different system of routing so that on actuation of the manipulative device distribution to a different receptacle is effected.

179. In a machine of the class described, a plurality of receptacles arranged in units, mail distributing mechanism therefor, manipulative devices appropriate to each unit and controlling said distributing mechanism, and means whereby manipulative devices appropriate to one unit are adapted to cause the distributing mechanism to deliver to other units.

180. In a machine of the class described, a plurality of receptacles arranged in units, mail distributing mechanism therefor, manipulative devices appropriate to each unit of receptacles and controlling the mail distributing mechanism, and quick detachable means whereby any one or more of the manipulative devices appropriate to one of the units of receptacles may be associated with other units of receptacles so as to change the system of distribution by said distributing mechanism.

181. In a machine of the class described, a plurality of receptacles, electrically controlled mail distributing mechanism, manipulative devices for controlling the distribution of the mail to the receptacles, and quick detachable switch units for changing the system of distribution under actuation of the manipulative devices without disturbing the relative position of the manipulative devices or receptacles.

182. In a machine of the class described, a plurality of receptacles arranged in units, mail distributing mechanism, manipulative devices appropriate to each unit and controlling the distribution of mail to the receptacles, and interchangeable quickly detachable devices between said manipulative devices and distributing mechanism for associating keys of one unit with the receptacles of a different unit without disturbing the relative positions of the manipulative devices or receptacles.

183. In a machine of the class described, a plurality of receptacles arranged in units, electrically controlled mail distributing mechanism therefor, keys appropriate to each unit of receptacles and adapted to control the distributing mechanism, and interchangeable switch units in the connections between the keys and distributing mechanism for changing the system of distribution so that keys appropriate to one unit at one time may be appropriate to another unit at another time.

184. In a machine of the class described, a plurality of receptacles arranged in units, mail distributing mechanism having selective means for each receptacle, manipulative devices for actuating the selective means, and interchangeable means for varying the connections between the manipulative devices and the selective means so as to establish various systems of routing.

185. In a machine of the class described, a plurality of receptacles arranged in units, electrically controlled distributing mechanism having selective means for each unit, a manipulative device for each selective means, and interchangeable switch units externally of the manipulative devices for varying the connections between the manipulative devices and the selective means so that various systems of distribution may be made without disturbing the relative positions of the manipulative devices.

186. In a machine of the class described, a plurality of receptacles arranged in units, a differentially movable conveyor mechanism for each unit, means for delivering to the said conveyor mechanisms, manipulative devices associated with each of the differentially movable conveyor mechanisms, and means for interchangeably associating the manipulative devices with the several differentially movable conveyor mechanisms for establishing various systems of distribution.

187. In a machine of the class described, a plurality of receptacles arranged in units, a differentially movable conveyor mechanism for each unit, a differentially movable conveyor mechanism common to said first conveyor mechanisms, manipulative devices controlling said conveyor mechanisms, and means for interchangeably associating the manipulative devices with the various conveyor mechanisms so as to establish various systems of distribution.

188. In a machine of the class described, a plurality of receptacles arranged in units, mail distributing mechanism having a conveyor for each unit and a conveyor common to said first conveyors, manipulative devices controlling said distributing mechanism, and interchangeable means externally of said manipulative devices for establishing various systems of distribution under action of the manipulative devices.

189. In a machine of the class described, a plurality of receptacles arranged in units, a differentially movable conveyor mechanism for each unit and having a selective stop for each receptacle, means for selectively delivering to the said conveyor mechanisms, a manipulative device appropriate to each of the selective stops, and means for interchangeably associating the manipulative devices with the several selective stops for establishing various systems of distribution.

190. In a machine of the class described, a differentially movable conveyor, selective means for controlling the differential movement thereof, manipulative devices for actuating said selective means, and quickly detachable interchangeable units for interchangeably associating said selective means and manipulative devices without disturbing the relative positions thereof.

191. In a machine of the class described, a plurality of receptacles arranged in units, a differentially movable cvonveyor for each unit, selective means for each of said receptacles for controlling the differential movement of said conveyors, a variable stroke conveyor for selectively delivering to said conveyors, means operable through said selective means for controlling the differential movement of said variable stroke conveyor, and interchangeable means between the selective means and manipulative devices for establishing various systems of distribution.

192. In a machine of the class described, a plurality of receptacles arranged in units, a differentially movable conveyor for each unit, a plurality of selective means for each differentially movable conveyor, delivery means for selectively conveying to said differentially movable conveyors, selective means for controlling the differential movement of said delivery means, and interchangeable means between the selective means and manipulative devices for establishing various systems of distribution.

193. In a machine of the class described, a plurality of receptacles arranged in units, a differentially movable conveyor mechanism for each of said units, a plurality of selective means for each of said differential conveying mechanisms for controlling the differential movement thereof, delivery means for selectively conveying to said differentially movable conveyors, a plurality of selective means for controlling the differential movement of said delivery means, said last-mentioned selective means being actuated through the selective means of said differentially movable conveyors, and quick detachable means for interchangeably associating the first-mentioned selective means and the manipulative devices to establish various systems of distribution.

194. In a machine of the class described, a plurality of receptacles arranged in units, a differentially movable conveyor for each unit, means for controlling the differential movement of said conveyors, manipulative devices for said controlling means, and interchangeable devices for interchangeably associating the manipulative devices and controlling means to establish various courses of distribution.

195. In a machine of the class described, a plurality of receptacles arranged in units, a differentially movable conveyor for each unit, a plurality of selective stops for each differentially movable conveyor, manipulative devices for actuating said stops, a variable stroke conveyor, conveying means for each of said differentially movable conveyors for moving the letters from the variable stroke conveyor to the respective differentially movable conveyors, and quickly detachable means for interchangeably associating the first-mentioned selective means and manipulative devices.

196. In a machine of the class described, mail distributing mechanism, manipulative means for controlling the same, and electrical detent or holding means for the manipulative means operated by the movement of the distributing mechanism during the course of distribution.

197. In a machine of the class described, a plurality of receptacles, electrically controlled mail distributing mechanism therefor comprising a plurality of carriers, manipulative means for controlling the same, and detent means for the manipulative devices and adapted to be released after distribution is completed, said detent means being operable by each carrier.

198. In a machine of the class described, a plurality of receptacles, mail distributing mechanism having selective means for each receptacle, manipulative devices for actuating the selective means, and electrical detent means for said manipulative devices and adapted to be released by the distributing mechanism upon completion of distribution.

199. In a machine of the class described, mail distributing mechanism, manipulative means for controlling the same, detent or holding means for retaining an actuated manipulative means in operated position during distribution, and interchangeable means for changing the system of distribution and controlling the detent means accordingly.

200. In a machine of the class described, electrically controlled mail distributing means, manipulative means for controlling the same, electrically operated detent means for holding an actuated manipulative device in operated position during distribution, and interchangeable switch units in the connections of said distributing means and detent means for changing the system of distribution and controlling the detent means accordingly.

201. In a machine of the class described, a plurality of receptacles, mail distributing mechanism, controlling means for the mail distributing mechanism, detent means for each of said controlling means to hold an actuated controlling means in operated position during distribution, means actuated by the distributing mechanism to release said detent means, and means for interchangeably associating the detent means with the last-mentioned means.

202. In a machine of the class described, a plurality of receptacles, mail distributing mechanism, manipulative devices for controlling the mail distributing mechanism, detent means for each manipulative device to hold the same in actuated position during distribution, a plurality of means actuated by the distributing mechanism to release the detent means, and interchangeable means externally of said manipulative devices for effecting changes between said last-mentioned means and detent means corresponding to the changes in distribution.

203. In a machine of the class described, a plurality of receptacles arranged in units, mail distributing mechanism therefor, manipulative devices appropriate to each unit of receptacles, detent means for maintaining the actuated manipulative devices in operated position during distribution and operated by the movement of the distributing mechanism, and quick detachable means for associating manipulative devices of one unit with receptacles of a different unit and effecting like changes in the detent means.

204. In a machine of the class described, a plurality of receptacles arranged in units, electrically controlled distributing mechanism having selective means for each unit, a manipulative device for each selective means, electrically operated detent means for each manipulative device, a switch for each unit of receptacles and operated by the movements of the distributing mechanism, and interchangeable switch units in the connections between said switches and detent means to change these connections in accordance with the changes in distribution.

205. In a machine of the class described, a plurality of receptacles arranged in units, a differentially movable conveyor for each unit, a plurality of selective means for each differentially movable conveyor, delivery means for selectively conveying to said differentially movable conveyors, selective means for controlling the differential movement of said delivery means, detent means for each manipulative device, the detent means for all manipulative devices for one conveyor being released by said conveyor, and interchangeable means between the manipulative devices and selective means for establishing various systems of distribution, and interchangeable means for associating the detent means and conveyors in accordance with changes in distribution.

206. In a machine of the class described, a plurality of receptacles arranged in units, mail distributing mechanism therefor, manipulative devices for controlling the distributing mechanism and arranged in groups appropriate to each unit of receptacles, lock-out mechanism for maintaining the manipulative devices of one group against actuation upon operation of one of them, and interchangeable means for changing the association of the manipulative devices and receptacles and effecting changes in the lock-out mechanism to correspond to the regrouping of the manipulative devices.

207. In a machine of the class described, an electrically controlled mail distributing mechanism, manipulative devices for controlling the same, lock-out mechanism for maintaining some of the manipulative devices against actuation when one of them is in operated position, and interchangeable means for changing the system of distribution and controlling the lock-out mechanism accordingly.

208. In a machine of the class described, electrically controlled mail distributing mechanism, manipulative means for controlling the same and arranged in groups, electrically controlled lock-out mechanism for maintaining the manipulative devices of a group against actuation upon actuation of one of the manipulative devices of that group, and interchangeable switch units in the connections of said distributing means and lock-out mechanism for changing the system of distribution and controlling the lock-out mechanism accordingly.

209. In a machine of the class described, a plurality of receptacles, mail distributing mechanism, controlling means for the mail distributing mechanism, and arranged in groups, means for interchangeably associating the receptacles and controlling means to establish various systems of distribution, lock-out mechanism for maintaining the controlling means of any one group against actuation upon operation of one of them, and interchangeable means for effecting changes in the lock-out mechanism to correspond with the regrouping of the controlling means brought about by the first-mentioned interchangeable means.

210. In a machine of the class described, a plurality of receptacles arranged in units, mail distributing mechanism therefor, manipulative devices arranged in groups appropriate to each unit of receptacles, lock-out mechanism for maintaining the manipulative devices of any group against actuation upon the operation of one of them, and quick detachable means for interchangeably associating the manipulative devices with the receptacles and effecting like changes in the lock-out mechanism so as to be in accordance with the regrouping of the manipulative devices.

211. In a machine of the class described, a plurality of receptacles arranged in units, electrically controlled distributing mechanism having selective means for each unit, a manipulative device for each selective means, electrically operated lock-out mechanism for each group of manipulative devices, adapted to maintain the manipulative devices associated with the same unit of selective means against actuation when one of the manipulative devices of that group is operated, and interchangeable switch units externally of the manipulative devices to effect changes in the lockout mechanism in accordance with the regrouping of the manipulative devices.

212. In a machine of the class described, a plurality of receptacles arranged in units, mail distributing mechanism, manipulative devices corresponding to the receptacles for controlling the mail distributing mechanism, there being a plurality of such devices for each unit, and lock-out mechanism for maintaining the manipulative devices of any unit against actuation after one of the manipulative devices of that unit is operated, said lock-out mechanism locking the devices of only that unit.

213. In a machine of the class described, a plurality of receptacles arranged in units, mail distributing mechanism, manipulative devices corresponding to the receptacles for controlling the mail distributing mechanism, there being a plurality of such devices for each unit, lock-out mechanism for maintaining the manipulative devices of any unit against actuation after one of the manipulative devices of that unit is operated, said lock-out mechanism locking the devices of only that unit, and means for releasing the lock-out mechanisms when the distributing mechanism has completed the distribution.

214. In a machine of the class described, a plurality of receptacles arranged in units, mail distributing mechanism therefor, manipulative devices for controlling the distributing mechanism and appropriate to the units of receptacles, detent or holding means for retaining an actuated manipulative device in operated position during distribution, a lock-out mechanism for each group of manipulative devices for maintaining the devices of one group against actuation when one of the devices of that group is in operated position, and interchangeable means for changing the system of distribution and controlling the detent means and lock-out mechanism accordingly.

215. In a machine of the class described a plurality of receptacles arranged in units, a conveying mechanism for each unit, and a second conveyor operating in a horizontal plane below said receptacles for delivering to said conveying mechanisms.

216. In a machine of the class described a plurality of receptacles arranged in units, a conveying mechanism for each unit, and an endless conveyor operating in a horizontal plane below said receptacles for delivering to said conveying mechanisms.

217. In a mail distributing machine, a plurality of receptacles adapted to receive mail for different destinations, means for selectively delivering to said receptacles, means for controlling said delivering means comprising a key board having a plurality of keys each normally corresponding to a definite receptacle, and switching means for selectively associating said keys with different receptacles whereby the same key may cause delivery to different receptacles at different times.

218. In a machine of the class described, a plurality of receptacles arranged in vertical units, a vertically movable conveying mechanism for each unit, an endless conveyor operating in a horizontal plane below said receptacles for delivering to said conveying mechanisms, and means for controlling each of said conveying mechanisms to cause delivery to any selected receptacle of each unit.

219. In a machine of the class described, a plurality of receptacles arranged in units, a carrier for each unit, manipulative devices corresponding to particular receptacles for controlling the carriers, there being a group of such devices for each unit and its carrier, and lock-out mechanism for maintaining the said devices corresponding to any unit against actuation after one of the devices of that unit is operated, said lockout mechanism locking the devices of only that unit.

220. In a machine of the class described, a plurality of receptacles arranged in units, a carrier for each unit, manipulative devices corresponding to particular receptacles for controlling the carriers, there being a group of such devices for each unit and its carrier, and lock-out mechanism for maintaining the said devices corresponding to any unit against actuation after one of the devices of that unit is operated, said lock-out mechanism locking the devices of only that unit and being released by the movement of the carrier of the said unit upon completion of the distribution.

221. A machine as specified in claim 219 having switching means whereby the individual manipulative devices may selectively be associated with different receptacles.

222. In a machine of the class described, a plurality of receptacles arranged one above the other in units, a vertically movable reciprocating conveyor for each unit having a fixed receiving point and adapted to selectively deliver to any one of the receptacles in the unit and to return to its receiving point, and a conveyor common to all of said first mentioned conveyor mechanisms and operating in a horizontal plane for selectively delivering to said conveyor mechanisms.

223. In a machine of the class described, a plurality of receptacles, a carrier common to said receptacles having a single receiving point and adapted to deliver selectively to any one of said receptacles, means for delivering mail to said carrier from a common source, and means for imparting movement to said carrier to cause the same to selectively deliver to one of said receptacles, said moving means being normally disconnected from said carrier but being automatically connected therewith upon the receipt of a load by said carrier.

224. In a machine of the class described, mail distributing mechanism, manipulative devices for controlling said mechanism, and interchangeable devices for varying the relation of the manipulative devices to said distributing mechanism.

225. In a machine of the class described, mail distributing mechanism, receptacles, keys normally corresponding to different receptacles and adapted to control said mechanism, and switching means for selectively causing variation in the receptacles to which the keys correspond whereby a plurality of keys normally causing delivery to different receptacles may cause delivery to the same receptacle.

In testimony whereof we have hereunto set our hands.

ROBERT J. MITCHELL.
ZENO B. BABBITT.
ZENAS W. ALDERMAN.